(12) United States Patent
Oguma

(10) Patent No.: US 10,300,906 B2
(45) Date of Patent: May 28, 2019

(54) POWER SUPPLY SYSTEM, TRANSPORTATION DEVICE, AND POWER TRANSMISSION METHOD

(71) Applicant: HONDA MOTOR CO., LTD., Tokyo (JP)

(72) Inventor: Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 15/431,766

(22) Filed: Feb. 14, 2017

(65) Prior Publication Data

US 2017/0232953 A1    Aug. 17, 2017

(30) Foreign Application Priority Data

Feb. 16, 2016   (JP) ................................. 2016-027295

(51) Int. Cl.
    *B60L 3/00*    (2019.01)
    *B60W 20/13*   (2016.01)
    (Continued)

(52) U.S. Cl.
    CPC .............. *B60W 20/13* (2016.01); *B60K 1/00* (2013.01); *B60K 6/32* (2013.01); *B60K 6/42* (2013.01);
    (Continued)

(58) Field of Classification Search
    None
    See application file for complete search history.

(56) References Cited

U.S. PATENT DOCUMENTS 9,272,625 B2 * 3/2016 Sonesson ................... B60L 1/00
2009/0218989 A1 * 9/2009 Davis ................. H01M 10/4207
                                                              320/136
(Continued)

FOREIGN PATENT DOCUMENTS

JP          2010-273428        12/2010
JP           2010273428     *  12/2010
(Continued)

OTHER PUBLICATIONS

Japanese Office Action for corresponding JP Application No. 2016-027295, dated Sep. 12, 2017 (w/ English machine translation).

*Primary Examiner* — Tamara L Weber
(74) *Attorney, Agent, or Firm* — Mori & Ward, LLP

(57) ABSTRACT

A power supply system includes a first energy storage, a second energy storage, a power transmission circuit, and circuitry. The circuitry acquires at least one of a request supply amount and a request output amount. The circuitry calculates a first input or output target amount and a second input or output target amount in accordance with at least one state quantity including the at least one of the request supply amount and the request output amount. The circuitry controls the power transmission circuit to control electric power transmission so that the first input or output target amount and the second input or output target amount are satisfied. The circuitry controls the power transmission circuit so that a change in an amount of the electric power transmission decreases even though changes in the first input or output target amount and the second input or output target amount are discontinuous.

17 Claims, 23 Drawing Sheets

(51) Int. Cl.
  *B60W 20/15*   (2016.01)
  *B60K 1/00*    (2006.01)
  *B60K 6/32*    (2007.10)
  *B60K 6/42*    (2007.10)
  *B60W 10/08*   (2006.01)
  *B60L 58/20*   (2019.01)

(52) U.S. Cl.
  CPC ............ *B60L 3/0046* (2013.01); *B60L 58/20* (2019.02); *B60W 10/08* (2013.01); *B60W 20/15* (2016.01); *B60L 2240/42* (2013.01); *B60L 2240/423* (2013.01); *B60W 2710/08* (2013.01); *Y02T 10/642* (2013.01); *Y02T 10/7005* (2013.01); *Y02T 10/7066* (2013.01); *Y02T 90/34* (2013.01)

(56) References Cited

U.S. PATENT DOCUMENTS

| | | | | |
|---|---|---|---|---|
| 2009/0302788 | A1* | 12/2009 | Mitsuda | H02P 3/18 318/376 |
| 2014/0167712 | A1* | 6/2014 | Kim | G05F 1/462 323/234 |
| 2015/0142190 | A1* | 5/2015 | Ye | H02J 3/24 700/287 |
| 2015/0375635 | A1* | 12/2015 | Hashimoto | B60L 11/1861 701/22 |
| 2016/0204703 | A1* | 7/2016 | Ishigaki | H02M 3/02 307/43 |
| 2016/0236581 | A1* | 8/2016 | Tashiro | H02J 7/0029 |

FOREIGN PATENT DOCUMENTS

| | | | |
|---|---|---|---|
| JP | 2011-182542 | | 9/2011 |
| JP | 2011182542 | * | 9/2011 |
| JP | 2014-187757 | | 10/2014 |

* cited by examiner

POWER SUPPLY SYSTEM, TRANSPORTATION DEVICE, AND POWER TRANSMISSION METHOD

CROSS-REFERENCE TO RELATED APPLICATIONS

The present application claims priority under 35 U.S.C. § 119 to Japanese Patent Application No. 2016-027295, filed Feb. 16, 2016, entitled "Power Supply System, Transportation Device, and Power Transmission Method." The contents of this application are incorporated herein by reference in their entirety.

BACKGROUND

1. Field

The present disclosure relates to a power supply system, a transportation device, and a power transmission method.

2. Description of the Related Art

A power supply system of this type, such as the one disclosed in Japanese Unexamined Patent Application Publication No. 2014-187757, is known in the related art. In Japanese Unexamined Patent Application Publication No. 2014-187757, a system is proposed which is capable of supplying power to an electric motor for a vehicle by using two energy storage devices, namely, a high-capacity energy storage device (battery) having a relatively high capacity and a high-power energy storage device (capacitor) having a relatively high upper limit on power that can be output.

In the proposed system, power is appropriately exchanged between the two energy storage devices so that the state of charge (SOC) representing the remaining capacity of each energy storage device is made close to an SOC center set in accordance with the vehicle speed.

SUMMARY

According to a first aspect of the present invention, a power supply system includes a first energy storage, a second energy storage, a power transmission circuit, and circuitry. The first energy storage supplies electric power to an electric load and is charged by the electric load. The second energy storage supplies electric power to the electric load and is charged by the electric load. The electric load is connected to the first energy storage and to the second energy storage via the power transmission circuit. The circuitry is configured to acquire at least one of a request supply amount of electric power to be supplied to the electric load and a request output amount of regenerative electric power output from the electric load. The circuitry is configured to calculate a first input or output target amount of electric power for the first energy storage and a second input or output target amount of electric power for the second energy storage in accordance with at least one state quantity including the at least one of the request supply amount and the request output amount. The circuitry is configured to control the power transmission circuit to control electric power transmission so that the first input or output target amount and the second input or output target amount are satisfied. The circuitry is configured to control the power transmission circuit so that a change in an amount of the electric power transmission decreases even though changes in the first input or output target amount and the second input or output target amount are discontinuous.

According to a second aspect of the present invention, a power transmission method for performing power transmission among an electric load, a first energy storage, and a second energy storage, the power transmission method includes acquiring at least one of a request supply amount of electric power to be supplied to the electric load and a request output amount of regenerative electric power output from the electric load. The power transmission method includes calculating a first input or output target amount of electric power for the first energy storage and a second input or output target amount of electric power for the second energy storage in accordance with at least one state quantity including the at least one of the request supply amount and the request output amount. The power transmission method includes controlling electric power transmission so that the first input or output target amount and the second input or output target amount are satisfied. The power transmission method includes controlling the electric power transmission so that a change in an amount of the electric power transmission decreases even though changes in the first input or output target amount and the second input or output target amount are discontinuous.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
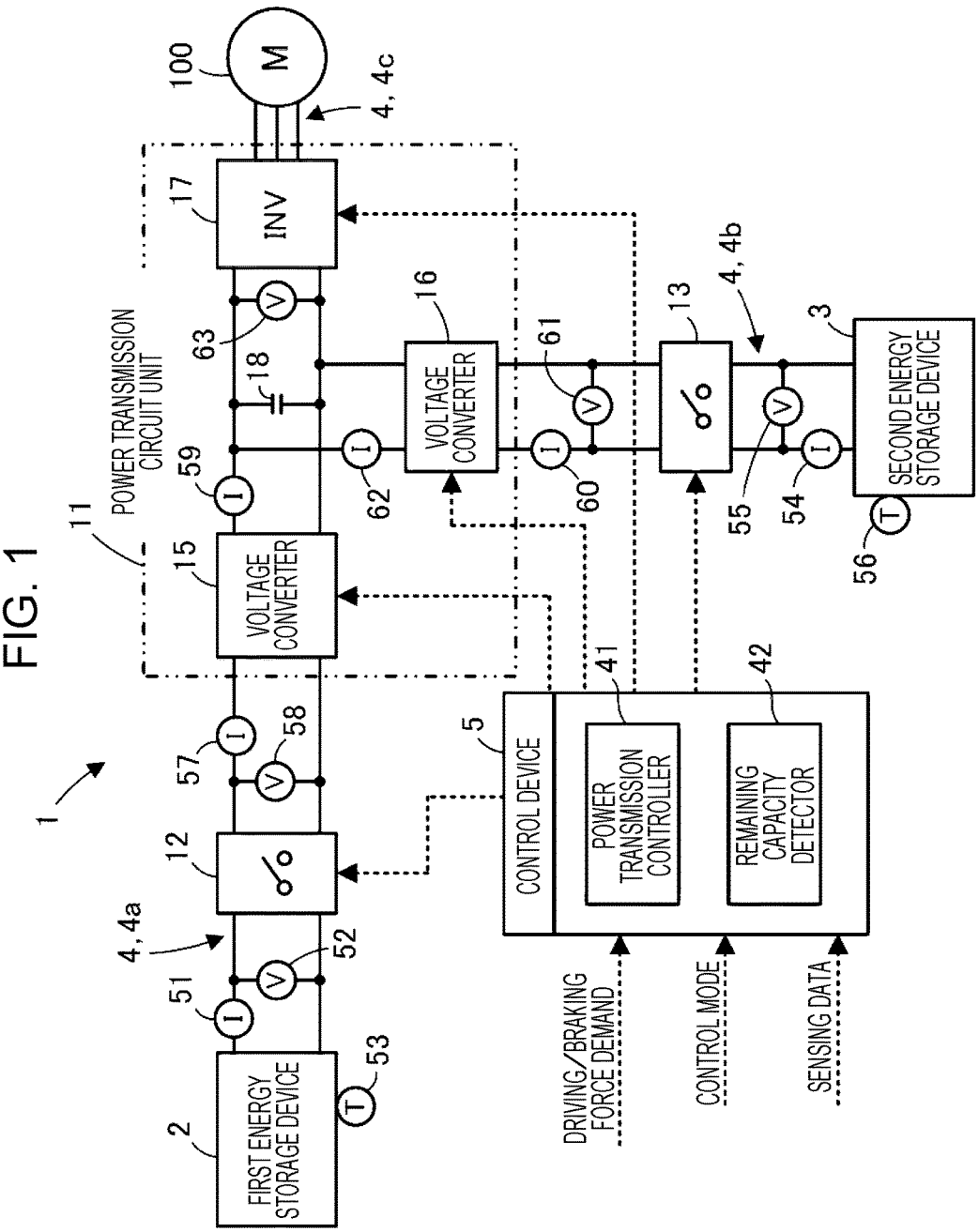
FIG. 1 illustrates an overall configuration of a power supply system according to embodiments of the present disclosure.

The embodiments will now be described with reference to the accompanying drawings, wherein like reference numerals designate corresponding or identical elements throughout the various drawings.

First Embodiment

A first embodiment of the present disclosure will be described hereinafter with reference to FIG. 1 to FIG. 21. Referring to FIG. 1, a power supply system 1 according to this embodiment is a system for supplying power to an electric motor 100. The electric motor 100 is an example of an electric load.

In this embodiment, by way of example, the power supply system 1 is mounted in a transportation device, for example, an electrically driven vehicle (not illustrated), that includes the electric motor 100 as a propulsion generator. The electric motor 100 is capable of performing a power-running operation for generating a driving force upon being supplied with power, and also performing a regenerative operation for outputting regenerative power by using the kinetic energy of the electrically driven vehicle (hereinafter sometimes referred to simply as vehicle).

The power supply system 1 includes a first energy storage device 2, a second energy storage device 3, a power transmission path 4 provided among the electric motor 100, the first energy storage device 2, and the second energy storage device 3, and a control device 5 having a function of controlling the operation of the power supply system 1. The first energy storage device 2 and the second energy storage device 3 serve as power sources. The electric load for the power supply system 1 may also include electric loads such as auxiliaries, in addition to the electric motor 100.

In this embodiment, the first energy storage device 2 and the second energy storage device 3 are rechargeable energy storage devices having different characteristics. Specifically, the first energy storage device 2 and the second energy storage device 3 have the following characteristics.

The first energy storage device 2 is an energy storage device having a higher energy density than the second energy storage device 3. The energy density is an amount of electrical energy storable per unit weight or unit volume. Examples of the first energy storage device 2 may include a lithium-ion battery.

The second energy storage device 3 is an energy storage device having a higher power density than the first energy storage device 2. The power density is an amount of electricity that can be output per unit weight or unit volume (an amount of electrical energy per unit time or an amount of charge per unit time). Examples of the second energy storage device 3 may include a lithium-ion battery, a nickel-hydrogen battery, and a capacitor.

The first energy storage device 2 with a relatively high energy density is capable of storing a greater amount of electrical energy than the second energy storage device 3. The second energy storage device 3 with a relatively high power density has a lower impedance than the first energy storage device 2, and is thus capable of outputting instantaneously high power.

In addition, the first energy storage device 2 is an energy storage device having a lower resistance to deterioration due to changes in the input or output (the amount of discharge power or the amount of charging power) of the first energy storage device 2 than the second energy storage device 3. Thus, if the first energy storage device 2 is discharged or charged in such a manner that changes in the input or output of the first energy storage device 2 frequently occur, deterioration of the first energy storage device 2 is more likely to progress than that of the second energy storage device 3. When the first energy storage device 2 is discharged or charged steadily in such a manner that changes in the input or output of the first energy storage device 2 are less likely to occur, progression of deterioration of the first energy storage device 2 is restrained, compared with when the first energy storage device 2 is discharged or charged in such a manner that changes in the input or output of the first energy storage device 2 frequently occur.

More specifically, deterioration of the first energy storage device 2 is more likely to progress when the output (the amount of discharge power) of the first energy storage device 2 is increased rapidly than when the output of the first energy storage device 2 is decreased rapidly. Furthermore, deterioration of the first energy storage device 2 is more likely to progress when the input (the amount of charging power) of the first energy storage device 2 is increased rapidly than when the input of the first energy storage device 2 is decreased rapidly. Furthermore, deterioration of the first energy storage device 2 is more likely to progress when the input (the amount of charging power) of the first energy storage device 2 is increased rapidly than when the output (the amount of discharge power) of the first energy storage device 2 is increased rapidly. Furthermore, deterioration of the first energy storage device 2 is more likely to progress when the output (the amount of discharge power) of the first energy storage device 2 is decreased rapidly than when the input (the amount of charging power) of the first energy storage device 2 is decreased rapidly.

In contrast, even if the second energy storage device 3 having a relatively high resistance to deterioration due to changes in the input or output of the second energy storage device 3 is discharged in such a manner that changes in the input or output of the second energy storage device 3 frequently occur, deterioration of the second energy storage device 3 is less likely to progress than that of the first energy storage device 2.

Furthermore, the first energy storage device 2 and the second energy storage device 3 have the following charging characteristics. The first energy storage device 2 has a lower resistance to deterioration due to charging (in particular, charging at high rates) (i.e., deterioration caused by charging is more likely to progress) than the second energy storage device 3, whereas the second energy storage device 3 has a higher resistance to deterioration due to charging (i.e., deterioration caused by charging is less likely to progress) than the first energy storage device 2.

The second energy storage device 3 further has a characteristic in that discharging or charging with the remaining capacity being kept at an approximately intermediate value results in the progression of deterioration being prevented, compared with discharging or charging with the remaining capacity being biased toward the high-capacity side or the low-capacity side. More specifically, the second energy storage device 3 has a characteristic in that deterioration of the second energy storage device 3 is more likely to progress as the remaining capacity of the second energy storage device 3 increases to the high-capacity side or decreases to the low-capacity side from an approximately intermediate value.

The power transmission path 4 is constituted by a current-carrying line, a wiring pattern on a substrate, or the like. The power transmission path 4 is provided with a power transmission circuit unit 11 for controlling power transmission among the first energy storage device 2, the second energy storage device 3, and the electric motor 100.

The power transmission path 4 includes a power transmission path segment 4a for power transmission between the first energy storage device 2 and the power transmission circuit unit 11, a power transmission path segment 4b for power transmission between the second energy storage device 3 and the power transmission circuit unit 11, and a power transmission path segment 4c for power transmission between the electric motor 100 and the power transmission circuit unit 11. The power transmission path segments 4a and 4b are respectively provided with contactors 12 and 13 serving as switch units for connection and disconnection of the power transmission path segments 4a and 4b.

The power transmission circuit unit 11 is configured to be capable of controlling power transmission among the first energy storage device 2, the second energy storage device 3, and the electric motor 100 in accordance with a control signal provided by the control device 5. More specifically, the power transmission circuit unit 11 is capable of selectively switching between the source and destination of power supply and controlling an amount of power supplied (a supplied power) from the source to the destination in accordance with the provided control signal.

Specifically, the power transmission circuit unit 11 includes a voltage converter 15, a voltage converter 16, and an inverter 17. The voltage converter 15 is capable of boosting or stepping down a voltage input from the first energy storage device 2 and outputting the resulting voltage. The voltage converter 16 is capable of boosting or stepping down a voltage input from the second energy storage device 3 and outputting the resulting voltage. The inverter 17 is capable of converting direct-current (DC) power into alternating-current (AC) power and outputting the AC power.

The voltage converters 15 and 16 are connected in parallel on the input side of the inverter 17. The inverter 17 is further provided with a capacitor 18 on the input side thereof (the output side of the voltage converters 15 and 16). The capacitor 18 smooths the DC voltage input to the inverter 17 (the DC voltage output from the voltage converter 15 or 16).

The power transmission circuit unit 11 may be a circuit unit including the contactors 12 and 13.

Figure 2:
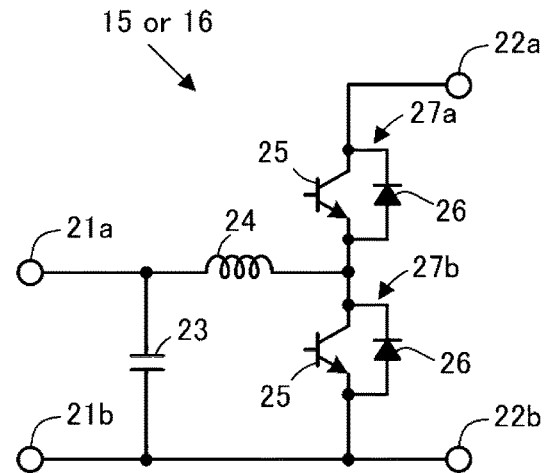
FIG. 2 illustrates an example circuit configuration of a voltage converter in the power supply system according to the embodiments.

The voltage converters 15 and 16 are so-called DC/DC converters, and may be each a known one. FIG. 2 illustrates an example circuit configuration of the voltage converters 15 and 16. The voltage converter 15 or 16 having the illustrated circuit configuration is a voltage converter capable of boosting the output voltage of the corresponding one of the first energy storage device 2 and the second energy storage device 3 and outputting the resulting voltage. The voltage converter 15 or 16 includes, between a pair of primary-side terminals 21a and 21b connected to the corresponding one of the first energy storage device 2 and the second energy storage device 3 and a pair of secondary-side terminals 22a and 22b connected to the inverter 17, a capacitor 23, a coil 24, and high-side and low-side two switch units 27a and 27b, which are connected in an illustrated manner. Each of the switch units 27a and 27b includes a semiconductor switch element 25, such as a transistor, and a diode 26, which are connected in parallel.

The voltage converter 15 or 16 having the configuration described above is capable of controlling the respective semiconductor switch elements 25 of the switch units 27a and 27b to be turned on or off in accordance with a control signal having a predetermined duty ratio (so-called duty signal) to output a DC voltage, which is obtained by boosting a DC voltage input to the primary-side terminals 21a and 21b at a required boosting ratio, from the secondary-side terminals 22a and 22b or to output a DC voltage, which is obtained by stepping down a DC voltage input to the secondary-side terminals 22a and 22b at a required step-down ratio, from the primary-side terminals 21a and 21b. The boosting ratio or the step-down ratio is variably controllable.

The voltage converter 15 or 16 is further capable of controlling the respective semiconductor switch elements 25 of the switch units 27a and 27b to be turned off to interrupt current flow (power transmission) from the secondary side to the primary side.

For additional explanation, the voltage converters 15 and 16 may have a circuit configuration other than that illustrated in FIG. 2. Furthermore, any one or both of the voltage converters 15 and 16 may be configured to step down a voltage input from the first energy storage device 2 or the second energy storage device 3 and to output the resulting voltage. One of the voltage converters 15 and 16 may be omitted. The necessity of the voltage converter 15 or 16 or the voltage conversion type of the voltage converter 15 or 16 (namely, boosting or stepping down) may be selected from a variety of combinations in accordance with the voltage necessary to activate the electric load, the respective output voltages of the first energy storage device 2 and the second energy storage device 3, and so on.

For example, the first energy storage device 2 is a higher-voltage energy storage device than the second energy storage device 3. In this case, if one of the voltage converters 15 and 16 is to be omitted, it is more preferable that the voltage converter 15, which is connected to the first energy storage device 2, be omitted. Omission of one of the voltage converters 15 and 16 can reduce the cost required to realize a power supply system.

Figure 3:
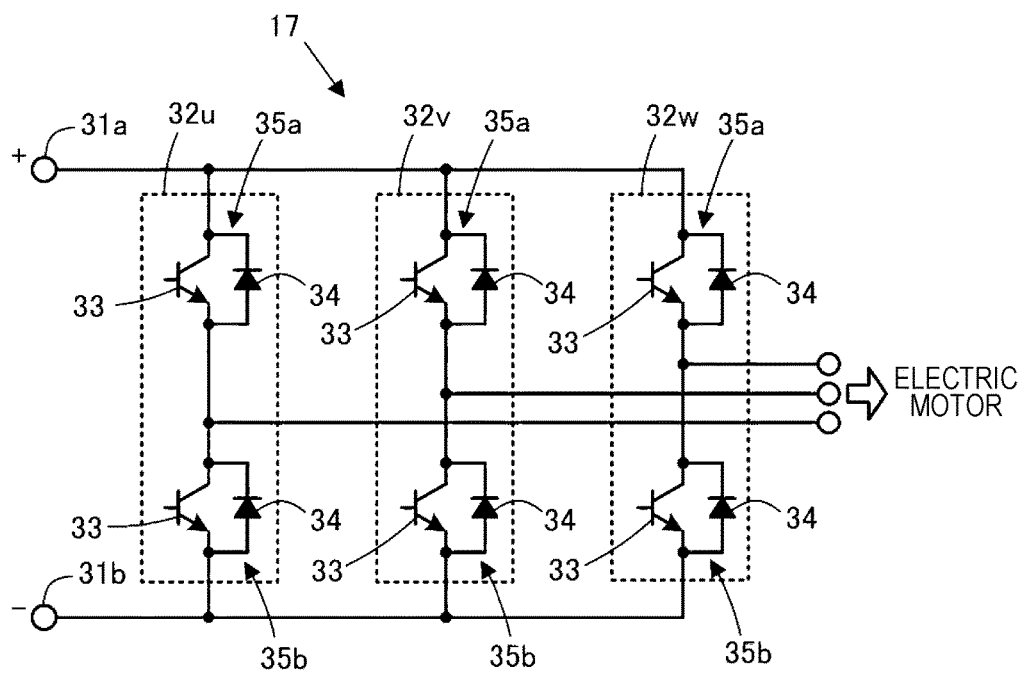
FIG. 3 illustrates an example circuit configuration of an inverter in the power supply system according to the embodiments.

The inverter 17 may be an inverter having a known circuit configuration. FIG. 3 illustrates an example circuit configuration of the inverter 17 when the electric motor 100 is a three-phase electric motor, for example. The inverter 17 illustrated in FIG. 3 is configured such that three-phase arms 32u, 32v, and 32w of the U, V, and W phases are connected in parallel between a pair of power supply terminals 31a and 31b to which a DC voltage is applied. Each of the arms 32u, 32v, and 32w of the respective phases includes high-side and low-side two switch units 35a and 35b that are connected in series. Each of the switch units 35a and 35b includes a diode 34 and a semiconductor switch element 33 such as a transistor that are connected in parallel. The midpoints of the switch units 35a and 35b of the arms 32u, 32v, and 32w of the respective phases serve as three-phase AC power output units.

The inverter 17 having the configuration described above is capable of controlling the respective semiconductor switch elements 33 of the switch units 35a and 35b of the arms 32u, 32v, and 32w of the respective phases to be turned on or off in accordance with a control signal generated by using the pulse width modulation (PWM) control method or the like to convert a DC power input to the power supply terminals 31a and 31b into three-phase AC power, and outputting the AC power to the electric motor 100 (the electric motor 100 which is in power-running operation).

During the regenerative operation of the electric motor 100 (during generation of power), the inverter 17 is capable of controlling the respective semiconductor switch elements 33 of the switch units 35a and 35b of the arms 32u, 32v, and 32w of the respective phases to be turned on or off in accordance with a control signal having a predetermined duty ratio (so-called duty signal) to convert a three-phase AC power input from the electric motor 100 into DC power, and outputting the DC power from the power supply terminals 31a and 31b.

For additional explanation, the number of phases (the number of arms) of the inverter 17 is set in accordance with the number of phases of the AC power necessary to activate the electric load. If the electric load is an electric load (e.g., a DC motor) activated by causing DC power to flow therethrough, the inverter 17 may be omitted.

The power transmission circuit unit 11 having the configuration described above is configured to control the voltage converters 15 and 16 and the inverter 17 (specifically, provide each of the voltage converters 15 and 16 and the inverter 17 with a control signal (duty signal having a predetermined duty ratio) for turning on or off the semiconductor switch element 25 or 33) to control power transmission among the first energy storage device 2, the second energy storage device 3, and the electric motor 100.

For example, during the power-running operation of the electric motor 100, power can be supplied from one or both of the first energy storage device 2 and the second energy storage device 3 to the electric motor 100 or power can be supplied from the first energy storage device 2 to the second energy storage device 3 to charge the second energy storage device 3, or one or both of the first energy storage device 2 and the second energy storage device 3 can be charged with regenerative power produced during the regenerative operation of the electric motor 100.

In this embodiment, the first energy storage device 2 is not charged with power supplied by the second energy storage device 3. However, the power transmission circuit unit 11 may be controlled to charge the first energy storage device 2 with power supplied by the second energy storage device 3.

The control device 5 is constituted by an electronic circuit unit including a central processing unit (CPU), a random access memory (RAM), a read-only memory (ROM), an interface circuit, and so on. The control device 5 may be constituted by a plurality of electronic circuit units that are capable of communicating with each other.

The control device 5 includes a power transmission controller 41 and a remaining capacity detector 42 as functions implemented by a hardware configuration to be mounted therein or a program (software configuration) installed therein. The power transmission controller 41 controls the power transmission circuit unit 11 to control power transmission among the first energy storage device 2, the second energy storage device 3, and the electric motor 100. The remaining capacity detector 42 detects the respective remaining capacities (called states of charge (SOCs)) of the first energy storage device 2 and the second energy storage device 3.

The control device 5 receives a driving/braking force demand, a control mode, and various kinds of sensing data as information necessary to implement the functions described above. The driving/braking force demand is constituted by a driving force demand that is a request value for a driving force (driving torque) to be generated by the electric motor 100 during the power-running operation or a braking force demand that is a request value for a braking force (regenerative torque) to be generated by the electric motor 100 during the regenerative operation. The control mode specifies how the power transmission circuit unit 11 is controlled.

The driving/braking force demand is set by a vehicle control device (not illustrated) while an electrically driven vehicle in which the power supply system 1 according to this embodiment is mounted is traveling, in accordance with values such as the respective detected values of the amount of operation of the accelerator pedal and the amount of operation of the brake pedal.

The control device 5 may have a function of setting a driving/braking force demand.

The control mode is set by, for example, the driver of the electrically driven vehicle by operating a mode switching operation device (not illustrated). In this embodiment, three control modes, namely, first to third control modes described below, are selectively set for the control device 5. The control mode may be automatically set in accordance with the state of travel of the electrically driven vehicle, the environment in which the electrically driven vehicle is traveling, or the like.

As to the sensing data, for example, the following data is input to the control device 5: the detection data of a current sensor 51, a voltage sensor 52, a temperature sensor 53, a current sensor 54, a voltage sensor 55, a temperature sensor 56, a current sensor 57, a voltage sensor 58, a current sensor 59, a current sensor 60, a voltage sensor 61, a current sensor 62, and a voltage sensor 63. The current sensor 51 detects a current flowing through the first energy storage device 2. The voltage sensor 52 detects an output voltage of the first energy storage device 2. The temperature sensor 53 detects a temperature of the first energy storage device 2. The current sensor 54 detects a current flowing through the second energy storage device 3. The voltage sensor 55 detects an output voltage of the second energy storage device 3. The temperature sensor 56 detects a temperature of the second energy storage device 3. The current sensor 57 and the voltage sensor 58 detect a current and voltage on the input side of the voltage converter 15 (the first energy storage device 2 side), respectively. The current sensor 59 detects a current on the output side of the voltage converter 15 (the inverter 17 side). The current sensor 60 and the voltage sensor 61 detect a current and voltage on the input side of the voltage converter 16 (the second energy storage device 3 side), respectively. The current sensor 62 detects a current on the output side of the voltage converter 16 (the inverter 17 side). The voltage sensor 63 detects a voltage on the input side of the inverter 17 (the voltages on the respective output sides of the voltage converters 15 and 16). The above-described pieces of detection data are input to the control device 5.

The remaining capacity detector 42 of the control device 5 sequentially detects (estimates) the remaining capacity of the first energy storage device 2 by using the detection data of the sensors for the first energy storage device 2, namely, the current sensor 51, the voltage sensor 52, and the temperature sensor 53, for example. Further, the remaining capacity detector 42 sequentially detects (estimates) the remaining capacity of the second energy storage device 3 by using the detection data of the sensors for the second energy storage device 3, namely, the current sensor 54, the voltage sensor 55, and the temperature sensor 56, for example.

There have hitherto been proposed a variety of techniques for detecting the remaining capacity of an energy storage device. A known technique may be employed as a technique for detecting the remaining capacities of the first energy storage device 2 and the second energy storage device 3.

The technique for detecting the respective remaining capacities of the first energy storage device 2 and the second energy storage device 3 may be a technique that does not use the detection data of any one of the current flow, the output voltage, and the temperature, or a technique that uses any other detection data. A detection device different from the control device 5 may perform a process of detecting the respective remaining capacities of the first energy storage device 2 and the second energy storage device 3.

The power transmission controller 41 controls the voltage converters 15 and 16 and the inverter 17 of the power transmission circuit unit 11 by using, if necessary, for example, the detection data of the current sensors 57, 59, 60, and 62 and the voltage sensors 58, 61, and 63, the driving/braking force demand of the electric motor 100, and the detected values of the respective remaining capacities of the first energy storage device 2 and the second energy storage device 3, which are obtained by the remaining capacity detector 42.

Control Process for Power Transmission Controller

Next, a control process for the power transmission controller 41 of the control device 5 will be described in detail hereinafter.

Figure 4:
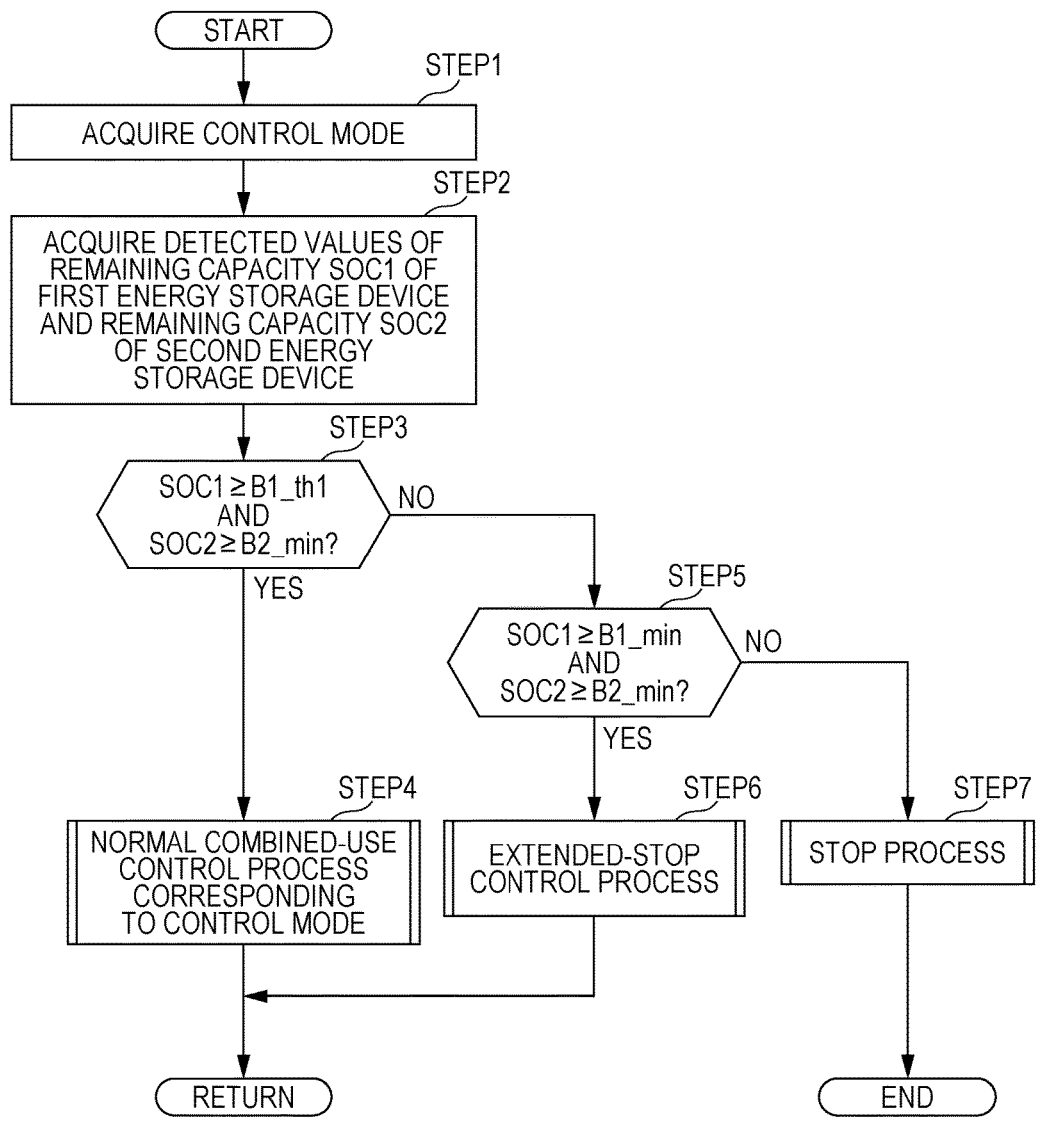
FIG. 4 is a flowchart of a control process for a control device in the power supply system according to the embodiments.

During the travel of the vehicle, the control device 5 sequentially executes a control process illustrated in a flowchart in FIG. 4 by using the power transmission controller 41 at intervals of a predetermined control process period. The control process illustrated in the flowchart in FIG. 4 is a control process performed during the power-running operation of the electric motor 100.

In STEP1, the power transmission controller 41 acquires the currently set control mode. In STEP2, the power transmission controller 41 further acquires, from the remaining capacity detector 42, a detected value of a remaining capacity SOC1 of the first energy storage device 2 (hereinafter sometimes referred to as the first remaining capacity SOC1) and a detected value of a remaining capacity SOC2 of the second energy storage device 3 (hereinafter sometimes referred to as the second remaining capacity SOC2).

Then, in STEP3, the power transmission controller 41 determines whether or not the following conditions hold true: the detected value of the first remaining capacity SOC1 is greater than or equal to a predetermined threshold value B1_th1 and the detected value of the second remaining capacity SOC2 is greater than or equal to a predetermined lower limit B2_min.

The threshold value B1_th1 for the first remaining capacity SOC1 is a threshold value determined in advance as a limit value of the first remaining capacity SOC1 which is required for a normal combined-use control process described below. The threshold value B1_th1 may be, for example, a limit remaining capacity value that allows only the first energy storage device 2 to supply a supplied power required for the electric motor 100 to generate a constant output (e.g., a supplied power required for the vehicle to cruise at a predetermined vehicle speed) to the electric motor 100. The threshold value B1_th1 is set to a value slightly higher than a lower limit B1_min (a near-zero value). The lower limit B1_min is a limit remaining capacity value that allows the first energy storage device 2 to supply power to outside so as not to cause deterioration of the first energy storage device 2.

The lower limit B2_min for the second remaining capacity SOC2 is a limit remaining capacity value (a near-zero value) that allows the second energy storage device 3 to supply power to outside so as not to cause deterioration of the second energy storage device 3.

The determination result of STEP3 is affirmative when the first remaining capacity SOC1 and the second remaining capacity SOC2 take values that fall in a normal range (common range). In this situation, in STEP4, the power transmission controller 41 executes a normal combined-use control process corresponding to the currently set control mode. The normal combined-use control process is a process for controlling the power transmission circuit unit 11 to supply power from one or both of the first energy storage device 2 and the second energy storage device 3 to the electric motor 100 in a manner corresponding to the control mode and to, when power is supplied from the first energy storage device 2 to the electric motor 100, supply power from the first energy storage device 2 to charge the second energy storage device 3, if necessary. The details of the normal combined-use control process will be described below.

The normal combined-use control process allows the second energy storage device 3 to be charged with power supplied from the first energy storage device 2, if necessary, whereas the remaining capacity SOC1 of the first energy storage device 2 decreases. Thus, the first remaining capacity SOC1 becomes smaller than the threshold value B1_th1 and the determination result of STEP3 becomes negative.

If the determination result of STEP3 is negative, then, in STEP5, the power transmission controller 41 determines whether or not the following conditions hold true: the detected value of the first remaining capacity SOC1 is greater than or equal to the lower limit B1_min and the detected value of the second remaining capacity SOC2 is greater than or equal to the lower limit B2_min.

The determination result of STEP5 is affirmative when, in particular, the remaining capacity of the first energy storage device 2 is low but it is possible to supply power to the electric motor 100 for a certain time period by the cooperation of the first energy storage device 2 and the second energy storage device 3 so as to allow the electric motor 100 to generate a demanded driving force.

In this situation, in STEP6, the power transmission controller 41 executes an extended-stop control process. The extended-stop control process is a process for controlling the power transmission circuit unit 11 so that the remaining capacity of both the first energy storage device 2 and the second energy storage device 3 is consumed as much as possible. The details of the extended-stop control process will be described below.

The determination result of STEP5 is negative when it is difficult to supply power from the first energy storage device 2 and the second energy storage device 3 to the electric motor 100. In this situation, the power transmission controller 41 executes a stop process in STEP7. In the stop process, the power transmission controller 41 controls the voltage converters 15 and 16 or the contactors 12 and 13 to interrupt the output of the first energy storage device 2 and the second energy storage device 3 (discharging to the load side) and to hold the interruption state.

In the stop process, the control device 5 generates an alarm output (visual output or audio output) to alert the vehicle driver that, for example, the vehicle is no longer able to travel or the electric motor 100 is no longer able to operate due to the insufficient remaining capacity of the first energy storage device 2 and the second energy storage device 3.

Normal Combined-Use Control Process

The normal combined-use control process in STEP4 will now be described in detail. Brief definitions of terms as used in the following description are presented below.

In the following description, the "output" or "input", or "supplied power" or "charging power", of each of the first energy storage device 2 and the second energy storage device 3 refers to an amount of electricity expressed as a value of (electric) power (an amount of electrical energy per unit time), for example.

The "supplied power corresponding to a driving force demand DT_dmd" of the electric motor 100 refers to a supplied power that allows a driving force generated by the electric motor 100 when this power is supplied to the electric motor 100 to be identical to or substantially identical to the driving force demand DT_dmd.

The "supplied power corresponding to the driving force demand DT_dmd" is based on the driving force demand DT_dmd and the rotational speed of the electric motor 100 (specifically, the rotational speed of a rotor or an output shaft of the electric motor 100) when the "supplied power" refers to an amount of electricity expressed as a value of (electric) power. The value of the "supplied power corresponding to the driving force demand DT_dmd" can be determined from, for example, the driving force demand DT_dmd and the detected value of the rotational speed of the electric motor 100 by using a map or an operational expression.

The "supplied power corresponding to a certain threshold value" regarding the driving force demand DT_dmd refers to a supplied power corresponding to the driving force demand DT_dmd if the driving force demand DT_dmd is made to match the threshold value.

First Control Mode

Based on the terms defined above, a case where the control mode is set to the first control mode, which is a basic control mode among the first to third control modes, will be described with reference to FIG. 5 to FIG. 10.

The first control mode is a control mode for controlling the power transmission circuit unit 11 so that the progression of deterioration of the first energy storage device 2 and the second energy storage device 3 can be restrained as much as possible.

Figure 5:
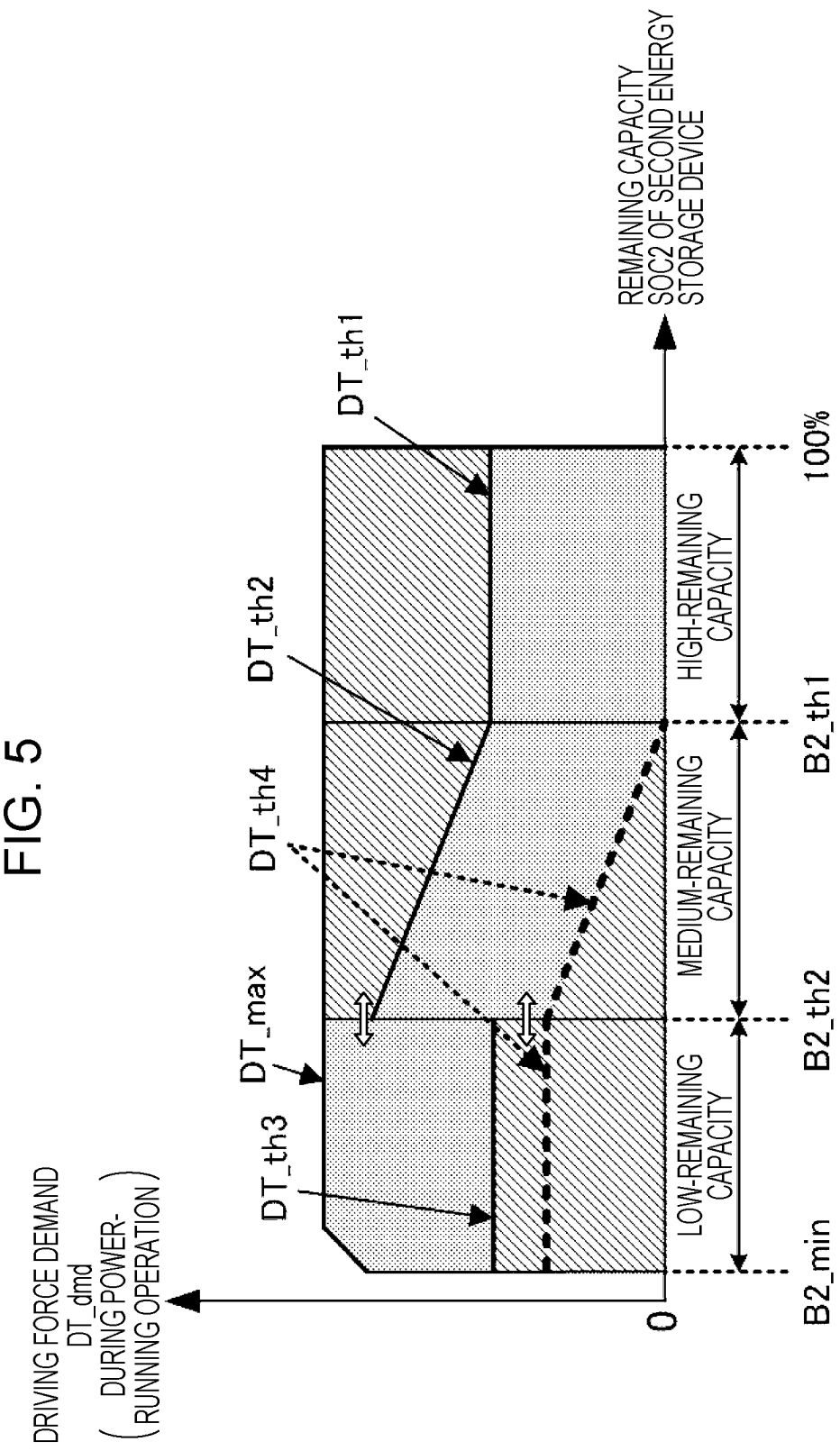
FIG. 5 illustrates, in map form, the relationship between a driving force demand and the remaining capacity of a second energy storage device in a normal combined-use control process in a first control mode, which is executed in STEP4 in FIG. 4.

An overview of the normal combined-use control process in the first control mode will be described with reference to FIG. 5. FIG. 5 illustrates, in map form, the relationship in the first control mode between the second remaining capacity SOC2 and shares allocated to the respective outputs of the first energy storage device 2 and the second energy storage device 3 with respect to the amount of electricity (supplied power) to be supplied to the electric motor 100 in accordance with the driving force demand DT_dmd of the electric motor 100.

In FIG. 5, diagonally hatched areas represent areas within which the first energy storage device 2 is responsible for supplying part or all of the power to be supplied to the electric motor 100, and shaded areas represent areas within which the second energy storage device 3 is responsible for supplying part or all of the power to be supplied to the electric motor 100.

More specifically, diagonally hatched areas adjoining the line (horizontal axis) along which the driving force demand DT_dmd=0 holds represent areas within which the first energy storage device 2 is responsible for supplying all of the power to be supplied to the electric motor 100, and a shaded area adjoining the line (horizontal axis) represents an area within which the second energy storage device 3 is responsible for supplying all of the power to be supplied to the electric motor 100.

Further, shaded areas above the diagonally hatched areas or diagonally hatched areas above the shaded areas represent areas within which both the first energy storage device 2 and the second energy storage device 3 are responsible for supplying the power to be supplied to the electric motor 100.

In the normal combined-use control process in the first control mode, as illustrated in FIG. 5, shares allocated to the respective outputs of the first energy storage device 2 and the second energy storage device 3 in accordance with the driving force demand DT_dmd of the electric motor 100 are determined for each of the cases where the value of the second remaining capacity SOC2 falls within a high-remaining-capacity area that satisfies SOC2≥B2_th1 (including the remaining capacity value reaching full state-of-charge (100%)), where the value of the second remaining capacity SOC2 falls within a medium-remaining-capacity area that satisfies B2_th1>SOC2≥B2_th2, and where the value of the second remaining capacity SOC2 falls within a low-remaining-capacity area that satisfies B2_th2>SOC2. The supplied power corresponding to the driving force demand DT_dmd of the electric motor 100 is supplied from one or both of the first energy storage device 2 and the second energy storage device 3 to the electric motor 100 in the proportion of the shares for each of the high-, medium-, and low-remaining-capacity areas.

In this embodiment, the normal combined-use control process is a process performed when the detected value of the second remaining capacity SOC2 is greater than or equal to the lower limit B2_min. Thus, the low-remaining-capacity area is, more specifically, a remaining-capacity area that satisfies B2_th2>SOC2≥B2_min.

In FIG. 5, the threshold values B2_th1 and B2_th2 by which the second remaining capacity SOC2 is separated are predetermined threshold values (fixed values) for the first control mode. The threshold values B2_th1 and B2_th2 are set in advance based on an experiment or the like so that the medium-remaining-capacity area whose range is defined by the threshold values B2_th1 and B2_th2 is a remaining-capacity area within which the actual value of the second remaining capacity SOC2 preferably falls to restrain the progression of deterioration of the second energy storage device 3 as much as possible. Accordingly, the medium-remaining-capacity area whose range is defined by the threshold values B2_th1 and B2_th2 is a remaining-capacity area within which the progression of deterioration of the second energy storage device 3 can be desirably restrained when the second energy storage device 3 is charged or discharged with the actual value of the second remaining capacity SOC2 being kept within the medium-remaining-capacity area as much as possible.

The normal combined-use control process in the first control mode will now be described in a specific manner.

Figure 6:
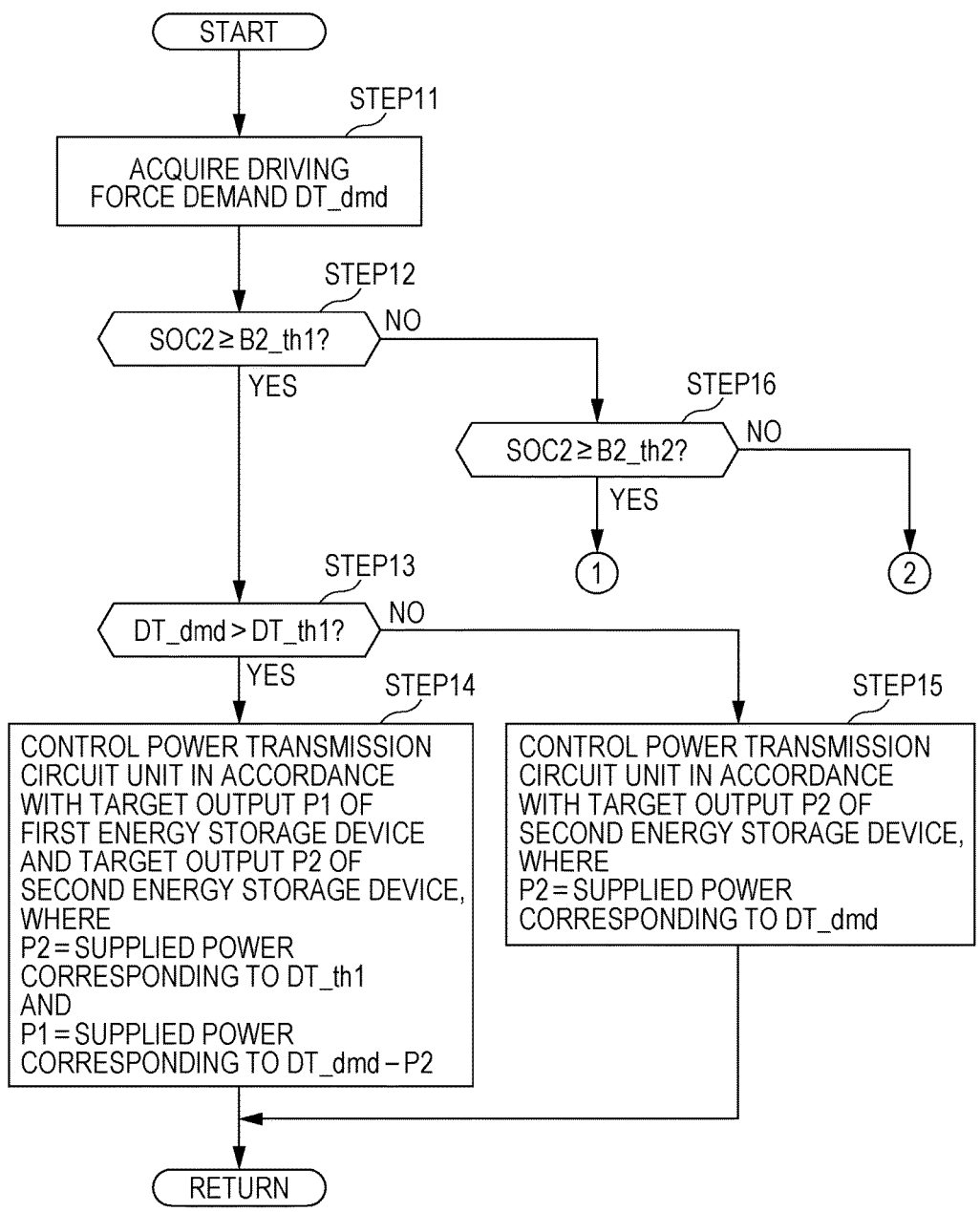
FIG. 6 is a flowchart illustrating the normal combined-use control process executed in STEP4 in FIG. 4.
Figure 7:
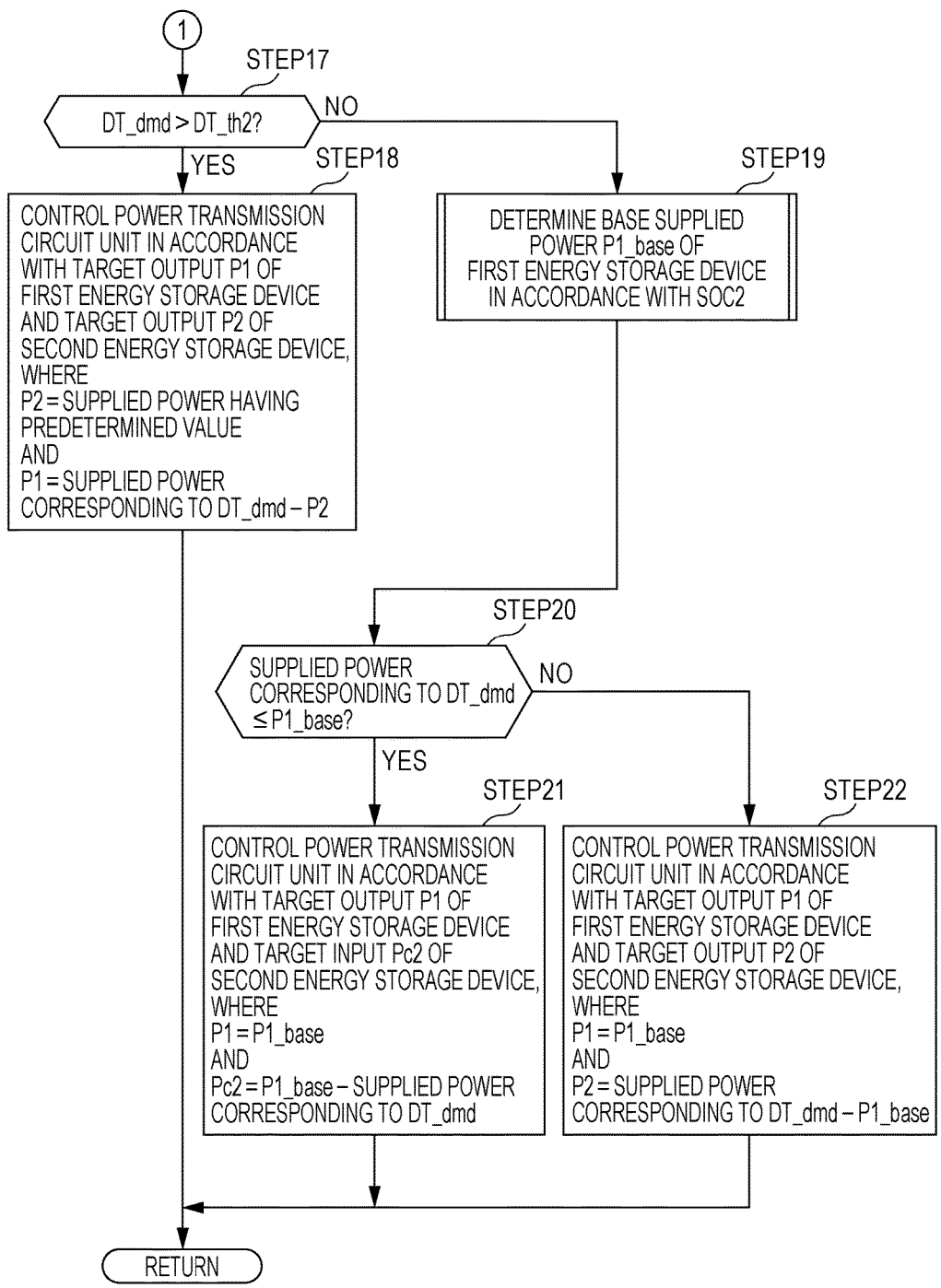
FIG. 7 is a flowchart illustrating the normal combined-use control process executed in STEP4 in FIG. 4.
Figure 8:
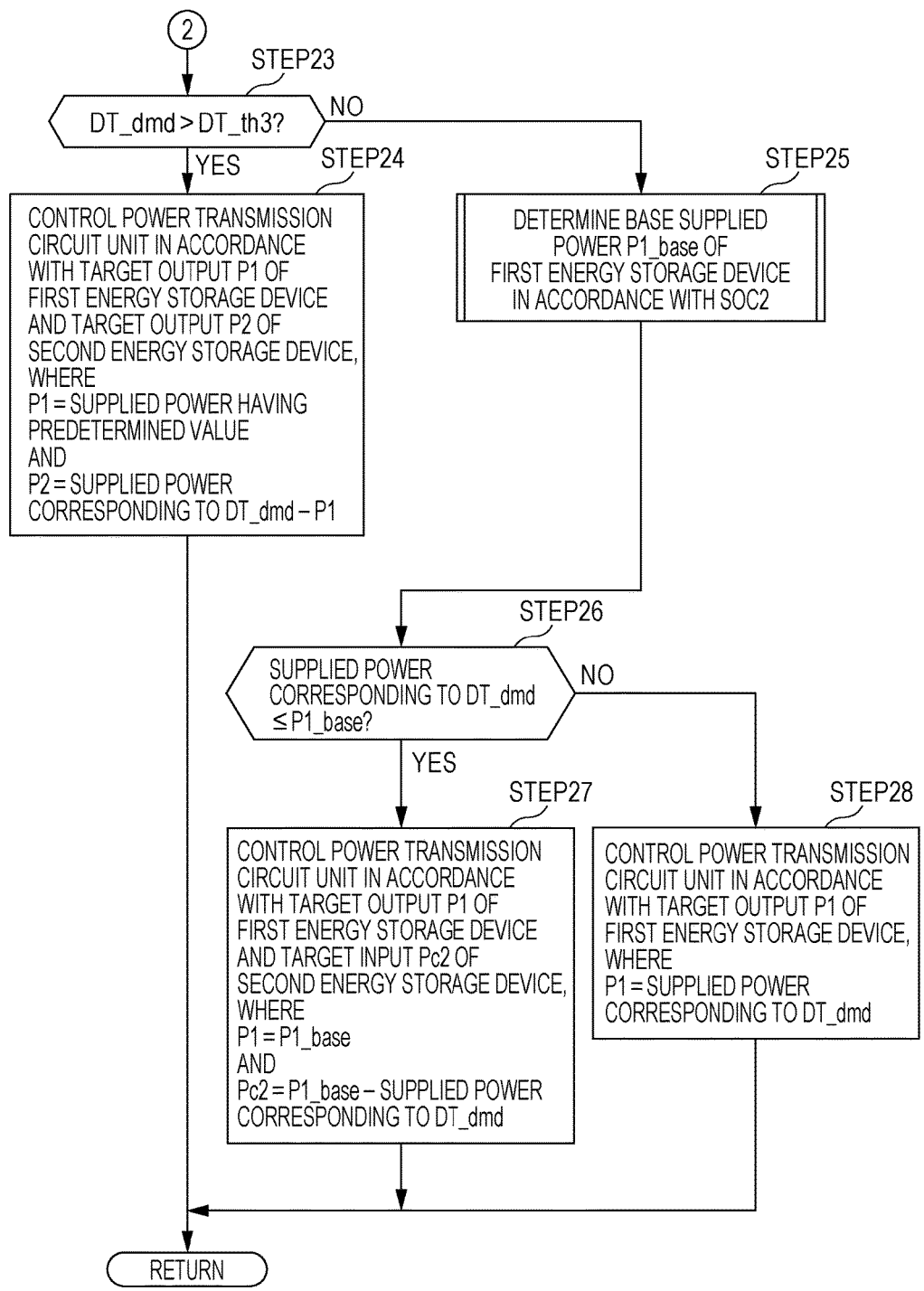
FIG. 8 is a flowchart illustrating the normal combined-use control process executed in STEP4 in FIG. 4.

In the normal combined-use control process, the power transmission controller 41 sequentially executes a process illustrated in a flowchart in FIG. 6 to FIG. 8 at intervals of a predetermined control process period.

In STEP11, the power transmission controller 41 acquires the driving force demand DT_dmd of the electric motor 100. Then, in STEP12, the power transmission controller 41 determines whether or not the detected value of the second remaining capacity SOC2 acquired in STEP2 is greater than or equal to the threshold value B2_th1, which is the lower limit of the high-remaining-capacity area.

The determination result of STEP12 is affirmative when the detected value of the second remaining capacity SOC2 falls within the high-remaining-capacity area. In this case, then, in STEP13, the power transmission controller 41 determines whether or not the driving force demand DT_dmd is greater than a predetermined threshold value DT_th1.

In an example of this embodiment, the threshold value DT_th1 is a predetermined constant value (fixed value). The threshold value DT_th1 may be, for example, an upper-limit driving force value, or a nearby driving force value, that can be generated by the electric motor 100 using power supplied only from the second energy storage device 3 when the second remaining capacity SOC2 falls within the high-remaining-capacity area. The threshold value DT_th1 may be set to be variable by using, for example, the detected value of the temperature of the second energy storage device 3, which is obtained by the temperature sensor 56, in order to more appropriately prevent deterioration of the second energy storage device 3.

The determination result of STEP13 is affirmative within the diagonally hatched area in the high-remaining-capacity area illustrated in FIG. 5. In this case, in STEP14, the power transmission controller 41 causes an output target value (target output) P2 of the second energy storage device 3 to match the supplied power corresponding to the threshold value DT_th1 and causes an output target value (target output) P1 of the first energy storage device 2 to match the power deficit, which is obtained by subtracting the target output P2, which is a power that the second energy storage device 3 is responsible for supplying, from the supplied power corresponding to the driving force demand DT_dmd. Then, the power transmission controller 41 controls the power transmission circuit unit 11 in accordance with the target outputs P1 and P2.

The output of the first energy storage device 2 is, specifically, an amount of electricity (an amount of discharge power) output from the first energy storage device 2, and the output of the second energy storage device 3 is, specifically, an amount of electricity (an amount of discharge power) output from the second energy storage device 3.

Accordingly, the supplied power corresponding to the driving force demand DT_dmd is fed from both the first energy storage device 2 and the second energy storage device 3 to the electric motor 100 in such a manner that the sum of the respective outputs of the first energy storage device 2 and the second energy storage device 3 matches the supplied power corresponding to the driving force demand DT_dmd. In this case, a portion of the supplied power corresponding to the driving force demand DT_dmd, which corresponds to the output of the second energy storage device 3, is set to the supplied power corresponding to the threshold value DT_th1.

Specifically, the processing of STEP14 can be executed in the following way, for example. A target value for the input voltage of the inverter 17 (=the output voltages of the voltage converters 15 and 16) is set in accordance with the detected value of the rotational speed of the electric motor 100 or the like. Further, the target outputs P1 and P2 are set as the target values of the output powers of the voltage converters 15 and 16, respectively.

Further, the voltage converters 15 and 16 are controlled by using a control signal (duty signal) so as to realize the target value for the input voltage of the inverter 17 and the target values for the respective output powers of the voltage converters 15 and 16. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the respective outputs of the energy storage devices 2 and 3).

The processing of STEP14 is, more specifically, a process performed when the target output P1 of the first energy storage device 2 or the target output P2 of the second energy storage device 3 is set when none of the target outputs P1 and P2 discontinuously changes. A process performed when the target outputs P1 and P2 discontinuously change will be described below. The same applies to the processing of STEP15, STEP18, STEP21, STEP22, STEP24, STEP27, and STEP 28 described below.

On the other hand, the determination result of STEP13 is negative within the shaded area in the high-remaining-capacity area illustrated in FIG. 5. In this case, in STEP15, the power transmission controller 41 causes the target output P2 of the second energy storage device 3 to match the supplied power corresponding to the driving force demand DT_dmd. Then, the power transmission controller 41 controls the power transmission circuit unit 11 in accordance with the target output P2. In this control, the target output P1 of the first energy storage device 2 is zero.

Accordingly, the supplied power corresponding to the driving force demand DT_dmd is fed to the electric motor 100 only from the second energy storage device 3 without using the first energy storage device 2.

Specifically, the processing of STEP15 (a process performed when none of the target outputs P1 and P2 discontinuously changes) can be executed in the following way, for example. A target value for the input voltage of the inverter 17 (=the output voltage of the voltage converter 16) is set in accordance with the detected value of the rotational speed of the electric motor 100 or the like. Further, the target output P2 is set as the target value for the output power of the voltage converter 16.

Further, the voltage converter 16 is controlled so as to realize the target value for the input voltage of the inverter 17 and the target value for the output power of the voltage converter 16. Also, the inverter 17 is feedback-controlled so as to cause the target current corresponding to the driving force demand DT_dmd to flow through the electric motor 100.

Furthermore, the voltage converter 15 is controlled to be in current flow interruption state. Alternatively, the contactor 12 on the first energy storage device 2 side is controlled to be turned off.

As described above, when the detected value of the second remaining capacity SOC2 falls within the high-remaining-capacity area, power is supplied to the electric motor 100 from an energy storage device including at least the second energy storage device 3 out of the first energy storage device 2 and the second energy storage device 3 during the power-running operation of the electric motor 100. This allows the second energy storage device 3 to be actively discharged to make the remaining capacity SOC2 of the second energy storage device 3 approach the medium-remaining-capacity area. Accordingly, it is achievable to suppress or reduce deterioration of the second energy storage device 3 while meeting the driving force demand DT_dmd of the electric motor 100.

For additional explanation, the threshold value DT_th1, which is used in the determination processing in STEP13, may be set in a way different from that described above. For example, the threshold value DT_th1 may be set so that the supplied power corresponding to the threshold value DT_th1 is equal to a predetermined constant value (e.g., an upper-limit supplied power that can be output by the second energy storage device 3 within the high-remaining-capacity area or a nearby constant value of supplied power). The threshold value DT_th1 may also be set to vary depending on the detected value of the second remaining capacity SOC2.

If the determination result of STEP12 is negative, in STEP16, the power transmission controller 41 further determines whether or not the detected value of the second remaining capacity SOC2 is greater than or equal to the threshold value B2_th2, which is the lower limit of the medium-remaining-capacity area.

The determination result of STEP16 is affirmative when the detected value of the second remaining capacity SOC2 falls within the medium-remaining-capacity area. In this situation, then, in STEP17 (see FIG. 7), the power transmission controller 41 determines whether or not the driving force demand DT_dmd is greater than a predetermined threshold value DT_th2.

In an example of this embodiment, for example, as illustrated in FIG. 5, the predetermined threshold value DT_th2 is a threshold value set to be variable in accordance with the detected value of the second remaining capacity SOC2. Specifically, the threshold value DT_th2 is set so that the threshold value DT_th2 increases as the detected value of the second remaining capacity SOC2 decreases. In addition, the threshold value DT_th2 is set to a driving force value greater than a driving force that can be generated by the electric motor 100 when a base supplied power P1_base, described below, is supplied to the electric motor 100.

The determination result of STEP17 is affirmative within the diagonally hatched area above the shaded area in the medium-remaining-capacity area illustrated in FIG. 5. In this case, in STEP18, the power transmission controller 41 causes the target output P2 of the second energy storage device 3 to match supplied power having a predetermined value and causes the target output P1 of the first energy storage device 2 to match the power deficit, which is obtained by subtracting the target output P2 of the second energy storage device 3 from the supplied power corresponding to the driving force demand DT_dmd. Then, the power transmission controller 41 controls the power transmission circuit unit 11 in accordance with the target outputs P1 and P2.

In this case, specific control of the power transmission circuit unit 11 can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the respective outputs of the first energy storage device 2 and the second energy storage device 3 matches the supplied power corresponding to the driving force demand DT_dmd. In this case, the share of the supplied power corresponding to the driving force demand DT_dmd which is taken by the second energy storage device 3 is set to the supplied power having the predetermined value.

The supplied power having the predetermined value to be output from the second energy storage device 3 may be, for example, an upper-limit supplied power that can be output by the second energy storage device 3 within the medium-remaining-capacity area or a nearby constant value of supplied power. Alternatively, the supplied power having the predetermined value may be, for example, a supplied power set to vary depending on the detected value of the second remaining capacity SOC2.

On the other hand, if the determination result of STEP17 is negative, then, in STEP19, the power transmission controller 41 determines the base supplied power P1_base, which is a "base" value of the target output P1 of the first energy storage device 2, in accordance with the detected value of the second remaining capacity SOC2.

The base supplied power P1_base is a lower limit amount of electricity to be output from the first energy storage device 2 regardless of the driving force demand DT_dmd when the detected value of the second remaining capacity SOC2 falls within the medium-remaining-capacity area or the low-remaining-capacity area. That is, in this embodiment, the power transmission circuit unit 11 is controlled so that the base supplied power P1_base or a larger supplied power is output from the first energy storage device 2 regardless of the driving force demand DT_dmd when the detected value of the second remaining capacity SOC2 falls within the medium-remaining-capacity area or the low-remaining-capacity area.

Figure 9:
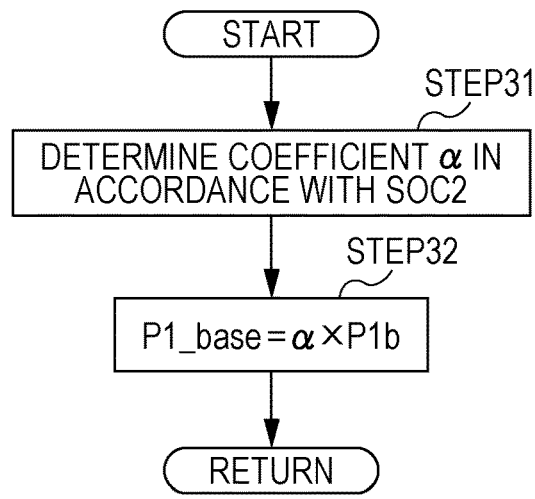
FIG. 9 is a flowchart illustrating the processing of STEP19 in FIG. 7 or STEP25 in FIG. 8.

The base supplied power P1_base is set in a way illustrated in a flowchart in FIG. 9, for example. Specifically, in STEP31, the power transmission controller 41 determines a coefficient α in accordance with the detected value of the second remaining capacity SOC2. The coefficient α specifies a pattern in which the base supplied power P1_base changes in accordance with the detected value of the second remaining capacity SOC2.

Figure 10:
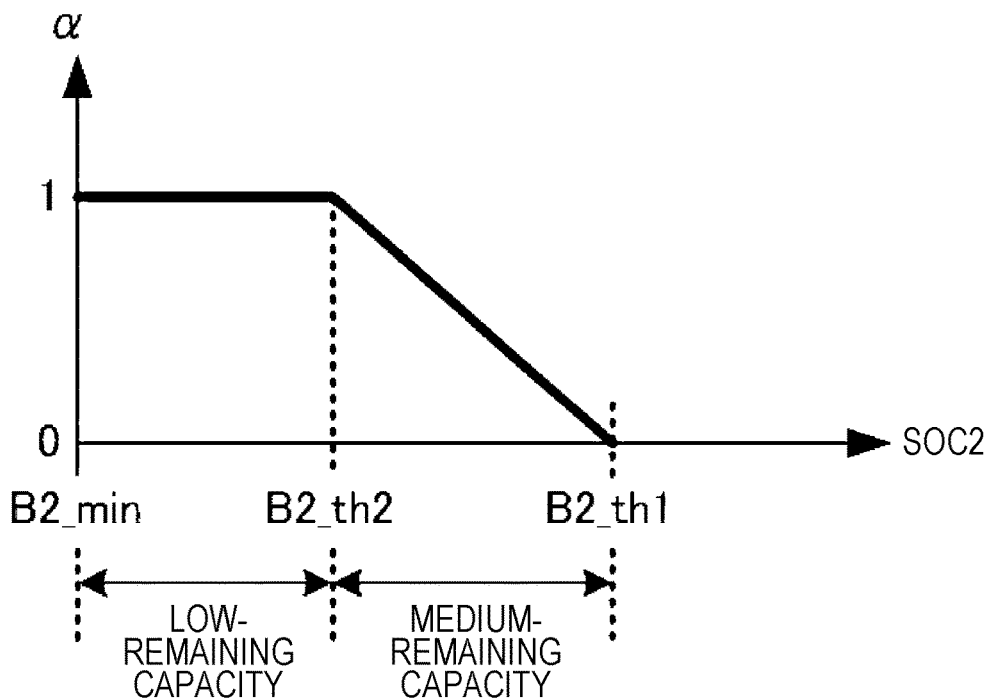
FIG. 10 is a graph illustrating the relationship between a coefficient α, which is used in the process illustrated in FIG. 9, and the remaining capacity of the second energy storage device.

The coefficient α is set from the detected value of the second remaining capacity SOC2 in accordance with, for example, a pattern depicted on a graph in FIG. 10 by using a map created in advance or by using an operational expression. In the illustrated example, the coefficient α takes a value in the range from "0" to "1". The value of the coefficient α is basically set to increase as the detected value of the second remaining capacity SOC2 decreases within a remaining capacity area (low-side remaining capacity area) obtained by combining the medium-remaining-capacity area and the low-remaining-capacity area of the second energy storage device 3.

More specifically, when the detected value of the second remaining capacity SOC2 falls within the medium-remaining-capacity area, the value of the coefficient α is set to successively increase from "0" to "1" as the detected value of the second remaining capacity SOC2 decreases from the upper-limit threshold value B2_th1 to the lower-limit threshold value B2_th2 of the medium-remaining-capacity area.

When the detected value of the second remaining capacity SOC2 falls within the low-remaining-capacity area, the value of the coefficient α is set to the maximum value "1".

Then, in STEP32, the power transmission controller 41 multiplies a supplied power P1b having a predetermined value (fixed value) by the value of the coefficient α, which is determined in the way described above, to calculate the base supplied power P1_base (=α×P1b). The supplied power P1b is a maximum value of the base supplied power P1_base.

Accordingly, the base supplied power P1_base is determined to change in the same or substantially the same pattern as that for the coefficient α in accordance with the detected value of the second remaining capacity SOC2.

The base supplied power P1_base may be defined by, for example, setting an upper limit of the output of the first energy storage device 2 in accordance with the detected value of the first remaining capacity SOC1 or the like and, when the base supplied power P1_base calculated in the way described above exceeds the upper limit, executing a limiting process subsequently to the processing of STEP32 to forcibly limit the base supplied power P1_base to the upper limit.

Alternatively, for example, the base supplied power P1_base may be determined, instead of by performing the processing of STEP31 and STEP32, directly from the detected value of the second remaining capacity SOC2 by using a map created in advance or by using an operational expression.

Referring back to FIG. 7, after the processing of STEP19 has been executed in the way described above, then, in STEP20, the power transmission controller 41 determines whether or not the supplied power corresponding to the driving force demand DT_dmd is less than or equal to the base supplied power P1_base. The determination processing in STEP20 is equivalent to a process of determining whether or not the driving force demand DT_dmd is less than or equal to a threshold value obtained by converting the base supplied power P1_base into a driving force value in accordance with the detected value of the rotational speed of the electric motor 100. This threshold value is a threshold value DT_th4 indicated by a broken line in FIG. 5. The threshold value DT_th4 indicated by the broken line in FIG. 5 is a threshold value obtained when the rotational speed of the electric motor 100 is set to be constant.

The determination result of STEP20 is affirmative within the bottom diagonally hatched area in the medium-remaining-capacity area illustrated in FIG. 5. In this situation, in STEP21, the power transmission controller 41 causes the target output P1 of the first energy storage device 2 to match the base supplied power P1_base and causes the input of the second energy storage device 3, that is, a target value (target input) Pc2 of the amount of charging power, to match the surplus power (surplus supplied power) obtained by subtracting the supplied power corresponding to the driving force demand DT_dmd from the base supplied power P1_base. Then, the power transmission controller 41 controls the power transmission circuit unit 11 in accordance with the target output P1 and the target input Pc2.

Accordingly, the base supplied power P1_base, which is set in the way described above in accordance with the detected value of the second remaining capacity SOC2, is output from the first energy storage device 2 regardless of the driving force demand DT_dmd. In addition, a supplied power that is a portion of the base supplied power P1_base corresponding to the driving force demand DT_dmd is fed from the first energy storage device 2 to the electric motor 100 and the surplus supplied power obtained by subtracting the supplied power that is a portion of the base supplied power P1_base corresponding to the driving force demand DT_dmd from the base supplied power P1_base is supplied from the first energy storage device 2 to charge the second energy storage device 3.

Specifically, the processing of STEP21 (a process performed when none of the target output P1 and the target input Pc2 discontinuously changes) can be executed in the following way, for example. A target value for the input voltage of the inverter 17 (=the output voltage of the voltage converter 15) is set in accordance with the detected value of the rotational speed of the electric motor 100 or the like. Further, the target output P1 of the first energy storage device 2 (=P1_base) is set as the target value for the output power of the voltage converter 15 and the target input Pc2 of the second energy storage device 3 is set as the target value for the power to be supplied from the input side of the voltage converter 16 (the second energy storage device 3 side) to the second energy storage device 3.

Further, the voltage converter 15 is controlled so as to realize the target value for the input voltage of the inverter 17 and the target value for the output power of the voltage converter 15, and the voltage converter 16 is controlled so as to realize the target value for the power to be supplied from the voltage converter 16 to the second energy storage device 3. Also, the inverter 17 is feedback-controlled so as to cause the target current corresponding to the driving force demand DT_dmd to flow through the electric motor 100.

When the base supplied power P1_base matches the supplied power corresponding to the driving force demand DT_dmd, the target input Pc1 of the second energy storage device 3 is zero. Thus, the voltage converter 16 is controlled to be in current flow interruption state or the contactor 13 on the second energy storage device 3 side is controlled to be turned off.

On the other hand, the determination result of STEP20 is negative within the shaded area in the medium-remaining-capacity area illustrated in FIG. 5. In this case, in STEP22, the power transmission controller 41 causes the target output P1 of the first energy storage device 2 to match the base supplied power P1_base and causes the target output P2 of the second energy storage device 3 to match the power deficit, which is obtained by subtracting the base supplied power P1_base from the supplied power corresponding to the driving force demand DT_dmd. Then, the power transmission controller 41 controls the power transmission circuit unit 11 in accordance with the target outputs P1 and P2.

In this case, a specific control process for the power transmission circuit unit 11 (a process performed when none of the target outputs P1 and P2 discontinuously changes) can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the respective outputs of the first energy storage device 2 and the second energy storage device 3 matches the supplied power corresponding to the driving force demand DT_dmd. In this case, a portion of the supplied power corresponding to the driving force demand DT_dmd, which corresponds to the output of the first energy storage device 2, is set to the base supplied power P1_base set in the way described above in accordance with the detected value of the second remaining capacity SOC2.

For additional explanation, when, in STEP22, the target output P2 of the second energy storage device 3 (the power deficit, which is obtained by subtracting the base supplied power P1_base from the supplied power corresponding to the driving force demand DT_dmd), exceeds the upper-limit supplied power that can be output by the second energy storage device 3 within the medium-remaining-capacity area, the target output P2 of the second energy storage device 3 may be limited to the upper-limit supplied power and processing similar to that of STEP18 may be performed to control the power transmission circuit unit 11.

Alternatively, the threshold value DT_th2 in the determination processing in STEP17 may be set so that a supplied power corresponding to the threshold value DT_th2 matches a value obtained by adding the upper-limit supplied power of the second energy storage device 3, or a nearby constant value of supplied power, to the base supplied power P1_base.

As described above, when the detected value of the second remaining capacity SOC2 falls within the medium-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the driving force demand DT_dmd is less than or equal to the threshold value DT_th2, the output of the first energy storage device 2 is kept at the base supplied power P1_base, which is set in accordance with the detected value of the second remaining capacity SOC2. If the base supplied power P1_base is greater than the supplied power corresponding to the driving force demand DT_dmd (in other words, if the driving force demand DT_dmd is less than the threshold value DT_th4, which is obtained by converting the base supplied power P1_base into a driving force value of the electric motor 100), a supplied power that is a portion of the base supplied power P1_base corresponding to the driving force demand DT_dmd is supplied only from the first energy storage device 2 to the electric motor 100 and, at the same time, the surplus supplied power is used to charge the second energy storage device 3.

Furthermore, when the driving force demand DT_dmd is less than or equal to the threshold value DT_th2, if the base supplied power P1_base is smaller than the supplied power corresponding to the driving force demand DT_dmd (in other words, if the driving force demand DT_dmd is greater than the threshold value DT_th4), the base supplied power P1_base is fed from the first energy storage device 2 to the electric motor 100, whereas the power deficit is fed from the second energy storage device 3 to the electric motor 100.

Thus, when the detected value of the second remaining capacity SOC2 falls within the medium remaining capacity, a situation in which power is supplied from the second energy storage device 3 to the electric motor 100 is less likely to occur than when the detected value of the second remaining capacity SOC2 falls within the high-remaining-capacity area. In addition, as the second remaining capacity SOC2 decreases, a range for the driving force demand DT_dmd over which power is supplied from the first energy storage device 2 to charge the second energy storage device 3 increases and the amount of charging power used to charge the second energy storage device 3 is more likely to increase.

As a result, the second remaining capacity SOC2 can be kept within the medium-remaining-capacity area as much as possible. Thus, the progression of deterioration of the second energy storage device 3 can be restrained as much as possible.

When the driving force demand DT_dmd is less than or equal to the threshold value DT_th2, the base supplied power P1_base to be output from the first energy storage device 2 is set in accordance with the second remaining capacity SOC2 regardless of the driving force demand DT_dmd. Thus, the output or the input of the second energy storage device 3 varies in accordance with a change in the driving force demand DT_dmd, whereas the output of the first energy storage device 2 varies with low sensitivity to changes in the driving force demand DT_dmd.

As a result, the output of the first energy storage device 2 is of high stability with less frequent changes. Thus, the progression of deterioration of the first energy storage device 2 can be restrained as much as possible.

The determination result of STEP16 is negative when the detected value of the second remaining capacity SOC2 falls within the low-remaining-capacity area. In this situation, then, in STEP23 (see FIG. 8), the power transmission controller 41 determines whether or not the driving force demand DT_dmd is greater than a predetermined threshold value DT_th3.

In an example of this embodiment, the predetermined threshold value DT_th3 is set to a predetermined constant value. In addition, the threshold value DT_th3 is set to a driving force value larger than a driving force that can be generated by the electric motor 100 when the base supplied power P1_base, which is set in the way described above in accordance with the second remaining capacity SOC2, is supplied to the electric motor 100.

Note that the threshold value DT_th3 may be set so that a supplied power corresponding to the threshold value DT_th3 becomes equal to the upper-limit supplied power (>P1_base) of the first energy storage device 2 or a nearby constant value of supplied power.

The determination result of STEP23 is affirmative within the shaded area in the low-remaining-capacity area illustrated in FIG. 5. In this case, in STEP24, the power transmission controller 41 causes the target output P1 of the first energy storage device 2 to match supplied power having a predetermined value and causes the target output P2 of the second energy storage device 3 to match the power deficit, which is obtained by subtracting the target output P1 of the first energy storage device 2 from the supplied power corresponding to the driving force demand DT_dmd. Then, the power transmission controller 41 controls the power transmission circuit unit 11 in accordance with the target outputs P1 and P2.

In this case, a specific control process for the power transmission circuit unit 11 (a process performed when none of the target outputs P1 and P2 discontinuously changes) can be performed in a manner similar to that in STEP14 in FIG. 6.

Accordingly, the supplied power corresponding to the driving force demand DT_dmd is fed from both the first energy storage device 2 and the second energy storage device 3 to the electric motor 100 in such a manner that the sum of the respective outputs of the first energy storage device 2 and the second energy storage device 3 matches the supplied power corresponding to the driving force demand DT_dmd. In this case, the share of the supplied power corresponding to the driving force demand DT_dmd which is taken by the first energy storage device 2 is set to the supplied power having the predetermined value.

The supplied power having the predetermined value to be output from the first energy storage device 2 may be, for example, an upper-limit supplied power that can be output by the first energy storage device 2 or a nearby constant value of supplied power. Alternatively, the supplied power having the predetermined value may be a supplied power set to vary depending on either or both of the detected value of the first remaining capacity SOC1 and the detected value of the second remaining capacity SOC2.

On the other hand, if the determination result of STEP23 is negative, then, in STEP25, the power transmission controller 41 determines the base supplied power P1_base, which is a "base" value of the target output P1 of the first energy storage device 2, in accordance with the detected value of the second remaining capacity SOC2.

The processing of STEP25 is the same or substantially the same as the processing of STEP19. In this embodiment, the coefficient α is the maximum value "1" within the low-remaining-capacity area. Thus, the base supplied power P1_base, which is determined in STEP25, is equal to the maximum value P1b.

As in the processing of STEP19, for example, an upper limit of the output of the first energy storage device 2 may be set in accordance with the detected value of the first remaining capacity SOC1 and so on, and, when the base supplied power P1_base, which is determined in accordance with the second remaining capacity SOC2, exceeds the upper limit, the base supplied power P1_base may be forcibly limited to the upper limit.

Alternatively, for example, the base supplied power P1_base may be determined, instead of by executing the process illustrated in the flowchart in FIG. 9 in STEP25, directly from the detected value of the second remaining capacity SOC2 by using a map created in advance or by using an operational expression.

After the processing of STEP25 has been executed, then, in STEP26, the power transmission controller 41 determines whether or not the supplied power corresponding to the driving force demand DT_dmd is less than or equal to the base supplied power P1_base. As in the determination processing in STEP20, the determination processing in STEP26 is equivalent to a process of determining whether or not the driving force demand DT_dmd is less than or equal to the threshold value DT_th4 (see FIG. 5), which is obtained by converting the base supplied power P1_base into a driving force value in accordance with the detected value of the rotational speed of the electric motor 100.

The determination result of STEP26 is affirmative within the diagonally hatched area in the low-remaining-capacity area illustrated in FIG. 5 when the driving force demand DT_dmd is less than or equal to the threshold value DT_th4. In this situation, in STEP27, the power transmission controller 41 causes the target output P1 of the first energy storage device 2 to match the base supplied power P1_base and causes the target input Pc2 of the second energy storage device 3 to match the surplus power obtained by subtracting the supplied power corresponding to the driving force demand DT_dmd from the base supplied power P1_base. Then, the power transmission controller 41 controls the power transmission circuit unit 11 in accordance with the target output P1 and the target input Pc2.

In this case, a specific control process for the power transmission circuit unit 11 (a process performed when none of the target outputs P1 and P2 discontinuously changes) can be performed in a manner similar to that in STEP21 in FIG. 7.

Accordingly, the base supplied power P1_base, which is set in the way described above in accordance with the detected value of the second remaining capacity SOC2, is output from the first energy storage device 2 regardless of the driving force demand DT_dmd. In addition, a supplied power that is a portion of the base supplied power P1_base corresponding to the driving force demand DT_dmd is fed from the first energy storage device 2 to the electric motor 100 and the surplus supplied power obtained by subtracting the supplied power that is a portion of the base supplied power P1_base corresponding to the driving force demand DT_dmd from the base supplied power P1_base is supplied from the first energy storage device 2 to charge the second energy storage device 3.

On the other hand, the determination result of STEP26 is negative within the diagonally hatched area in the low-remaining-capacity area illustrated in FIG. 5 when the driving force demand DT_dmd is larger than the threshold value DT_th4. In this case, in STEP28, the power transmission controller 41 causes the target output P1 of the first energy storage device 2 to match the supplied power corresponding to the driving force demand DT_dmd. Then, the power transmission controller 41 controls the power transmission circuit unit 11 in accordance with the target output P1. In this case, the target output P2 of the second energy storage device 3 is zero.

Accordingly, the supplied power corresponding to the driving force demand DT_dmd is fed to the electric motor 100 only from the first energy storage device 2 without using the second energy storage device 3.

Specifically, the processing of STEP28 (a process performed when none of the target outputs P1 and P2 discontinuously changes) can be executed in the following way, for example. A target value for the input voltage of the inverter 17 (=the output voltage of the voltage converter 15) is set in accordance with the detected value of the rotational speed of the electric motor 100 or the like. Further, the target output P1 of the first energy storage device 2 is set as the target value for the output power of the voltage converter 15.

Further, the voltage converter 15 is controlled by using a control signal (duty signal) so as to realize the target value for the input voltage of the inverter 17 and the target value for the output power of the voltage converter 15. Also, the inverter 17 is feedback-controlled by using a control signal (duty signal) so as to cause a target current to flow through the electric motor 100. The target current is a current that can realize a target power set in accordance with the driving force demand DT_dmd or a target power obtained by limiting the target power set in accordance with the driving force demand DT_dmd through a limiting process (a limiting process for limiting the output of the first energy storage device 2).

Further, the voltage converter 16 is controlled to be in current flow interruption state. Alternatively, the contactor 13 on the second energy storage device 3 side is controlled to be turned off.

As described above, when the detected value of the second remaining capacity SOC2 falls within the low-remaining-capacity area, power is supplied to the electric motor 100 from an energy storage device including at least the first energy storage device 2 out of the first energy storage device 2 and the second energy storage device 3 during the power-running operation of the electric motor 100.

In addition, when the supplied power corresponding to the driving force demand DT_dmd is less than or equal to the base supplied power P1_base, the output of the first energy storage device 2 is kept at the base supplied power P1_base regardless of the driving force demand DT_dmd. Then, a supplied power that is a portion of the base supplied power P1_base corresponding to the driving force demand DT_dmd is supplied only from the first energy storage device 2 to the electric motor 100 and, at the same time, the surplus supplied power is used to charge the second energy storage device 3. Thus, the input of the second energy storage device 3 varies in accordance with a change in the driving force demand DT_dmd, whereas the output of the first energy storage device 2 (=P1_base) varies with low sensitivity to changes in the driving force demand DT_dmd.

In addition, when the supplied power corresponding to the driving force demand DT_dmd is greater than the base supplied power P1_base, the supplied power corresponding to the driving force demand DT_dmd is supplied only from the first energy storage device 2 to the electric motor 100 until the driving force demand DT_dmd exceeds the threshold value DT_th3. Only when the driving force demand DT_dmd exceeds the threshold value DT_th3, the second energy storage device 3 is responsible for supplying a portion of the supplied power corresponding to the driving force demand DT_dmd.

Thus, when the detected value of the second remaining capacity SOC2 falls within the low-remaining-capacity area, a situation in which power is supplied from the second energy storage device 3 to the electric motor 100 is less likely to occur than when the detected value of the second remaining capacity SOC2 falls within the high-remaining-capacity area or the medium-remaining-capacity area.

In addition, since the base supplied power P1_base is equal to the maximum value P1b within the low-remaining-capacity area, a range for the driving force demand DT_dmd over which power is supplied from the first energy storage device 2 to charge the second energy storage device 3 and the amount of charging power are larger than those within the medium-remaining-capacity area.

As a result, unless a situation in which the driving force demand DT_dmd is greater than the threshold value DT_th3 continues, the second remaining capacity SOC2 is likely to return from the low-remaining-capacity area to the medium-remaining-capacity area.

When the supplied power corresponding to the driving force demand DT_dmd is less than or equal to the base supplied power P1_base, furthermore, the base supplied power P1_base to be output from the first energy storage device 2 is set in accordance with the second remaining capacity SOC2 regardless of the driving force demand DT_dmd. In particular, the base supplied power P1_base is a constant value (=P1b) in the low-remaining-capacity area. Thus, the output of the first energy storage device 2 does not vary in accordance with a change in the driving force demand DT_dmd.

In addition, the output of the first energy storage device 2 is set to a predetermined constant value when the driving force demand DT_dmd is greater than the threshold value DT_th3, which can prevent the output of the first energy storage device 2 from varying in accordance with the driving force demand DT_dmd.

As a result, the output of the first energy storage device 2 within the low-remaining-capacity area is of high stability with less frequent changes. Thus, the progression of deterioration of the first energy storage device 2 can be restrained as much as possible.

The normal combined-use control process performed when the control mode is set to the first control mode, which is a basic control mode among the first to third control modes, has been described in detail.

Second Control Mode

Next, a description will be given of a normal combined-use control process performed when the control mode is set to the second control mode.

Figure 11:
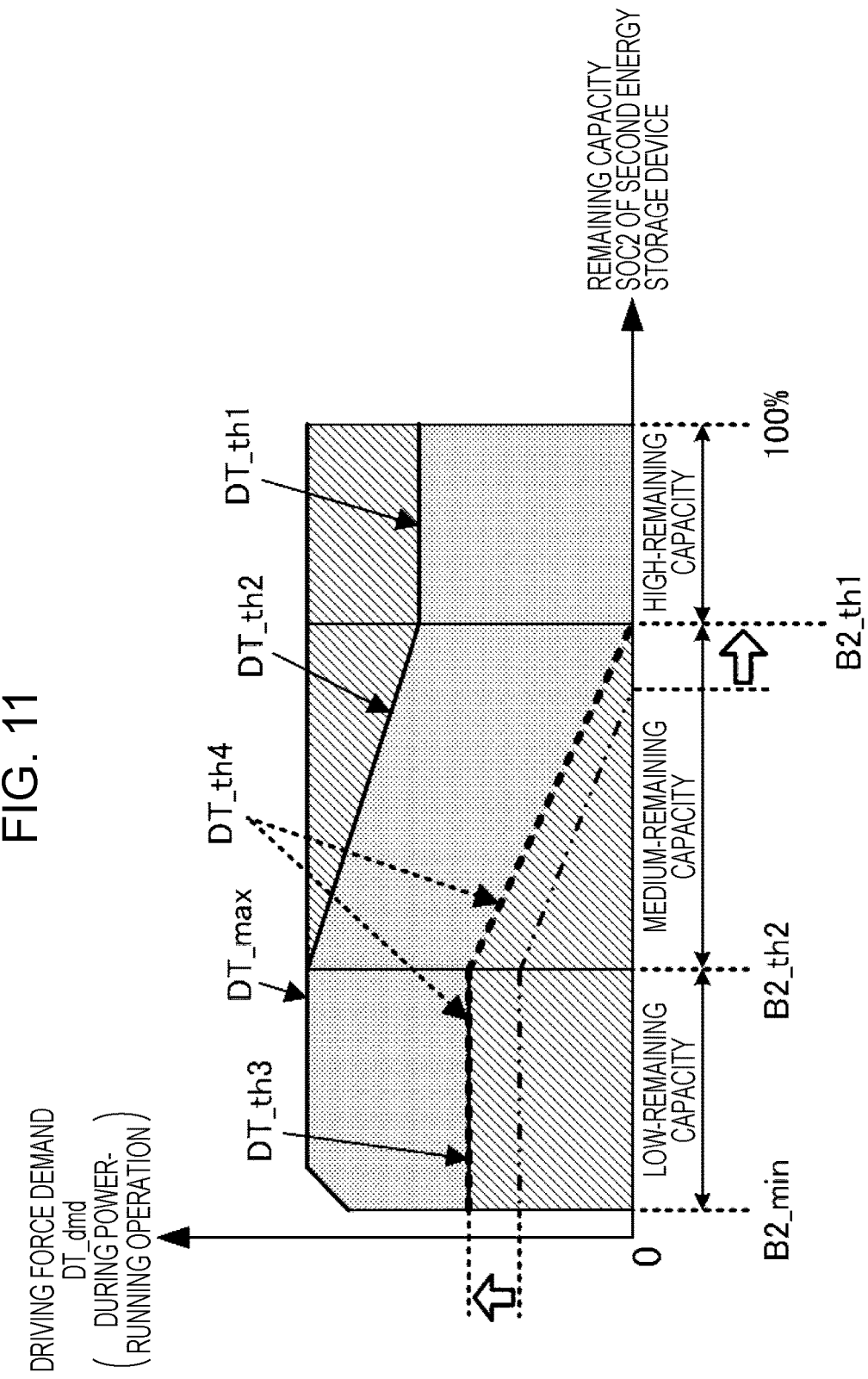
FIG. 11 illustrates, in map form, the relationship between the driving force demand and the remaining capacity of the second energy storage device in the normal combined-use control process in a second control mode, which is executed in STEP4 in FIG. 4.

FIG. 11 illustrates, in map form, the relationship in the second control mode between the second remaining capacity SOC2 and shares allocated to the respective outputs of the first energy storage device 2 and the second energy storage device 3 with respect to the amount of electricity (supplied power) to be supplied to the electric motor 100 in accordance with the driving force demand DT_dmd of the electric motor 100. In FIG. 11, the definitions of the diagonally hatched areas and the shaded areas are similar to those in FIG. 5. In FIG. 11, a two-dot chain line indicates the line representing the threshold value DT_th4 indicated by the broken line in FIG. 5, for comparison with the first control mode.

The comparison between the first control mode illustrated in FIG. 5 and the second control mode illustrated in FIG. 11 demonstrates that the second control mode is a control mode in which a threshold value used to define the shares allocated to the respective outputs of the first energy storage device 2 and the second energy storage device 3 is different from that in the first control mode.

In the second control mode according to this embodiment, when the second remaining capacity SOC2 is comparatively low, the second energy storage device 3 is more likely to be charged than in the first control mode. When the second remaining capacity SOC2 is comparatively high, the range for the driving force demand DT_dmd over which power is supplied from the second energy storage device 3 to the electric motor 100 is larger than that in the first control mode.

More specifically, in the second control mode according to this embodiment, the threshold value B2_th1, which is the upper limit of the medium-remaining-capacity area of the second remaining capacity SOC2, is set in advance to a value higher than that in the first control mode.

In addition, the base supplied power P1_base of the first energy storage device 2 in the low-remaining-capacity area and the medium-remaining-capacity area of the second energy storage device 3 is determined to be larger than that in the first control mode (in other words, so that the threshold value DT_th4, which is obtained by converting the base supplied power P1_base into a driving force value in accordance with the rotational speed of the electric motor 100 (a value calculated when the rotational speed is set to be constant) is larger than that in the first control mode), in accordance with the detected value of the second remaining capacity SOC2.

The base supplied power P1_base can be determined in a way similar to that in the first control mode. For example, as in the first control mode, the base supplied power P1_base (=α×P1b) can be determined by using a process similar to the process illustrated in the flowchart in FIG. 9. In this case, however, the maximum value P1b of the base supplied power P1_base is set in advance to a value larger than that in the first control mode. In the second control mode, the maximum value P1b of the base supplied power P1_base may be, for example, an upper-limit supplied power that can be output from the first energy storage device 2 or a nearby supplied power.

The base supplied power P1_base in the second control mode may be determined directly from, for example, the detected value of the second remaining capacity SOC2 by using a map created in advance or by using an operational expression.

In the second control mode, furthermore, the threshold value DT_th1 for the driving force demand DT_dmd in the high-remaining-capacity area and the threshold value DT_th2 for the driving force demand DT_dmd in the medium-remaining-capacity area are both set to values larger than those in the first control mode.

In the example illustrated in FIG. 11, furthermore, the threshold value DT_th3 for the driving force demand DT_dmd in the low-remaining-capacity area is set so that the supplied power corresponding to the threshold value DT_th3 matches the base supplied power P1_base. Note that the supplied power corresponding to the threshold value DT_th3 may be larger than the base supplied power P1_base so long as the supplied power corresponding to the threshold value DT_th3 is less than or equal to the upper-limit supplied power that can be output from the first energy storage device 2.

The way in which the threshold values regarding the second remaining capacity SOC2 and the driving force demand DT_dmd in the second control mode are set is the same as that in the first control mode, except the particulars described above.

The normal combined-use control process in the second control mode is executed in accordance with the flowchart illustrated in FIG. 6 to FIG. 8 described above in a way similar to that in the first control mode. Note that the processing of STEP26 and STEP28 in FIG. 8 may be omitted if the threshold value DT_th3 for the driving force demand DT_dmd in the low-remaining-capacity area is set so that the supplied power corresponding to the threshold value DT_th3 matches the base supplied power P1_base.

The normal combined-use control process in the second control mode is executed in the way described above.

In the second control mode, a remaining-capacity area (low-side remaining capacity area) obtained by combining the low-remaining-capacity area and the medium-remaining-capacity area is larger than that in the first control mode, and the range for the driving force demand DT_dmd over which the second energy storage device 3 is charged with power supplied from the first energy storage device 2 in the low-side remaining capacity area is larger than that in the first control mode. Thus, the second remaining capacity SOC2 is more likely to be kept in a state near the high-remaining-capacity area.

In addition, in the medium-remaining-capacity area and the high-remaining-capacity area, the range for the driving force demand DT_dmd over which power is supplied from the second energy storage device 3 to the electric motor 100 is also larger than that in the first control mode.

As a result, when the driving force demand DT_dmd is comparatively large (when DT_dmd>DT_th4 holds), the power to be supplied to the electric motor 100 can be varied over a wide range for the driving force demand DT_dmd with high responsivity to changes in the driving force demand DT_dmd. Thus, the responsivity of the actual driving force of the electric motor 100 to a change in the driving force demand DT_dmd can be increased.

In this embodiment, the threshold value B2_th1, which is the upper limit of the medium-remaining-capacity area of the second remaining capacity SOC2, and the base supplied power P1_base of the first energy storage device 2 are both set to values larger than those in the first control mode. Alternatively, only one of the threshold value B2_th1 and the base supplied power P1_base may be set to a value larger than that in the first control mode. In this case, the area within which the second energy storage device 3 is charged with power supplied from the first energy storage device 2 can be larger than that in the first control mode.

Third Control Mode

Next, a description will be given of a normal combined-use control process performed when the control mode is set to the third control mode.

Figure 12:
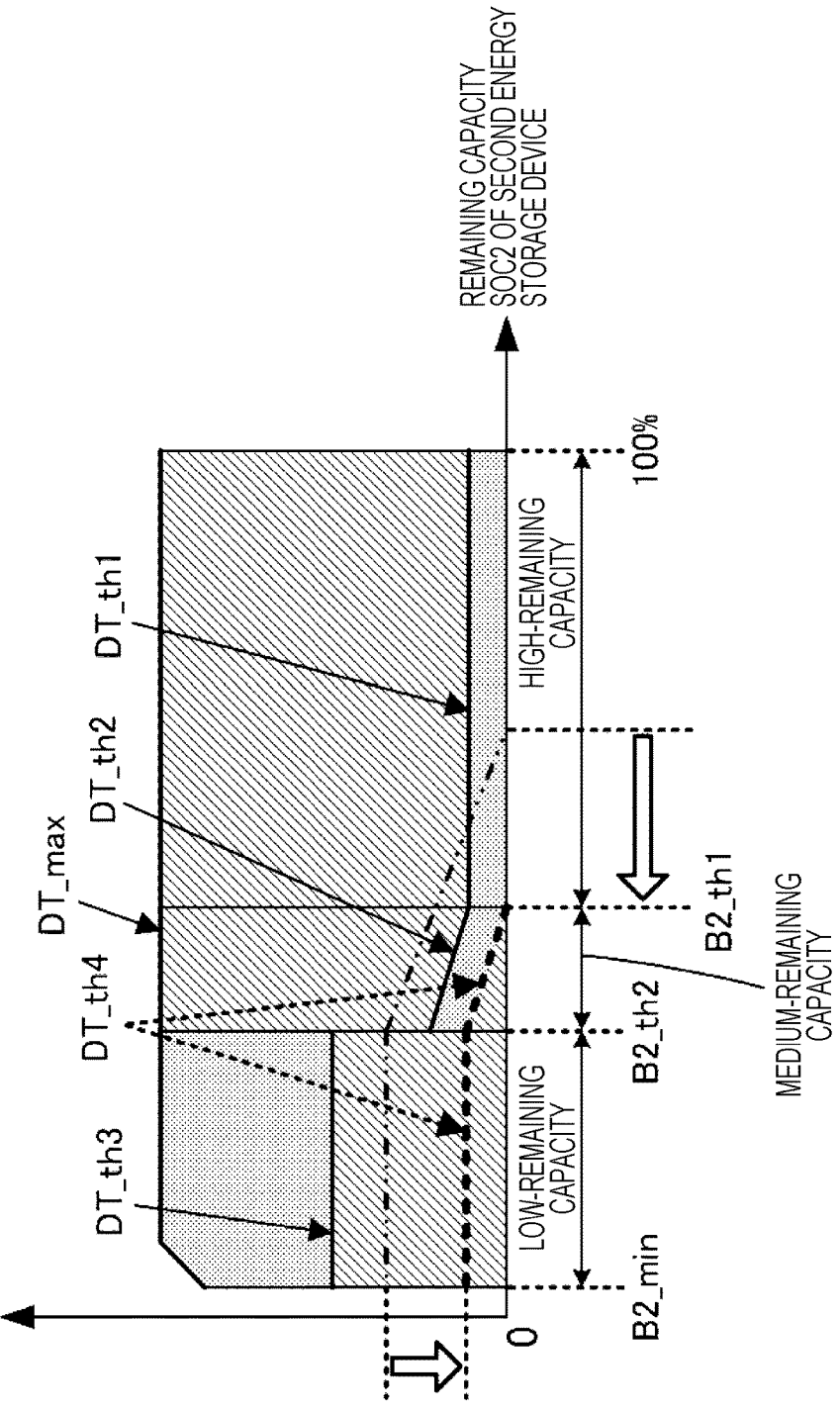
FIG. 12 illustrates, in map form, the relationship between the driving force demand and the remaining capacity of the second energy storage device in the normal combined-use control process in a third control mode, which is executed in STEP4 in FIG. 4.

FIG. 12 illustrates, in map form, the relationship in the third control mode between the second remaining capacity SOC2 and shares allocated to the respective outputs of the first energy storage device 2 and the second energy storage device 3 with respect to the amount of electricity (supplied power) to be supplied to the electric motor 100 in accordance with the driving force demand DT_dmd of the electric motor 100. In FIG. 12, the definitions of the diagonally hatched areas and the shaded areas are similar to those in FIG. 5. In FIG. 12, a two-dot chain line indicates the line representing the threshold value DT_th4 indicated by the broken line in FIG. 5, for comparison with the first control mode.

The comparison between the first control mode illustrated in FIG. 5 and the third control mode illustrated in FIG. 12 demonstrates that the third control mode is a control mode in which a threshold value used to define the shares allocated to the respective outputs of the first energy storage device 2 and the second energy storage device 3 is different from that in the first control mode.

In the third control mode according to this embodiment, even when the second remaining capacity SOC2 is comparatively low, the second energy storage device 3 is less likely to be charged than in the first control mode. When the second remaining capacity SOC2 is comparatively high, the range for the driving force demand DT_dmd over which power is supplied from the first energy storage device 2 to the electric motor 100 is larger than that in the first control mode.

More specifically, in the third control mode according to this embodiment, the threshold value B2_th1, which is the upper limit of the medium-remaining-capacity area of the second remaining capacity SOC2, is set in advance to a value lower than that in the first control mode.

In addition, the base supplied power P1_base of the first energy storage device 2 in the low-remaining-capacity area and the medium-remaining-capacity area of the second energy storage device 3 is set to be smaller than that in the first control mode (in other words, so that the threshold value DT_th4, which is obtained by converting the base supplied power P1_base into a driving force value in accordance with the rotational speed of the electric motor 100 (a value calculated when the rotational speed is set to be constant) is smaller than that in the first control mode), in accordance with the detected value of the second remaining capacity SOC2.

The base supplied power P1_base can be determined in a way similar to that in the first control mode. For example, as in the first control mode, the base supplied power P1_base ($=\alpha \times P1b$) can be determined by using a process similar to the process illustrated in the flowchart in FIG. 9. In this case, however, the maximum value P1b of the base supplied power P1_base is set in advance to a value smaller than that in the first control mode.

The base supplied power P1_base in the third control mode may be set directly from, for example, the detected value of the second remaining capacity SOC2 by using a map created in advance or by using an operational expression.

In the third control mode, furthermore, the threshold value DT_th1 for the driving force demand DT_dmd in the high-remaining-capacity area and the threshold value DT_th2 for the driving force demand DT_dmd in the medium-remaining-capacity area are both set to values smaller than those in the first control mode.

The way in which the threshold values regarding the second remaining capacity SOC2 and the driving force demand DT_dmd in the third control mode are set is the same as that in the first control mode, except the particulars described above.

The normal combined-use control process in the third control mode is executed in accordance with the flowchart illustrated in FIG. 6 to FIG. 8 described above in a way similar to that in the first control mode.

The normal combined-use control process in the third control mode is executed in the way described above.

In the third control mode, a remaining-capacity area (low-side remaining capacity area) obtained by combining the low-remaining-capacity area and the medium-remaining-capacity area is smaller than that in the first control mode, and the range for the driving force demand DT_dmd over which the second energy storage device 3 is charged with power supplied from the first energy storage device 2 in the low-side remaining capacity area is smaller than that in the first control mode. Thus, the situation in which the second energy storage device 3 is charged with power supplied from the first energy storage device 2 is less likely to occur.

Thus, the power loss caused by this charging operation can be reduced compared with the first control mode and the second control mode. As a result, the amount of electrical energy consumed by all of the first energy storage device 2 and the second energy storage device 3 per unit distance of travel of the vehicle can be reduced compared with the first control mode and the second control mode. Therefore, the drivable range of the vehicle can be extended.

In this embodiment, the threshold value B2_th1, which is the upper limit of the medium-remaining-capacity area of the second remaining capacity SOC2, and the base supplied power P1_base of the first energy storage device 2 are both set to values smaller than those in the first control mode. Alternatively, only one of the threshold value B2_th1 and the base supplied power P1_base may be set to a value smaller than that in the first control mode. In this case, the area within which the second energy storage device 3 is charged with power supplied from the first energy storage device 2 can be smaller than that in the first control mode.

A brief summary of the first to third control modes described above is presented below. The first control mode is a so-called "long-lasting mode", which is used mainly to let the first energy storage device 2 and the second energy storage device 3 deteriorate as little as possible. The second control mode is a so-called "sport mode", which is used mainly to enhance responsivity to the driving force demand DT_dmd of the electric motor 100. The third control mode is a so-called "eco mode", which is used mainly to enhance the fuel economy performance of the vehicle (the distance traveled by the vehicle per unit of electrical energy consumed). Process for Preventing Discontinuous Change in Output of the first energy storage device and Second Energy Storage Device In the description of the processing of STEP14, STEP15, STEP18, STEP21, STEP22, STEP24, STEP27, and STEP28 described above (the control process for the power transmission circuit unit 11 in accordance with the target outputs P1 and P2 (or the target input Pc2)), no discontinuous change occurs in the target output P1 of the first energy storage device 2 and the target output P2 (or the target input Pc2) of the second energy storage device 3. In this embodiment, however, in the first or third control mode, the target outputs P1 and P2 may discontinuously change in accordance with a change in the driving force demand DT_dmd or a change in the second remaining capacity SOC2 (detected value).

For example, referring to FIG. 5, in the first control mode, the target outputs P1 and P2 discontinuously change in the case where the driving force demand DT_dmd is a value larger than the threshold value DT_th4 and smaller than a maximum value DT_max and where the detected value of the second remaining capacity SOC2 is smaller than the threshold value B2_th1 (the upper limit of the medium-remaining-capacity area), as indicated by a hollow arrow in FIG. 5, when the detected value of the second remaining capacity SOC2 changes from one of the state where the detected value of the second remaining capacity SOC2 is larger than the threshold value B2_th2 (the lower limit of the medium-remaining-capacity area) and the state where the detected value of the second remaining capacity SOC2 is smaller than the threshold value B2_th2 to the other state.

The same applies to the third control mode (see FIG. 12).

If the target outputs P1 and P2 discontinuously change in the manner described above, control of the power transmission circuit unit 11 directly using the target outputs P1 and P2 causes the respective actual outputs (the amounts of discharge power) of the first energy storage device 2 and the second energy storage device 3 to change rapidly. In particular, the rapid change in the output of the first energy storage device 2 causes the progression of deterioration of the first energy storage device 2 to be more likely to occur.

Figure 13:
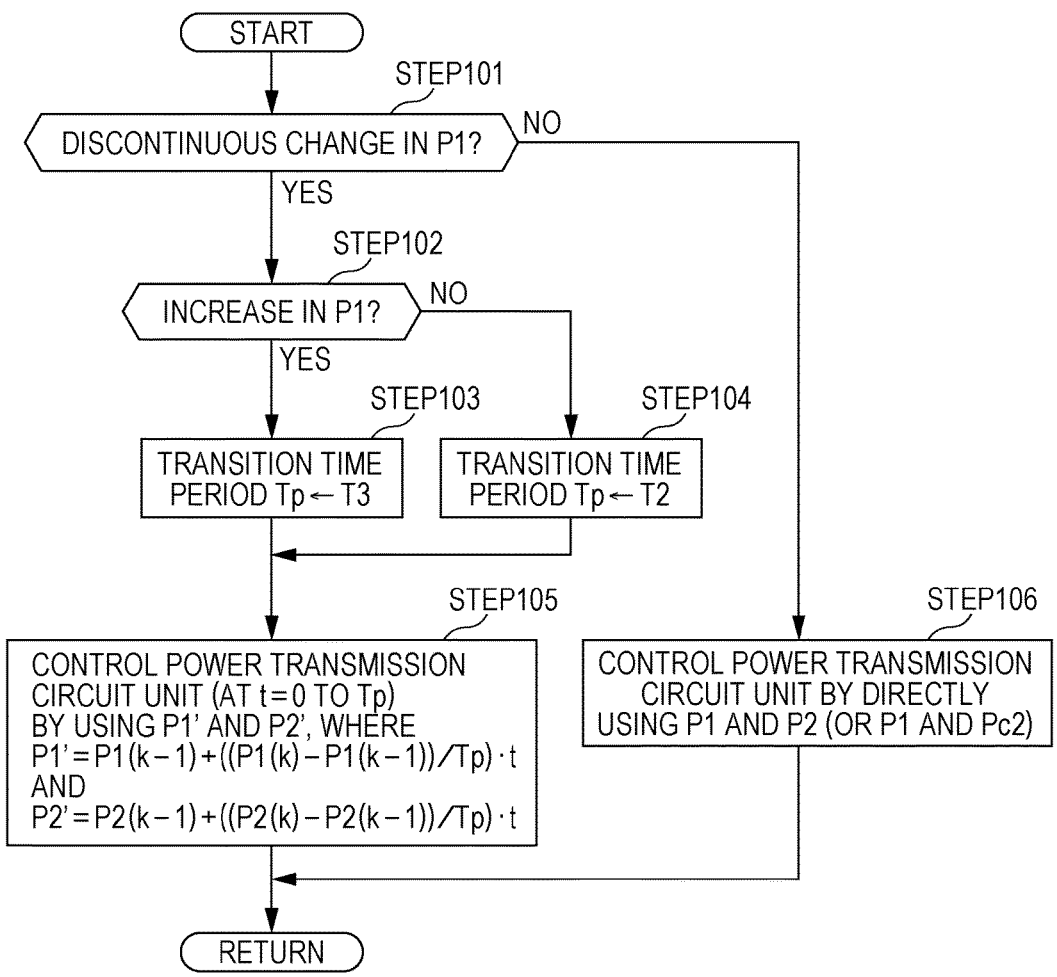
FIG. 13 is a flowchart illustrating a process for preventing a discontinuous change in the output of a first energy storage device.

Accordingly, in this embodiment, in particular, in order to prevent a rapid change in the actual output (the amount of discharge power) of the first energy storage device 2, the power transmission controller 41 controls the power transmission circuit unit 11 by using a process illustrated in a flowchart in FIG. 13. This process is a process executed during the processing of STEP14, STEP15, STEP18, STEP21, STEP22, STEP24, STEP27, and STEP28.

In STEP101, the power transmission controller 41 determines whether or not a discontinuous change in the target output P1 of the first energy storage device 2 has occurred. In this case, the power transmission controller 41 determines that a discontinuous change in the target output P1 has occurred when, for example, the absolute value of the difference between the target output P1 determined during the current control process period and the target output P1 determined during the previous (immediately preceding) control process period is larger than a predetermined value.

In a situation where power is supplied from both the first energy storage device 2 and the second energy storage device 3 to the electric motor 100, if the target output P1 discontinuously changes, the target output P2 of the second energy storage device 3 also discontinuously changes. Thus, in STEP101, the power transmission controller 41 may determine whether or not a discontinuous change in the target output P2 has occurred.

In STEP101, furthermore, for example, the condition that the threshold value B2_th2 (the lower limit of the medium-remaining-capacity area) is in the range between the detected value of the second remaining capacity SOC2 obtained during the current control process period and the detected value of the second remaining capacity SOC2 obtained during the previous control process period may be used as a condition necessary to determine that a discontinuous change in the target output P1 has occurred.

For additional explanation, in this embodiment, in a situation where the second energy storage device 3 is charged with power supplied from the first energy storage device 2, the target output P1 of the first energy storage device 2 matches the base supplied power P1_base and therefore the determination result of STEP101 is not affirmative.

If the determination result of STEP101 is negative, in STEP106, the power transmission controller 41 controls the power transmission circuit unit 11 in the manner described above by directly using the target outputs P1 and P2 (or the target output P1 and the target input Pc2) determined during the current control process period.

On the other hand, if the determination result of STEP101 is affirmative, then, in STEP102, the power transmission controller 41 determines whether or not the discontinuous change in the target output P1 is an increase in the target output P1. If this determination result is affirmative (when the target output P1 increases), in STEP103, the power transmission controller 41 sets a predetermined value T3 as a transition time period Tp. The transition time period Tp is a time period required for the respective outputs of the first energy storage device 2 and the second energy storage device 3 to change from target outputs P1(k−1) and P2(k−1) determined during the previous control process period to target outputs P1(k) and P2(k) newly determined during the current control process period.

Figure 14:
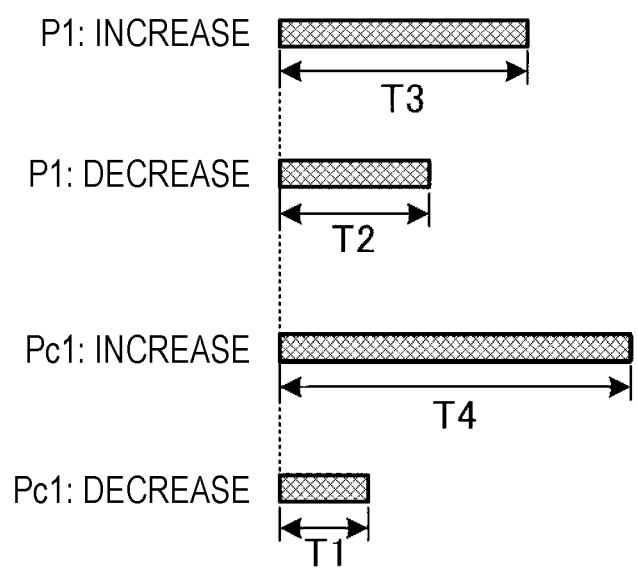
FIG. 14 illustrates a relationship in magnitude between transition time periods set in STEP103 and STEP104 in FIG. 13 or STEP113 and STEP114 in FIG. 25.

If the determination result of STEP102 is negative (when the target output P1 decreases), in STEP104, the power transmission controller 41 sets a predetermined value T2 as the transition time period Tp. As illustrated in FIG. 14, the predetermined value T2 indicates a time period shorter than the predetermined value T3 in STEP103. In FIG. 14, T4 and T1 are described below in an embodiment described below.

As described above, when the output (the amount of discharge power) of the first energy storage device 2 is increased rapidly, deterioration of the first energy storage device 2 is more likely to progress than when the output of the first energy storage device 2 is decreased rapidly. Thus, in this embodiment, the predetermined values T3 and T2 are set to satisfy the magnitude relationship of T3>T2 so as to cause the output of the first energy storage device 2 to change more gently when the discontinuous change in the target output P1 is an increase in the target output P1 than when the discontinuous change in the target output P1 is a decrease in the target output P1.

Then, in STEP105, the power transmission controller 41 determines an output command value P1', which is a command value for the output (the amount of discharge power) of the first energy storage device 2, and an output command value P2', which is a command value for the output (the amount of discharge power) of the second energy storage device 3, in accordance with equations (1) and (2) below. The output command values P1' and P2' are command values used to control the actual output of the first energy storage device 2 and the actual output of the second energy storage device 3, respectively.

$$P1'=P1(k-1)+((P1(k)-P1(k-1))/Tp)\cdot t \quad (1)$$

$$P2'=P2(k-1)+((P2(k)-P2(k-1))/Tp)\cdot t \quad (2)$$

In equations (1) and (2), t denotes a time value updated to increase from zero (the time of the current control process period) to the time after the elapse of the transition time period Tp by the amount corresponding to one control process period for each control process period.

Then, in STEP105, the power transmission controller 41 controls the power transmission circuit unit 11 by using the output command values P1' and P2' determined in accordance with equations (1) and (2) instead of the target outputs P1 and P2 (by respectively using the values P1' and P2' as the target values of the output powers of the voltage converters 15 and 16).

In this case, the values given by ((P1(k)−P1(k−1))/Tp) and ((P2(k)−P2(k−1))/Tp) correspond to the rates of change in the values P1' and P2', respectively, which become slow as the transition time period Tp increases. As described above, the transition time period Tp is set in accordance with whether the discontinuous change in the target output P1 of the first energy storage device 2 is an increase or a decrease.

Accordingly, when the discontinuous change in the target output P1 of the first energy storage device 2 is an increase, the output command values P1' and P2' are determined to change gradually at a rate slower than that when the discontinuous change in the target output P1 of the first energy storage device 2 is a decrease.

After the time value t has reached the transition time period Tp in the processing of STEP105, the process resumes from STEP101.

The process illustrated in FIG. 13 is executed in the way described above. Thus, the actual output of the first energy storage device 2 gradually changes, and is prevented from discontinuously and rapidly changing. When the target output P1 of the first energy storage device 2 discontinuously increases, the output command value P1' is determined so that the output of the first energy storage device 2 is changed at a slower rate than when the target output P1 of the first energy storage device 2 discontinuously decreases.

Thus, the progression of deterioration of the first energy storage device 2 during power supply to the electric motor 100 can be appropriately restrained.

In addition, in this embodiment, a discontinuous change in the output of the second energy storage device 3 is also prevented. Thus, excessive variations in the output of the second energy storage device 3 are suppressed or reduced, resulting in the progression of deterioration of the second energy storage device 3 also being restrained.

Extended-Stop Control Process

The extended-stop control process in STEP6 will now be described in detail.

In the extended-stop control process, the power transmission controller 41 controls the power transmission circuit unit 11 to supply only the deficit against the supplied power corresponding to the driving force demand DT_dmd from the second energy storage device 3 to the electric motor 100 while supplying power from the first energy storage device 2 to the electric motor 100 as continuously as possible during the power-running operation of the electric motor 100.

Figure 15:
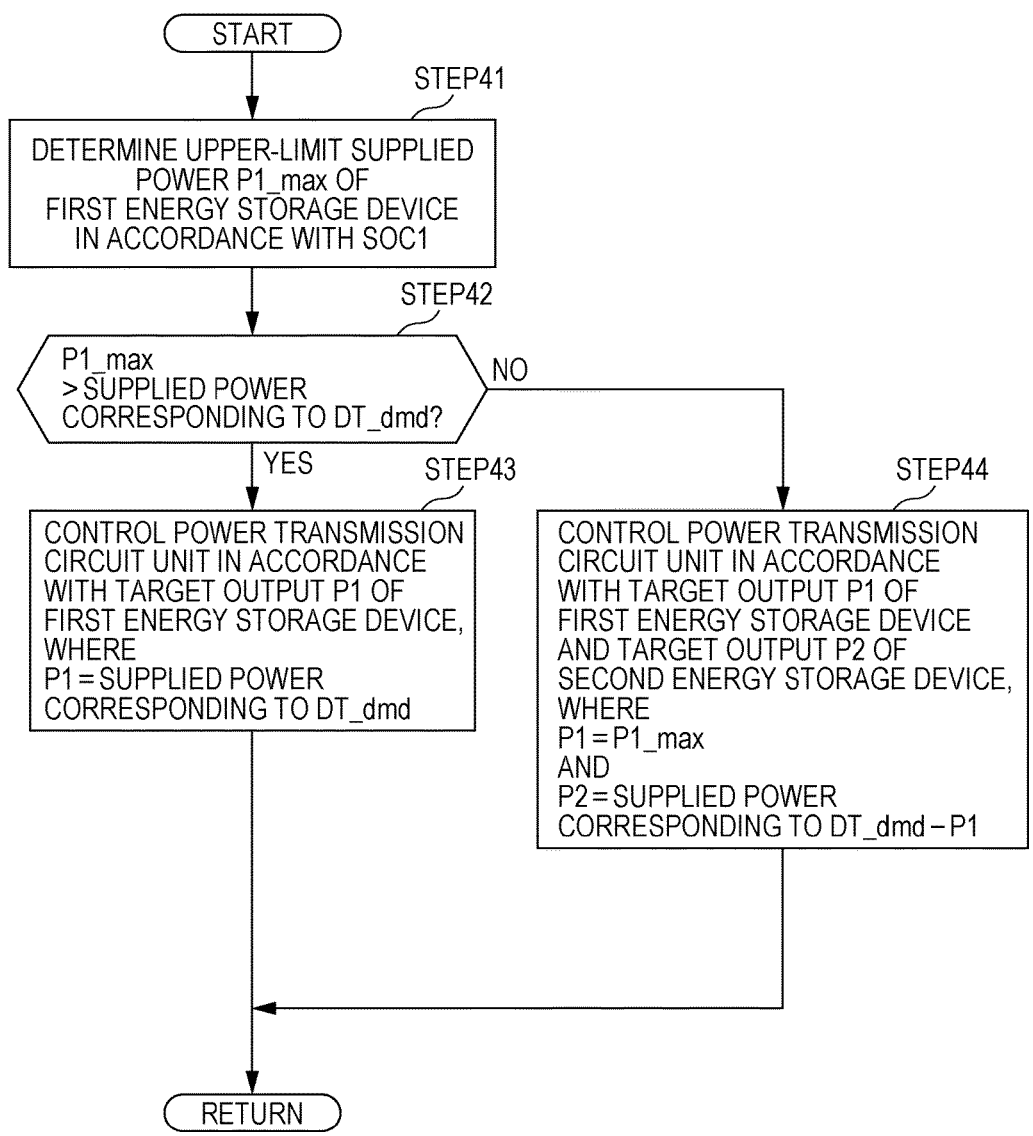
FIG. 15 is a flowchart illustrating an extended-stop control process executed in STEP6 in FIG. 4.

In the extended-stop control process, the power transmission controller 41 executes a process illustrated in a flowchart in FIG. 15 at intervals of a predetermined control process period. Specifically, in STEP41, the power transmission controller 41 determines an upper-limit supplied power P1_max that can be output from the first energy storage device 2, in accordance with the detected value of the first remaining capacity SOC1.

Figure 17:
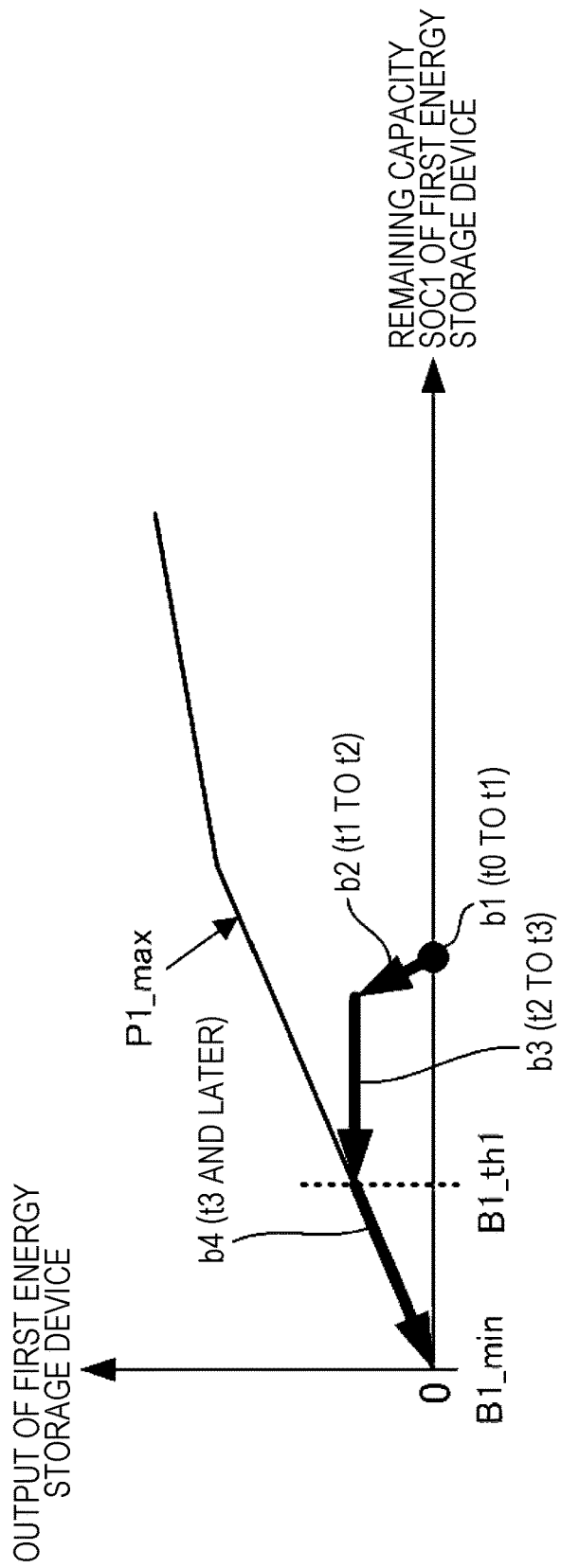
FIG. 17 is a graph illustrating an example of changes in the remaining capacity of the first energy storage device over time.

The upper-limit supplied power P1_max is determined from the detected value of the first remaining capacity SOC1, for example, in a manner depicted on a graph in FIG. 17 by using a map created in advance or by using an operational expression. The upper-limit supplied power P1_max is determined to be a value that becomes smaller as the first remaining capacity SOC1 decreases.

Then, in STEP42, the power transmission controller 41 determines whether or not the upper-limit supplied power P1_max is greater than the supplied power corresponding to the driving force demand DT_dmd.

If the determination result of STEP42 is affirmative, in STEP43, the power transmission controller 41 causes the target output P1 of the first energy storage device 2 to match the supplied power corresponding to the driving force demand DT_dmd. Then, the power transmission controller 41 controls the power transmission circuit unit 11 in accordance with the target output P1.

In this case, specific control of the power transmission circuit unit 11 can be performed in a manner similar to that in STEP28 in FIG. 8.

On the other hand, if the determination result of STEP42 is negative, in STEP44, the power transmission controller 41 causes the target output P1 of the first energy storage device 2 to match the upper-limit supplied power P1_max and causes the target output P2 of the second energy storage device 3 to match the power deficit, which is obtained by subtracting the target output P1 of the first energy storage device 2 (=P1_max) from the supplied power corresponding to the driving force demand DT_dmd. Then, the power transmission controller 41 controls the power transmission circuit unit 11 in accordance with the target outputs P1 and P2.

In this case, specific control of the power transmission circuit unit 11 can be performed in a manner similar to that in STEP14 in FIG. 6.

In STEP44, when the detected value of the first remaining capacity SOC1 has reached the lower limit B1_min and the upper-limit supplied power P1_max=0 holds, the supplied power corresponding to the driving force demand DT_dmd is supplied only from the second energy storage device 3 to the electric motor 100. In this situation, the voltage converter 15 of the power transmission circuit unit 11 is controlled to be in current flow interruption state or the contactor 12 on the first energy storage device 2 side is controlled to be turned off.

For additional explanation, in this embodiment, the target output P1 of the first energy storage device 2 may also discontinuously change when a transition occurs from the normal combined-use control process to the extended-stop control process. Hence, in this embodiment, when a transition occurs from the normal combined-use control process to the extended-stop control process, the power transmission controller 41 executes the process illustrated in FIG. 13 described above in STEP43 or STEP44.

The extended-stop control process is executed in the way described above. In the extended-stop control process, the first energy storage device 2 from which it is difficult to output a large amount of supplied power is preferentially used to supply power to the electric motor 100. Even when the upper-limit supplied power P1_max, which can be output by the first energy storage device 2, does not reach the supplied power corresponding to the driving force demand DT_dmd, power is supplied from both the first energy storage device 2 and the second energy storage device 3 to the electric motor 100, allowing the first energy storage device 2 to be discharged to the remaining capacity corresponding to the lower limit B1_min.

Thereafter, the second energy storage device 3 from which it is easy to output a large amount of supplied power is used to supply power to the electric motor 100. This allows the second energy storage device 3 to be discharged to the remaining capacity corresponding to the lower limit B2_min or to a nearby remaining capacity.

In addition, when a transition occurs from the normal combined-use control process to the extended-stop control process, a discontinuous change in the output of the first energy storage device 2 and the second energy storage device 3 can be prevented.

An example of changes in the first remaining capacity SOC1 and the second remaining capacity SOC2 through the normal combined-use control process and extended-stop control process described above will now be described with reference to FIG. 16 to FIG. 18.

In the illustrated example, the control mode in the normal combined-use control process is the first control mode, for example.

Figure 16:
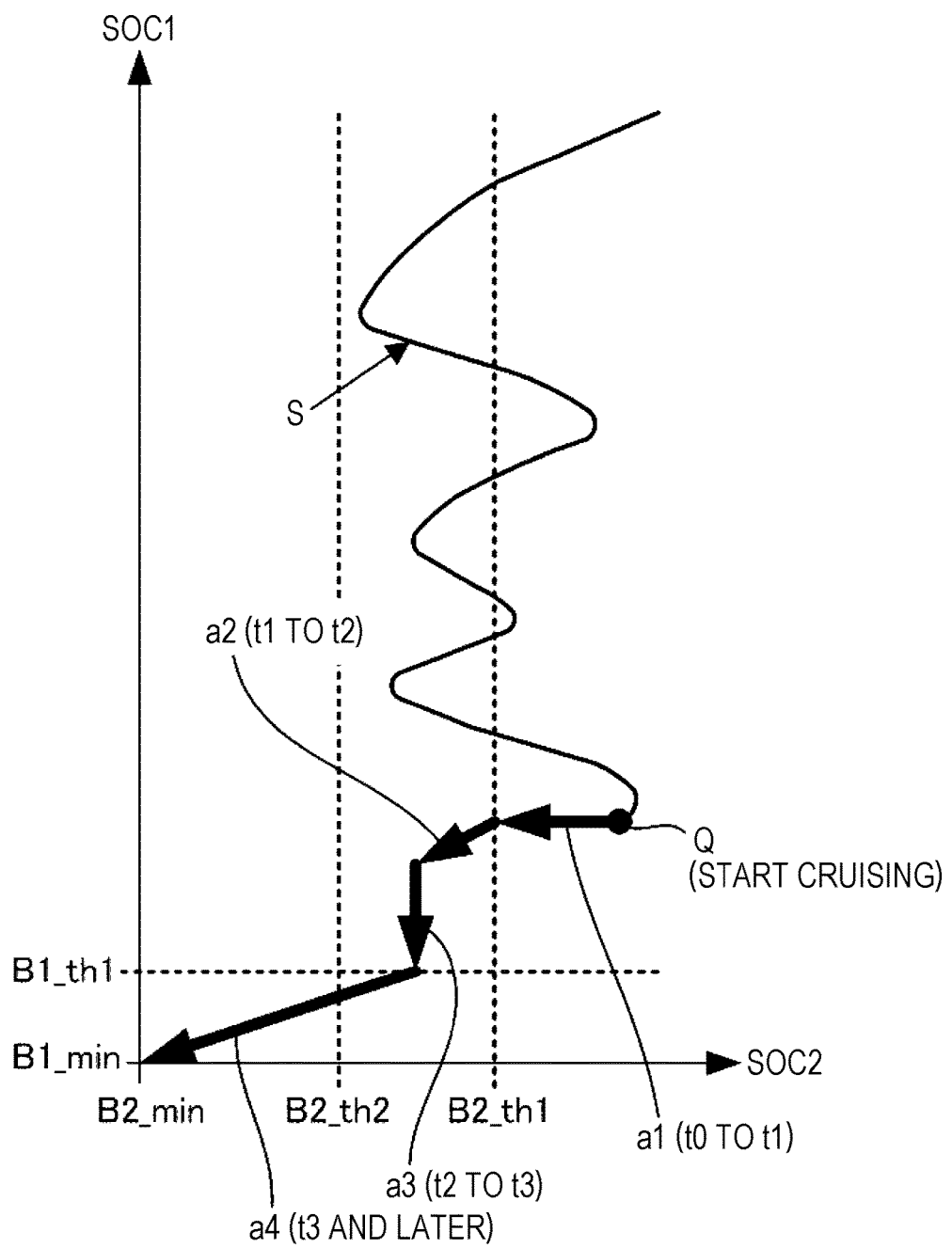
FIG. 16 is a graph illustrating an example of changes in a combination of the respective remaining capacities of the first energy storage device and the second energy storage device over time.

FIG. 16 illustrates a graph S, which depicts, by way of example, in which pattern the combination of the first remaining capacity SOC1 and the second remaining capacity SOC2 changes when the vehicle is traveling with the normal combined-use control process being executed.

The graph S demonstrates that the second remaining capacity SOC2 increases or decreases so as to be kept at, for example, a value near the threshold value B2_th1 by appropriately charging the second energy storage device 3 with power supplied from the first energy storage device 2, whereas the first remaining capacity SOC1 decreases.

In FIG. 16, thick-line arrows a1 to a4 indicate how the combination of the first remaining capacity SOC1 and the second remaining capacity SOC2 changes when the vehicle starts cruising at, for example, the time point (time t0) at which the combination of the first remaining capacity SOC1 and the second remaining capacity SOC2 is in a state indicated by a point Q. Cruising is movement of a vehicle with the driving force demand DT_dmd of the electric motor 100 and the rotational speed being kept substantially constant.

In FIG. 17, a point b1 and thick-line arrows b2 to b4 indicate changes in the first remaining capacity SOC1 from the time t0. In FIG. 18, thick-line arrows c1 and c2, a point c3, and a thick-line arrow c4 indicate changes in the second remaining capacity SOC2 from the time t0.

The indications a1, b1, and c1 represent the time period from the time t0 to time t1, the indications a2, b2, and c2 represent the time period from the time t1 to time t2, the indications a3, b3, and c3 represent the time period from the time t2 to time t3, and the indications a4, b4, and c4 represent the time period after the time t3. The time t3 is a time at which the extended-stop control process is started in response to the first remaining capacity SOC1 reaching the threshold value B1_th1. In addition, the driving force demand DT_dmd of the electric motor 100 which is cruising has a value positioned at the height indicated by c1, c2, c3, and c4 in FIG. 18, for example.

Figure 18:
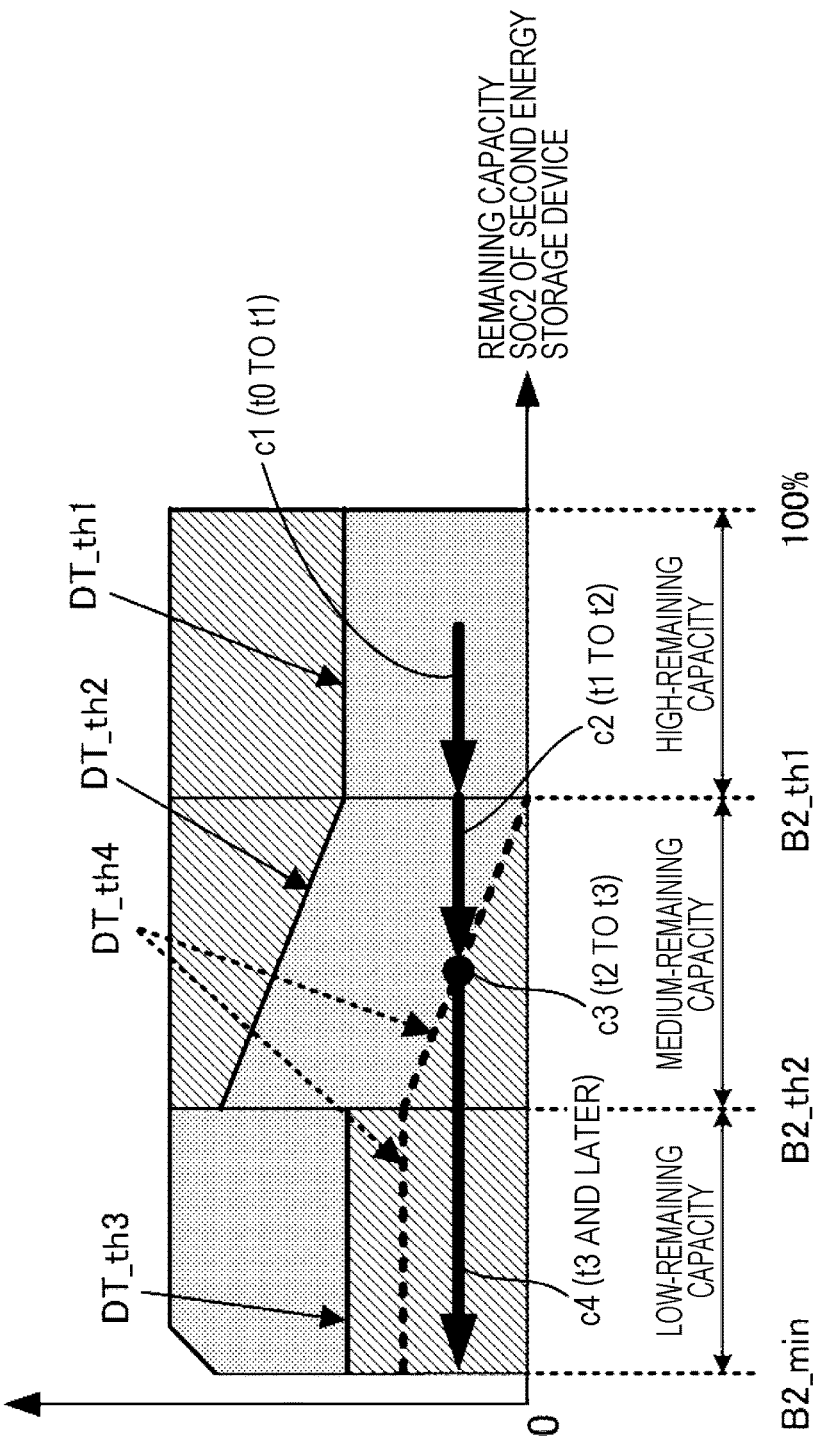
FIG. 18 is a graph illustrating an example of changes in the remaining capacity of the second energy storage device over time.

During the time period from the time t0 to the time t1, through the normal combined-use control process in the first control mode, no power is supplied from the first energy storage device 2 to the electric motor 100 or nor is the second energy storage device 3 charged with power supplied from the first energy storage device 2, and power is supplied only from the second energy storage device 3 to the electric motor 100 (see FIG. 18). Thus, as indicated by way of example by the arrow a1 in FIG. 16 and the point b1 in FIG. 17, the first remaining capacity SOC1 is kept constant. In addition, as indicated by way of example by the arrow a1 in FIG. 16 and the arrow c1 in FIG. 18, the second remaining capacity SOC2 decreases.

When the second remaining capacity SOC2 reaches the threshold value B2_th1 at the time t1, then, during the time period from the time t1 to the time t2, through the normal combined-use control process in the first control mode, power is supplied from both the first energy storage device 2 and the second energy storage device 3 to the electric motor 100 (see FIG. 18). Thus, as indicated by way of example by the arrow a2 in FIG. 16 and the arrow b2 in FIG. 17, the first remaining capacity SOC1 decreases and, as indicated by way of example by the arrow a2 in FIG. 16 and the arrow c2 in FIG. 18, the second remaining capacity SOC2 decreases.

When the second remaining capacity SOC2 reaches the value corresponding to the point c3 in FIG. 18 at the time t2, through the normal combined-use control process in the first control mode, power is supplied only from the first energy storage device 2 to the electric motor 100. Thus, during the time period from the time t2 to the time t3, as indicated by way of example by the arrow a3 in FIG. 16 and the point c3 in FIG. 18, the second remaining capacity SOC2 is kept constant. Then, as indicated by way of example by the arrow a3 in FIG. 16 and the arrow b3 in FIG. 17, the first remaining capacity SOC1 decreases.

When the first remaining capacity SOC1 decreases to the threshold value B1_th1 at the time t3, the extended-stop control process is started. Thus, after the time t3, as indicated by way of example by the arrow a4 in FIG. 16 and the arrow b4 in FIG. 17, the first remaining capacity SOC1 decreases to the lower limit B1_min while the first energy storage device 2 outputs the upper-limit supplied power P1_max. In addition, as indicated by way of example by the arrow a4 in FIG. 16 and the arrow c4 in FIG. 18, the second remaining capacity SOC2 decreases to the lower limit B2_min.

Figure 19:
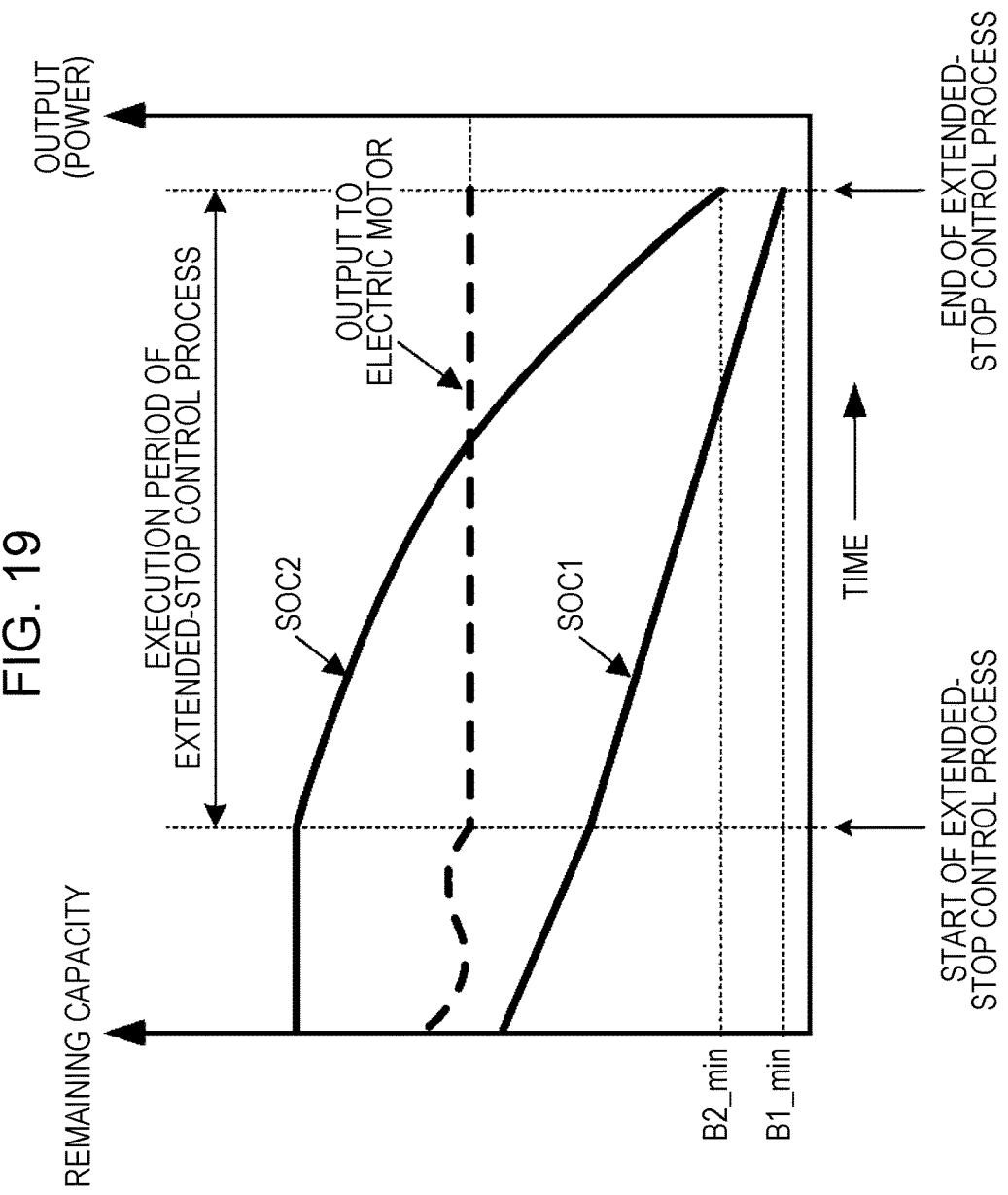
FIG. 19 is a graph illustrating an example of changes in the remaining capacities of the first energy storage device and the second energy storage device over time within a period during which the extended-stop control process is executed.

FIG. 19 illustrates an example of changes in the first remaining capacity SOC1 and the second remaining capacity SOC2 over time in the extended-stop control process. The illustrated example provides an example of changes in the first remaining capacity SOC1 and the second remaining capacity SOC2 over time when the output (the supplied power) to the electric motor 100 is kept at a certain constant value (that is, when the vehicle is cruising) after the start of the extended-stop control process.

As illustrated in FIG. 19, power is supplied from both the first energy storage device 2 and the second energy storage device 3 to the electric motor 100. This allows the remaining capacities SOC1 and SOC2 of the first energy storage device 2 and the second energy storage device 3 to be consumed to the lower limits B1_min and B2_min, respectively, while ensuring supplied power having a constant value to the electric motor 100.

In the manner described above, an extension of the period during which power can be supplied to the electric motor 100 with the use of both the first energy storage device 2 and the second energy storage device 3 allows the power of both the first energy storage device 2 and the second energy storage device 3 to be exhausted more fully than an extension of the period during which power can be supplied to the electric motor 100 with the use of either energy storage device (e.g., the first energy storage device 2). Thus, the period during which power can be supplied to the electric motor 100 and therefore the drivable range of the vehicle can further be extended.

As described above, the normal combined-use control process in the first control mode enables the first remaining capacity SOC1 to decrease while holding the second remaining capacity SOC2 within the medium-remaining-capacity area or at a nearby value.

In the extended-stop control process, furthermore, the first energy storage device 2 and the second energy storage device 3 can be discharged fully to the respective lower limits B1_min and B2_min or to nearby remaining capacity values due to power supply to the electric motor 100.

Control Process During Regenerative Operation

Next, a description will be given of the control process for the power transmission controller 41 during the regenerative operation of the electric motor 100.

Figure 20:
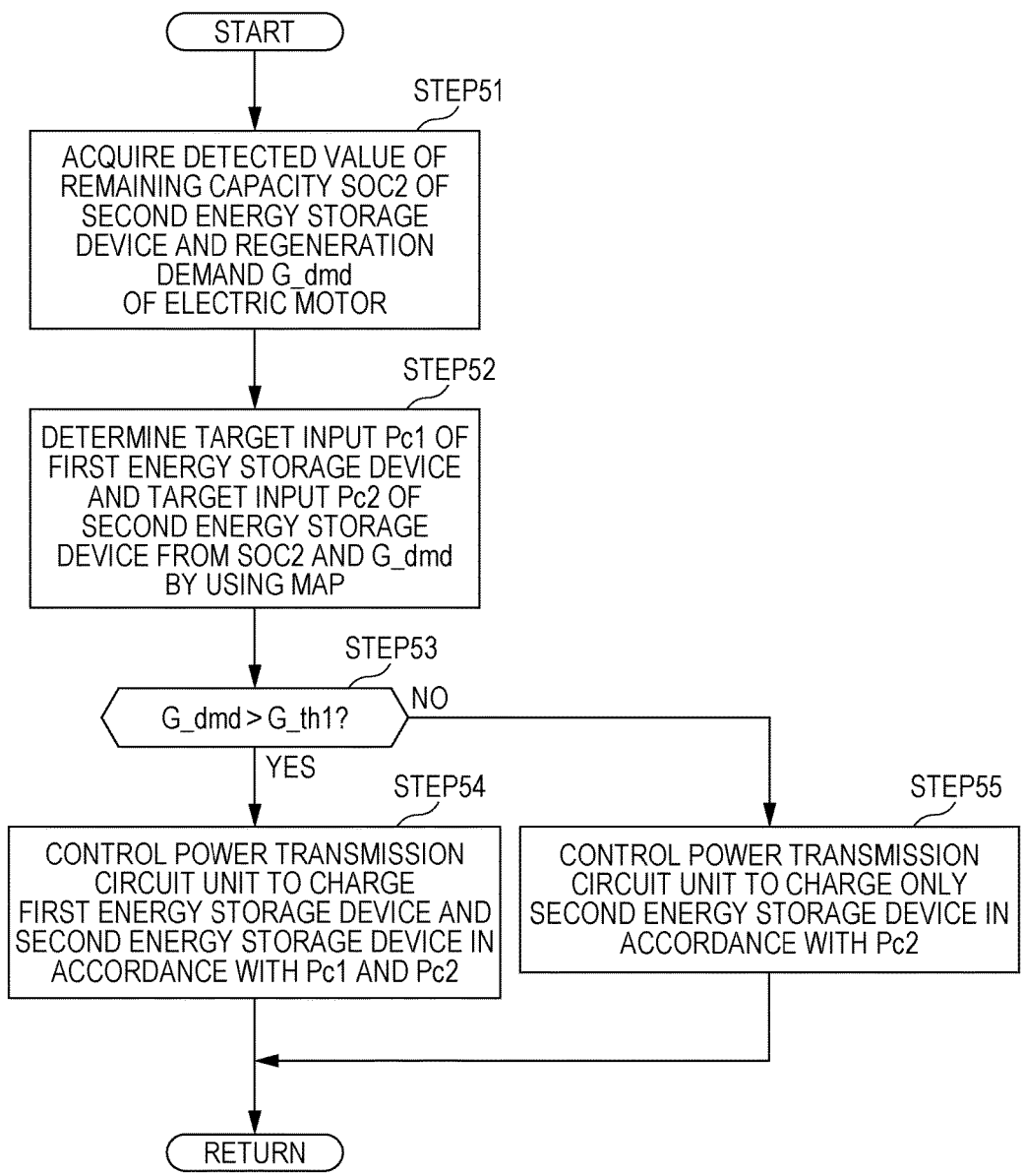
FIG. 20 is a flowchart illustrating a control process for the control device during the regenerative operation of an electric motor (a first embodiment).

In this embodiment, the control process for the power transmission controller 41 during the regenerative operation of the electric motor 100 is executed at intervals of a predetermined control process period in a way illustrated in a flowchart in FIG. 20.

Specifically, in STEP51, the power transmission controller 41 acquires a detected value of the second remaining capacity SOC2 and a regeneration demand G_dmd of the electric motor 100. In this embodiment, the regeneration demand G_dmd is a request value for power to be generated by the electric motor 100 (an amount of energy generated per unit time).

The regeneration demand G_dmd is determined from, for example, a braking force demand during the regenerative operation of the electric motor 100 and a detected value of the rotational speed of the electric motor 100 by using a map created in advance or by using an operational expression.

Then, in STEP52, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Figure 21:
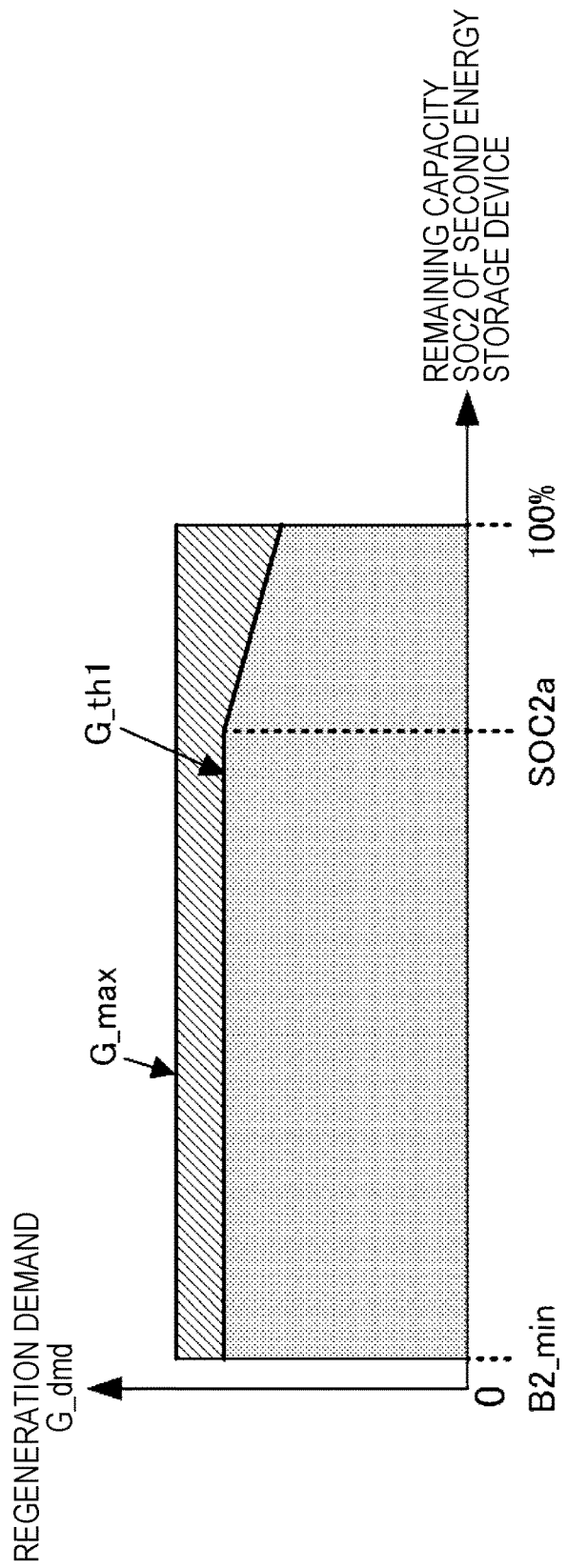
FIG. 21 illustrates a map for the process illustrated in FIG. 20.

FIG. 21 illustrates a visual representation of the map. On the map, a shaded area within which the regeneration demand G_dmd is less than or equal to a predetermined threshold value G_th1 represents an area within which only the second energy storage device 3 is charged (an area within which Pc1=0 holds), and a diagonally hatched area within which the regeneration demand G_dmd is greater than the threshold value G_th1 represents an area within which both the first energy storage device 2 and the second energy storage device 3 are charged.

The threshold value G_th1 is a threshold value set in accordance with the detected value of the second remaining capacity SOC2. In the illustrated example, the threshold value G_th1 is a predetermined constant value (fixed value) in an area within which the second remaining capacity SOC2 is less than or equal to a predetermined value SOC2a, and is set to decrease in accordance with an increase in the second remaining capacity SOC2 in an area within which the second remaining capacity SOC2 is larger than the predetermined value SOC2a. The threshold value G_th1 in an area less than or equal to the predetermined value SOC2a is set to a value closer to a maximum value G_max of the regeneration demand G_dmd.

In STEP52, when the combination of the detected value of the second remaining capacity SOC2 and the regeneration demand G_dmd falls within the shaded area, the target input Pc1 of the first energy storage device 2 is set to zero and the regeneration demand G_dmd is set as the target input Pc2 of the second energy storage device 3. Accordingly, if the regeneration demand G_dmd is smaller than the threshold value G_th1, the target inputs Pc1 and Pc2 are set so that only the second energy storage device 3 is charged with regenerative power.

When the combination of the detected value of the second remaining capacity SOC2 and the regeneration demand G_dmd falls within the diagonally hatched area, a regenerative value that matches the threshold value G_th1 is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Accordingly, the target inputs Pc1 and Pc2 are set so that, when the regeneration demand G_dmd is greater than the threshold value G_th1 and when the detected value of the second remaining capacity SOC2 is larger than the predetermined value SOC2a, the ratio of the target input Pc2 of the second energy storage device 3 to the regeneration demand G_dmd decreases as the detected value of the second remaining capacity SOC2 increases (in other words, so that the ratio of the target input Pc1 of the first energy storage device 2 to the regeneration demand G_dmd increases as the detected value of the second remaining capacity SOC2 increases).

Then, in STEP53, the power transmission controller 41 determines whether or not the regeneration demand G_dmd is greater than the threshold value G_th1.

The determination result of STEP53 is affirmative within the diagonally hatched area illustrated in FIG. 21. In this situation, in STEP54, the power transmission controller 41 controls the power transmission circuit unit 11 so that the first energy storage device 2 and the second energy storage device 3 are charged with the target inputs Pc1 and Pc2, respectively.

Specifically, the processing of STEP54 can be executed in the following way, for example. A target value for the output voltage of the inverter 17 (=the input voltages of the voltage converters 15 and 16) is set in accordance with the detected value of the rotational speed of the electric motor 100 or the like. In addition, the target input Pc1 is set as the target value for the output power from the voltage converter 15 to the first energy storage device 2, and the target input Pc2 is set as the target value for the output power from the voltage converter 16 to the second energy storage device 3.

Further, the inverter 17 is controlled so as to realize the target value for the output voltage of the inverter 17. Also, the voltage converters 15 and 16 are controlled so as to realize the target value for the output power from the voltage converter 15 to the first energy storage device 2 and the target value for the output power from the voltage converter 16 to the second energy storage device 3.

On the other hand, the determination result of STEP53 is negative within the shaded area illustrated in FIG. 21. In this situation, in STEP55, the power transmission controller 41 controls the power transmission circuit unit 11 so that only the second energy storage device 3 is charged with the target input Pc2.

Specifically, the processing of STEP55 can be executed in the following way, for example. A target value for the output voltage of the inverter 17 (=the input voltage of the voltage converter 16) is set in accordance with the detected value of the rotational speed of the electric motor 100 or the like. In addition, the target input Pc2 is set as the target value for the output power from the voltage converter 16 to the second energy storage device 3.

Further, the inverter 17 is controlled so as to realize the target value for the output voltage of the inverter 17. Also, the voltage converter 16 is controlled so as to realize the target value for the output power from the voltage converter 16 to the second energy storage device 3.

Furthermore, the voltage converter 15 is controlled to be in current flow interruption state. Alternatively, the contactor 12 on the first energy storage device 2 side is controlled to be turned off. This prohibits discharging from the first energy storage device 2.

The control process for the power transmission controller 41 during the regenerative operation of the electric motor 100 is executed in the way described above.

The control process for the power transmission controller 41 during the regenerative operation is executed in the way described above, thereby allowing regenerative power to be used to basically charge the second energy storage device 3. Only an excess of regenerative power used to charge the second energy storage device 3 (a regenerative value exceeding the threshold value G_th1) is used to charge the first energy storage device 2.

This allows the second remaining capacity SOC2 to be kept within the medium-remaining-capacity area or at a nearby remaining capacity value while reducing as much as possible the occurrence of a situation in which it is necessary to charge the second energy storage device 3 with power supplied by the first energy storage device 2.

In addition, the first energy storage device 2 typically has a low resistance to charging at high rates (high-speed charging in which the amount of charging power per unit time is large). However, reducing the regenerative value for the first energy storage device 2 as much as possible enables deterioration of the first energy storage device 2 to be prevented as much as possible.

For additional explanation, in this embodiment, the target inputs Pc1 and Pc2 during the regenerative operation of the electric motor 100 are set on the basis of the map illustrated in FIG. 21 to continuously change in response to a change in the regeneration demand G_dmd and the second remaining capacity SOC2. Thus, in this embodiment, the process for causing the input of the first energy storage device 2 and the second energy storage device 3 to discontinuously change is not necessary during the regenerative operation of the electric motor 100.

The correspondences between the first embodiment described above and the present disclosure will be briefly explained below.

In this embodiment, the driving force demand DT_dmd and the regeneration demand G_dmd of the electric motor 100 (electric load) correspond to an operation request value in the present disclosure.

The target outputs P1 and P2 and the target inputs Pc1 and Pc2 correspond to input and output target values in the present disclosure.

The threshold value B2_th1 regarding the second remaining capacity SOC2 corresponds to a first threshold value in the present disclosure. In this case, in the first or second control mode, when the driving force demand DT_dmd is increased from zero, the output of the second energy storage device 3 increases to the upper limit (the supplied power corresponding to the threshold value DT_th1) earlier than the output of the first energy storage device 2 in a state where the second remaining capacity SOC2 is larger than the threshold value B2_th2, and the output of the first energy storage device 2 increases to the upper limit (the supplied power corresponding to the threshold value DT_th3) earlier than the output of the second energy storage device 3 in a state where the second remaining capacity SOC2 is smaller than the threshold value B2_th2.

Second Embodiment

Next, a second embodiment of the present disclosure will be described with reference to FIG. 22 and FIG. 23. This embodiment is the same or substantially the same as the first embodiment, except for a control process performed during the regenerative operation of the electric motor 100. Thus, the same or substantially the same portions as those in the first embodiment are not described herein.

Figure 22:
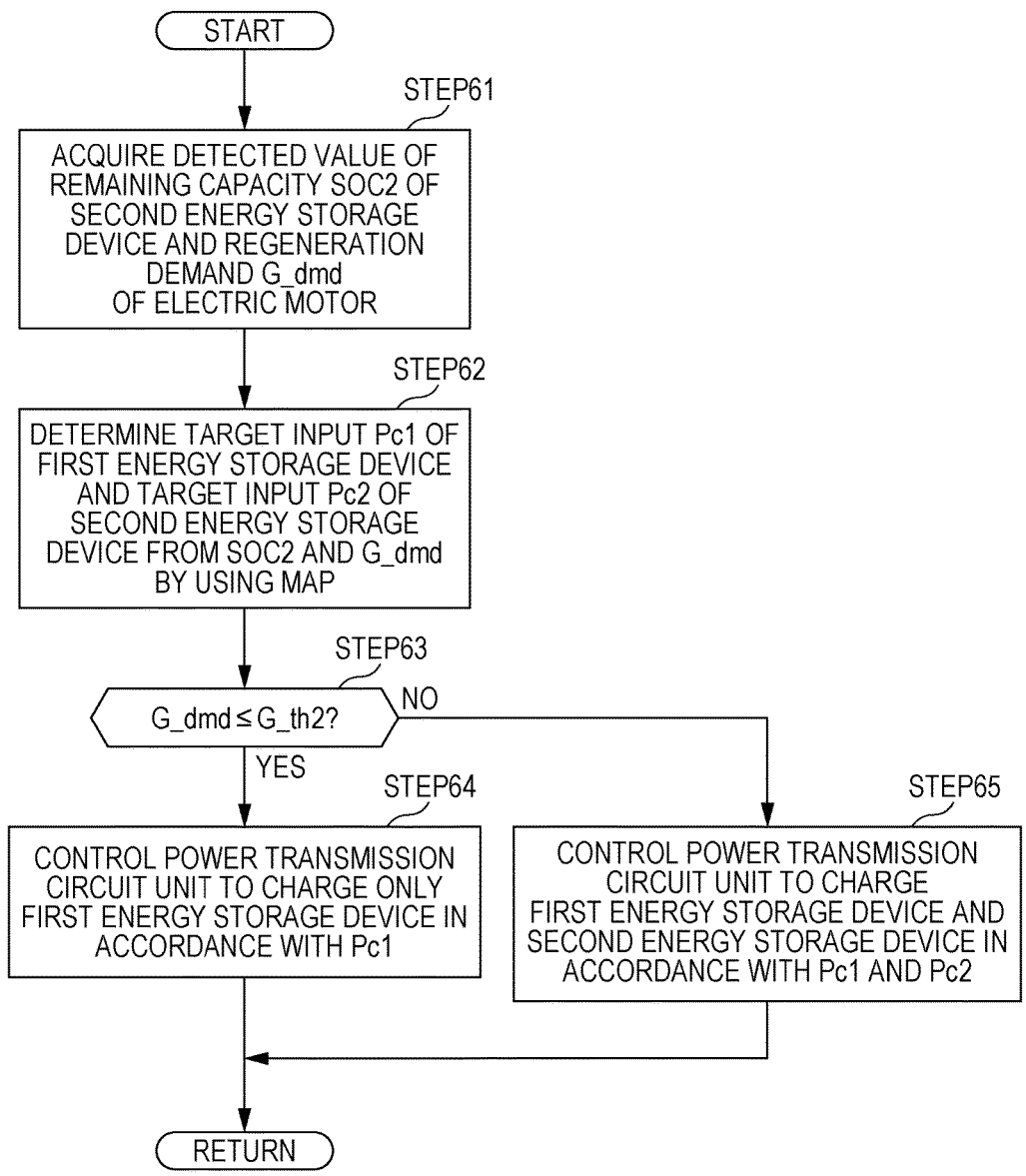
FIG. 22 is a flowchart illustrating a control process for the control device during the regenerative operation of the electric motor (a second embodiment).

In this embodiment, the control process for the power transmission controller 41 during the regenerative operation of the electric motor 100 is executed at intervals of a predetermined control process period in a way illustrated in a flowchart in FIG. 22.

Specifically, in STEP61, the power transmission controller 41 acquires a detected value of the second remaining capacity SOC2 and a regeneration demand G_dmd of the electric motor 100. The processing of STEP61 is the same or substantially the same as the processing of STEP51 in the first embodiment.

Then, in STEP62, the power transmission controller 41 determines the respective target inputs Pc1 and Pc1 (target charging powers) of the first energy storage device 2 and the second energy storage device 3 from the detected value of the second remaining capacity SOC2 and the regeneration demand G_dmd of the electric motor 100 on the basis of a map created in advance.

Figure 23:
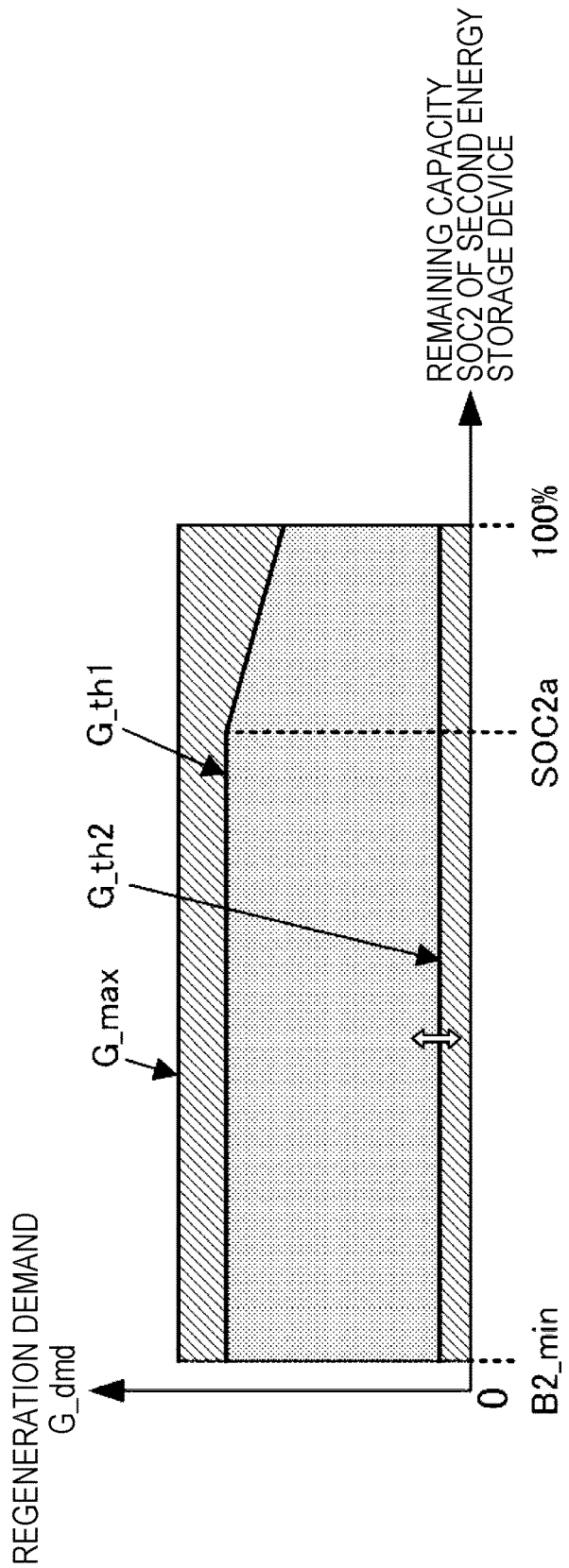
FIG. 23 illustrates a map for the process illustrated in FIG. 22 (or FIG. 24).

FIG. 23 illustrates a visual representation of the map in this embodiment. On the map, a diagonally hatched area within which the regeneration demand G_dmd is less than or equal to a predetermined threshold value G_th2 represents an area within which only the first energy storage device 2 is charged (an area within which Pc2=0 holds), and a shaded area within which the regeneration demand G_dmd is greater than the threshold value G_th2 and is less than or equal to a predetermined threshold value G_th1 and a diagonally hatched area within which the regeneration demand G_dmd is greater than the threshold value G_th1 represent an area within which both the first energy storage device 2 and the second energy storage device 3 are charged.

Of the threshold values G_th1 and G_th2, the threshold value G_th1 is a threshold value set in accordance with the detected value of the second remaining capacity SOC2, as in the first embodiment.

In this embodiment, the threshold value G_th2 is a predetermined constant value. The threshold value G_th2 is a comparatively small value (a near-zero value).

In STEP62, when the combination of the detected value of the second remaining capacity SOC2 and the regeneration demand G_dmd falls within the bottom diagonally hatched area, the target input Pc2 of the second energy storage device 3 is set to zero and the regeneration demand G_dmd is set as the target input Pc1 of the first energy storage device 2.

Accordingly, the target inputs Pc1 and Pc2 are set so that only the first energy storage device 2 is charged with regenerative power.

When the combination of the detected value of the second remaining capacity SOC2 and the regeneration demand within the shaded area, a regenerative value that matches the threshold value G_th2 is set as the target input Pc1 of the first energy storage device 2 and the residual regenerative value, which is obtained by subtracting the target input Pc1 of the first energy storage device 2 from the regeneration demand G_dmd, is set as the target input Pc2 of the second energy storage device 3.

When the combination of the detected value of the second remaining capacity SOC2 and the regeneration demand G_dmd falls within the top diagonally hatched area, a difference regenerative value between the threshold value G_th1 and the threshold value G_th2 (a difference regenerative value obtained by subtracting a regenerative value that matches the threshold value G_th2 from a regenerative value that matches the threshold value G_th1) is set as the target input Pc2 of the second energy storage device 3 and the residual regenerative value, which is obtained by subtracting the target input Pc2 of the second energy storage device 3 from the regeneration demand G_dmd, is set as the target input Pc1 of the first energy storage device 2.

Then, in STEP63, the power transmission controller 41 determines whether or not the regeneration demand G_dmd is less than or equal to the threshold value G_th2.

The determination result of STEP63 is affirmative within the bottom diagonally hatched area illustrated in FIG. 23. In this situation, in STEP64, the power transmission controller 41 controls the power transmission circuit unit 11 so that only the first energy storage device 2 is charged with the target input Pc1.

Specifically, the processing of STEP64 can be executed in the following way, for example. A target value for the output voltage of the inverter 17 (=the input voltage of the voltage converter 15) is set in accordance with the detected value of the rotational speed of the electric motor 100 or the like. In addition, the target input Pc1 is set as the target value for the output power from the voltage converter 15 to the first energy storage device 2.

target value for the output voltage of the inverter 17. Also, the voltage converter 15 is controlled so as to realize the target value for the output power from the voltage converter 15 to the first energy storage device 2.

Furthermore, the voltage converter 16 is controlled to be in current flow interruption state. Alternatively, the contactor 13 on the second energy storage device 3 side is controlled to be turned off. This prohibits discharging from the second energy storage device 3.

On the other hand, the determination result of STEP63 is negative within the shaded area or the top diagonally hatched area illustrated in FIG. 23. In this situation, in STEP65, the power transmission controller 41 controls the power transmission circuit unit 11 so that the first energy storage device 2 and the second energy storage device 3 are charged with the target inputs Pc1 and Pc2, respectively.

In this case, a specific control process for the power transmission circuit unit 11 can be executed in a manner similar to that in the processing of STEP54 in the first embodiment.

In this embodiment, the control process for the power transmission controller 41 during the regenerative operation of the electric motor 100 is executed in the way described above.

The control process for the power transmission controller 41 during the regenerative operation is executed in the way described above, thereby allowing the first energy storage device 2 to be charged with a small amount of regenerative power less than or equal to the threshold value G_th2, except for the case where the regeneration demand G_dmd is greater than the threshold value G_th1. Since the amount of charging power used to charge the first energy storage device 2 is small, the first energy storage device 2 can be charged at a low charging rate (low rate). This allows the first energy storage device 2 to be charged while preventing the progression of deterioration of the first energy storage device 2 during the regenerative operation. Therefore, the drivable range of the vehicle can be extended.

In addition, an amount of regenerative power exceeding the threshold value G_th2 is used to charge the second energy storage device 3. This allows the second remaining capacity SOC2 to be kept within the medium-remaining-capacity area or at a nearby remaining capacity value while reducing the occurrence of a situation in which it is necessary to charge the second energy storage device 3 with power supplied by the first energy storage device 2.

For additional explanation, in this embodiment, the target inputs Pc1 and Pc2 during the regenerative operation of the electric motor 100 are set on the basis of the map illustrated in FIG. 23 to continuously change in response to a change in the regeneration demand G_dmd and the second remaining capacity SOC2. Thus, in this embodiment, the process for causing the input of the first energy storage device 2 and the second energy storage device 3 to discontinuously change is not necessary during the regenerative operation of the electric motor 100.

In this embodiment, furthermore, during the power-running operation of the electric motor 100, as in the first embodiment, a discontinuous change in the output of the first energy storage device 2 and the second energy storage device 3 is prevented. Thus, the progression of deterioration of the first energy storage device 2 can be restrained during power supply to the electric motor 100.

The correspondences between this embodiment and the present disclosure are the same as those for the first embodiment.

Third Embodiment

Next, a third embodiment of the present disclosure will be described with reference to FIG. 24 and FIG. 25. This embodiment is the same or substantially the same as the second embodiment, except for a control process performed during the regenerative operation of the electric motor 100. Thus, the same or substantially the same portions as those in the first embodiment are not described herein.

Figure 24:
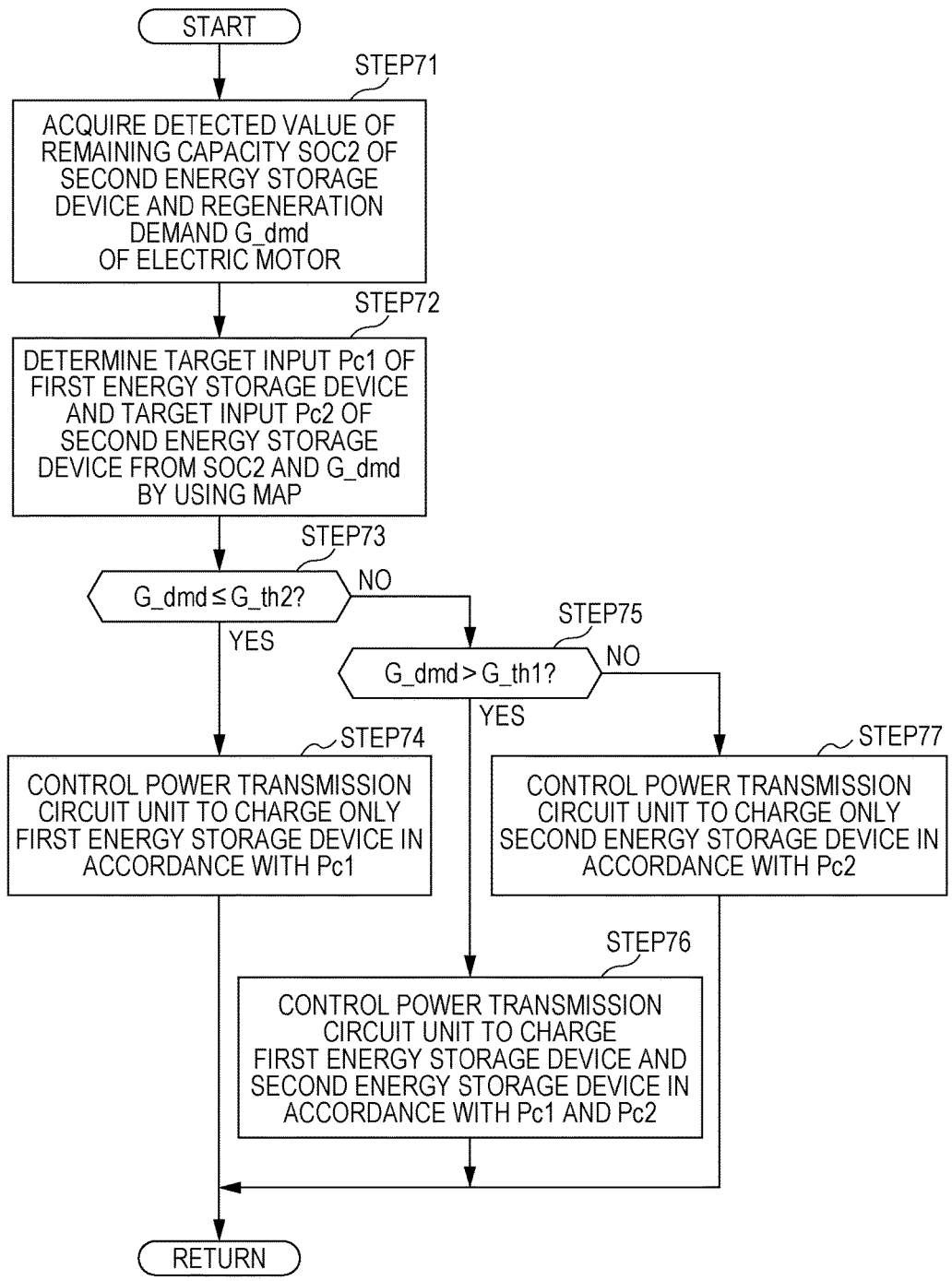
FIG. 24 is a flowchart illustrating a control process for the control device during the regenerative operation of the electric motor (a third embodiment).

In this embodiment, the control process for the power transmission controller 41 during the regenerative operation of the electric motor 100 is executed at intervals of a predetermined control process period in a way illustrated in a flowchart in FIG. 24.

Specifically, in STEP71, the power transmission controller 41 acquires a detected value of the second remaining capacity SOC2 and a regeneration demand G_dmd of the electric motor 100. The processing of STEP71 is the same or substantially the same as the processing of STEP51 in the first embodiment.

Then, in STEP72, the power transmission controller 41 determines the respective target inputs Pc1 and Pc2 (target charging powers) of the first energy storage device 2 and the second energy storage device 3 from the detected value of the second remaining capacity SOC2 and the regeneration demand G_dmd of the electric motor 100 on the basis of a map created in advance.

Note that the map used in this embodiment (how areas are separated by the threshold values G_th1 and G_th2) is the same or substantially the same as that in the second embodiment (illustrated in FIG. 23). In this embodiment, however, the energy storage device to be charged in the shaded area within which the regeneration demand G_dmd is greater than the threshold value G_th2 and is less than or equal to the threshold value G_th1 is different from that in the second embodiment. In this embodiment, furthermore, the ratio of the charging powers of the first energy storage device 2 and the second energy storage device 3 in the diagonally hatched area within which the regeneration demand G_dmd is greater than the threshold value G_th1 (i.e., the top diagonally hatched area) is different from that in the second embodiment.

Specifically, in this embodiment, the shaded area illustrated in FIG. 23 is an area within which only the second energy storage device 3 is charged. When the combination of the detected value of the second remaining capacity SOC2 and the regeneration demand G_dmd falls within the shaded area illustrated in FIG. 23, the target input Pc1 of the first energy storage device 2 is set to zero and the regeneration demand G_dmd is set as the target input Pc2 of the second energy storage device 3.

In this embodiment, furthermore, in the top diagonally hatched area, a regenerative value that matches the threshold value G_th1 is set as the target input Pc2 of the second energy storage device 3, and the residual regenerative value, which is obtained by subtracting the target input Pc2 of the second energy storage device 3 from the regeneration demand G_dmd, is set as the target input Pc1 of the first energy storage device 2.

The method of setting the target inputs Pc1 and Pc2 in the bottom diagonally hatched area illustrated in FIG. 23 is the same or substantially the same as that in the second embodiment.

Then, in STEP73, the power transmission controller 41 determines whether or not the regeneration demand G_dmd is less than or equal to the threshold value G_th2.

The determination result of STEP73 is affirmative within the bottom diagonally hatched area illustrated in FIG. 23. In this situation, in STEP74, the power transmission controller 41 controls the power transmission circuit unit 11 so that only the first energy storage device 2 is charged with the target input Pc1. In this case, the target input Pc2 of the second energy storage device 3 is set to zero.

In this case, a specific control process for the power transmission circuit unit 11 can be executed in a manner similar to that in the processing of STEP64 in the second embodiment.

In this embodiment, however, when the power transmission circuit unit 11 is controlled in accordance with the target inputs Pc1 and Pc2, a process for preventing a discontinuous change in the actual input of the first energy storage device 2 and the second energy storage device 3 is also executed if the target input Pc1 of the first energy storage device 2 discontinuously changes. This process will be described below.

On the other hand, if the determination result of STEP73 is negative, then, in STEP75, the power transmission controller 41 further determines whether or not the regeneration demand G_dmd is greater than the threshold value G_th1.

The determination result of STEP75 is affirmative within the top diagonally hatched area illustrated in FIG. 23. In this situation, in STEP76, the power transmission controller 41 controls the power transmission circuit unit 11 so that the first energy storage device 2 and the second energy storage device 3 are charged with the target inputs Pc1 and Pc2, respectively.

In this case, a specific control process for the power transmission circuit unit 11 can be executed in a manner similar to that in the processing of STEP54 in the first embodiment.

The determination result of STEP75 is negative within the shaded area illustrated in FIG. 23. In this case, in STEP77, the power transmission controller 41 controls the power transmission circuit unit 11 so that only the second energy storage device 3 is charged with the target input Pc2.

In this case, a specific control process for the power transmission circuit unit 11 can be executed in a manner similar to that in the processing of STEP55 in the first embodiment.

In this embodiment, basically, the power transmission circuit unit 11 is controlled so that when the regeneration demand G_dmd is smaller than the threshold value G_th2, only the first energy storage device 2 is charged with regenerative power and when the regeneration demand G_dmd is larger than the threshold value G_th2 and is smaller than the threshold value G_th1 to the other state, only the second energy storage device 3 is charged with regenerative power. Thus, as indicated by a hollow arrow in FIG. 23, when the regeneration demand G_dmd changes from one of the state where the regeneration demand G_dmd is smaller than the threshold value G_th2 and the state where the regeneration demand G_dmd is larger than the threshold value G_th2 to the other state, the target inputs Pc1 and Pc2 discontinuously and rapidly changes.

In particular, the rapid change in the input of the first energy storage device 2 causes the progression of deterioration of the first energy storage device 2 to be more likely to occur.

Accordingly, in this embodiment, the power transmission controller 41 executes a process for preventing a discontinuous change in the respective actual inputs (the amounts of charging power) of the first energy storage device 2 and the second energy storage device 3 during the regenerative operation of the electric motor 100.

Figure 25:
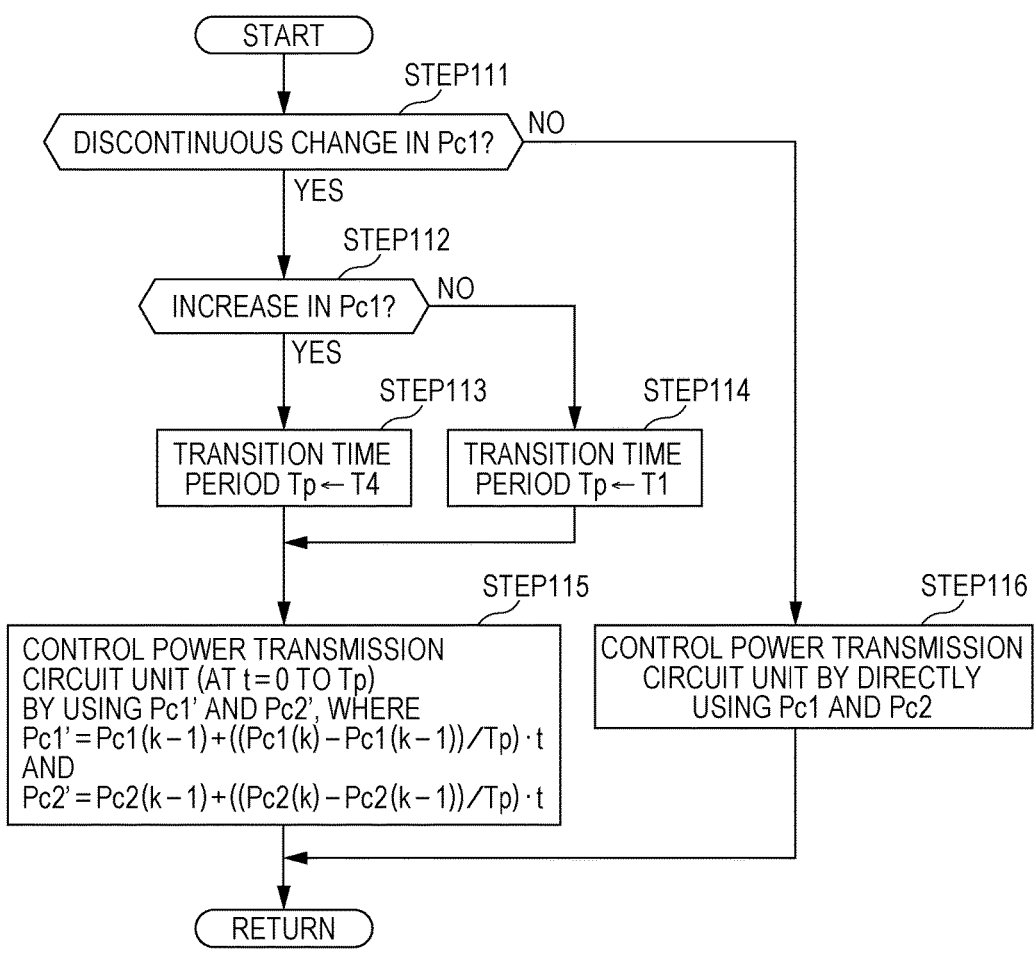
FIG. 25 is a flowchart illustrating a process for preventing a discontinuous change in the input of the first energy storage device.

This process is executed in STEP74, STEP76, and STEP77 in a way illustrated in FIG. 25.

Specifically, in STEP111, the power transmission controller 41 determines whether or not a discontinuous change in the target input Pc1 of the first energy storage device 2 has occurred. In this case, the power transmission controller 41 determines that a discontinuous change in the target input Pc1 has occurred when, for example, the absolute value of the difference between the target input Pc1 determined during the current control process period and the target input Pc1, determined during the previous (immediately preceding) control process period is larger than a predetermined value.

When the regeneration demand G_dmd changes from a value below the threshold value G_th2 to a value above the threshold value G_th2 or vice versa, if the target input Pc1 of the first energy storage device 2 discontinuously changes, the target input Pc2 of the second energy storage device 3 also discontinuously changes. Thus, in STEP111, the power transmission controller 41 may determine whether or not a discontinuous change in the target input Pc2 has occurred.

In STEP111, furthermore, for example, the condition that the threshold value G_th2 is in the range between the detected value of the second remaining capacity SOC2 obtained during the current control process period and the detected value of the second remaining capacity SOC2 obtained during the previous control process period may be used as a condition necessary to determine that a discontinuous change in the target input Pc1 has occurred.

If the determination result of STEP111 is negative, in STEP116, the power transmission controller 41 controls the power transmission circuit unit 11 in the manner described above by directly using the target inputs Pc1 and Pc2 determined during the current control process period.

On the other hand, if the determination result of STEP111 is affirmative, then, in STEP112, the power transmission controller 41 determines whether or not the discontinuous change in the target input Pc1 is an increase in the target input Pc1. If this determination result is affirmative (when the target input Pc1 increases), in STEP113, the power transmission controller 41 sets a predetermined value T4 as a transition time period Tp. The transition time period Tp is a time period required for the respective inputs of the first energy storage device 2 and the second energy storage device 3 to change from target inputs Pc1(k−1) and Pc2(k−1) determined during the previous control process period to target inputs Pc1(k) and Pc2(k) newly determined during the current control process period.

If the determination result of STEP112 is negative (when the target input Pc1 decreases), in STEP114, the power transmission controller 41 sets a predetermined value T1 as the transition time period Tp. As illustrated in FIG. 14, the predetermined value T1 indicates a time period shorter than the predetermined value T4 in STEP113.

As described above, when the input (the amount of charging power) of the first energy storage device 2 is increased rapidly, deterioration of the first energy storage device 2 is more likely to progress than when the input of the first energy storage device 2 is decreased rapidly. Thus, in this embodiment, the predetermined values T4 and T1 are set to satisfy the magnitude relationship of T4>T1 so as to cause the input of the first energy storage device 2 to change more gently when the discontinuous change in the target input Pc1 is an increase in the target input Pc1 than when the discontinuous change in the target input Pc1 is a decrease in the target input Pc1.

As described above, furthermore, when the input (the amount of charging power) of the first energy storage device 2 is increased rapidly, deterioration of the first energy storage device 2 is more likely to progress than when the output (the amount of discharge power) of the first energy storage device 2 is increased rapidly. In addition, when the output (the amount of discharge power) of the first energy storage device 2 is decreased rapidly, deterioration of the first energy storage device 2 is more likely to progress than when the input (the amount of charging power) of the first energy storage device 2 is decreased rapidly.

Accordingly, in this embodiment, as illustrated in FIG. 14, the predetermined values T4 and T1 are further set with respect to the predetermined values T3 and T2 as the transition time periods Tp during power supply to the electric motor 100 (during the power-running operation) so that T4>T3 and T1<T2 are satisfied.

Referring back to FIG. 25, after the processing of STEP113 and STEP114, in STEP115, the power transmission controller 41 determines an input command value Pc1', which is a command value for the input (the amount of charging power) of the first energy storage device 2, and an input command value Pc2', which is a command value for the input (the amount of charging power) of the second energy storage device 3, in accordance with equations (3) and (4) below. The input command values Pc1' and Pc2' are command values used to control the actual input of the first energy storage device 2 and the actual input of the second energy storage device 3, respectively.

$$Pc1'=Pc1(k-1)+((Pc1(k)-Pc1(k-1))/Tp) \cdot t \quad (3)$$

$$Pc2'=Pc2(k-1)+((Pc2(k)-Pc2(k-1))/Tp) \cdot t \quad (4)$$

In equations (3) and (4), as in equations (1) and (2), t denotes a time value updated to increase from zero (the time of the current control process period) to the time after the elapse of the transition time period Tp by the amount corresponding to one control process period for each control process period.

Then, in STEP115, the power transmission controller 41 controls the power transmission circuit unit 11 by using the input command values Pc1' and Pc2' determined in accordance with equations (3) and (4) instead of the target inputs Pc1 and Pc2 (by respectively using the values Pc1' and Pc2' as the target values of the output powers of the voltage converters 15 and 16 (the output power on the energy storage device 2 side and the output power on the energy storage device 3 side, respectively)).

In this case, the values given by ((Pc1(k)−Pc1(k−1))/Tp) and ((Pc2(k)−Pc2(k−1))/Tp) correspond to the rates of change in the values Pc1' and Pc2', respectively, which become slow as the transition time period Tp increases. As described above, the transition time period Tp is set in accordance with whether the discontinuous change in the target input Pc1 of the first energy storage device 2 is an increase or a decrease.

Accordingly, when the discontinuous change in the target input Pc1 of the first energy storage device 2 is an increase, the input command values Pc1' and Pc2' are determined to change gradually at a rate slower than that when the discontinuous change in the target input Pc1 of the first energy storage device 2 is a decrease.

In addition, when the discontinuous change in the target input Pc1 is an increase, the input command value Pc1' is determined to change gradually at a rate slower than that when the target output P1 increases.

In addition, when the discontinuous change in the target input Pc1 is a decrease, the input command value Pc1' is determined to change at a rate faster than that when the target output P1 decreases.

After the time value t has reached the transition time period Tp in the processing of STEP115, the process resumes from STEP111.

The process illustrated in FIG. 25 is executed in the way described above. Thus, the actual input of the first energy storage device 2 gradually changes, and is prevented from discontinuously and rapidly changing.

Since the transition time period Tp satisfies T1<T4, when the target input Pc1 of the first energy storage device 2 discontinuously increases, the input command value Pc1' is determined so as to cause the input of the first energy storage device 2 to change at a rate slower than that when the target input Pc1 of the first energy storage device 2 discontinuously decreases.

In addition, since T3<T4 is satisfied, the input command value Pc1' which is determined when the discontinuous change in the target input Pc1 is an increase during the regenerative operation of the electric motor 100 is determined to change gradually at a rate slower than the output command value P1' which is determined when the discontinuous change in the target output P1 is an increase during the power-running operation of the electric motor 100.

Furthermore, since T2>T1 is satisfied, the output command value P1' which is determined when the discontinuous change in the target output P1 is a decrease during the power-running operation of the electric motor 100 is determined to change gradually at a rate slower than the input command value Pc1' which is determined when the discontinuous change in the target input Pc1 is a decrease during the regenerative operation of the electric motor 100.

Thus, the progression of deterioration of the first energy storage device 2 during power supply to the electric motor 100 can be appropriately restrained.

In addition, in this embodiment, a discontinuous change in the input of the second energy storage device 3 is also prevented. Thus, excessive variations in the input of the second energy storage device 3 are suppressed or reduced, resulting in the progression of deterioration of the second energy storage device 3 also being restrained.

In this embodiment, the control process for the power transmission controller 41 during the regenerative operation of the electric motor 100 is executed in the way described above.

The control process for the power transmission controller 41 during the regenerative operation is executed in the way described above, thereby allowing, when the regeneration demand G_dmd is a small regenerative value less than or equal to the threshold value G_th2, the first energy storage device 2 to be charged with power having the small regenerative value. In this case, as in the second embodiment, the first energy storage device 2 can be charged slowly at a low charging rate. This allows the first energy storage device 2 to be charged while preventing the progression of deterioration of the first energy storage device 2. Therefore, the drivable range of the vehicle can be extended.

When the regeneration demand G_dmd is greater than the threshold value G_th2, only the second energy storage device 3 is charged with regenerative power corresponding to the regeneration demand G_dmd so long as the threshold value G_th1 is not exceeded. In this case, even if the second energy storage device 3 is not charged at a low charging rate, deterioration of the second energy storage device 3 is less likely to progress. This can facilitate rapid charging of the second energy storage device 3. Thus, the power transmission circuit unit 11 can be controlled with high stability during the regenerative operation.

In this embodiment, furthermore, during the power-running operation of the electric motor 100, as in the first embodiment, a discontinuous change in the output of the first energy storage device 2 and the second energy storage device 3 is prevented. Thus, the progression of deterioration of the first energy storage device 2 can also be restrained during power supply to the electric motor 100.

The correspondences between the third embodiment described above and the present disclosure will now be briefly explained below.

In this embodiment, the threshold value G_th2 regarding the regeneration demand G_dmd corresponds to an A-th threshold value in the present disclosure. In this case, the power transmission circuit unit 11 is controlled so that when the regeneration demand G_dmd (an operation request value during regenerative operation) is smaller than the threshold value G_th2, the input of the first energy storage device 2 is larger than the input of the second energy storage device 3 and when the regeneration demand G_dmd is larger than the threshold value G_th2, the input of the second energy storage device 3 is larger than the input of the second energy storage device 3.

The other correspondences between this embodiment and the present disclosure are the same as those for the first embodiment.

For additional explanation, in the second embodiment, when the regeneration demand G_dmd is larger than the threshold value G_th1, as in the third embodiment, a regenerative value that matches the threshold value G_th1 may be set as the target input Pc2 of the second energy storage device 3, and the residual regenerative value, which is obtained by subtracting the target input Pc2 of the second energy storage device 3 from the regeneration demand G_dmd, may be set as the target input Pc1 of the first energy storage device 2.

Alternatively, in the third embodiment, when the regeneration demand G_dmd is larger than the threshold value G_th1, as in the second embodiment, a difference regenerative value between the threshold value G_th1 and the threshold value G_th2 (a difference regenerative value obtained by subtracting a regenerative value that matches the threshold value G_th2 from a regenerative value that matches the threshold value G_th1) may be set as the target input Pc2 of the second energy storage device 3, and the residual regenerative value, which is obtained by subtracting the target input Pc2 of the second energy storage device 3 from the regeneration demand G_dmd, may be set as the target input Pc1 of the first energy storage device 2.

In the second embodiment and the third embodiment, in the foregoing situation, when the regeneration demand G_dmd changes from one of the state where the regeneration demand G_dmd is larger than the threshold value G_th1 and the state where the regeneration demand G_dmd is smaller than the threshold value G_th1 to the other state, the target inputs Pc1 and Pc2 discontinuously change. In this case, the process illustrated in FIG. 25 can prevent a discontinuous change in the respective actual inputs of the first energy storage device 2 and the second energy storage device 3.

Modifications

There will now be described some modifications which may be made to the first to third embodiments described above.

The embodiments described above provide the power supply system 1, which controls the power transmission circuit unit 11 in three control modes, namely, the first to third control modes. The number of control modes for the power transmission circuit unit 11 may be two or more than three. Alternatively, the power supply system 1 may be configured to control the power transmission circuit unit 11 by using only one of the first to third control modes.

In addition, in different control modes, a different control mode may be used for only one of the base supplied power P1_base and the threshold value B2_th1 regarding the second remaining capacity SOC2. For example, a control mode in which only one of the maximum value P1b of the base supplied power P1_base and the threshold value B2_th1 is different from that in the first control mode may be additionally used or may be used in place of the second or third control mode.

In addition, the extended-stop control process or the control process during the regenerative operation may be omitted.

In addition, when a specific control mode among the first to third control modes is set for the control device 5, both the first energy storage device 2 and the second energy storage device 3 may be prohibited from being charged with regenerative power during the regenerative operation of the electric motor 100 to restrain the progression of deterioration of both the first energy storage device 2 and the second energy storage device 3 as much as possible. In this case, the control device 5 can prohibit the energy storage devices 2 and 3 from being charged with regenerative power supplied from the electric motor 100 by, for example, controlling the inverter 17 to be in current flow interruption state, controlling both the voltage converters 15 and 16 to be in current flow interruption state, or controlling both the contactors 12 and 13 to be turned off.

Thus, the progression of deterioration of each of the first energy storage device 2 and the second energy storage device 3 due to its charging operation can be avoided during the regenerative operation of the electric motor 100. In particular, when the first control mode is set, both the both the energy storage devices 2 and 3 are prohibited from being charged with regenerative power, thereby effectively delaying the progression of deterioration of both the energy storage devices 2 and 3.

Both the energy storage devices 2 and 3 may be prohibited from being charged with regenerative power in a plurality of control modes among the first to third control modes or in all of the control mode.

The manner in which the target outputs P1 and P2 are set in the normal combined-use control process is not limited to that in the embodiments described above. For example, the target outputs P1 and P2 may be set in such a manner as to reflect not only the driving force demand DT_dmd and the second remaining capacity SOC2 but also the detected value of the first remaining capacity SOC1 or the detected value of the temperature of each of the energy storage devices 2 and 3, if necessary.

In the embodiments described above, furthermore, the driving force demand DT_dmd of the electric motor 100 is used as an output demand of the electric motor 100 (electric load). Alternatively, for example, an amount of energy to be supplied to the electric motor 100 per unit time in response to the driving force demand DT_dmd or a request value for the current flowing through the electric motor 100 (a request value for the amount of charge per unit time) which corresponds to the driving force demand DT_dmd may be used as an output demand of the electric motor 100 (electric load).

In the embodiments described above, furthermore, the electric load is the electric motor 100, by way of example but not limited. The electric load may be an electric actuator other than the electric motor 100, or may be an electrical device that does not output any mechanical power.

In addition, a transportation device in which the power supply system 1 is mounted is not limited to an electrically driven vehicle. The transportation device may be a hybrid vehicle, for example, or may be a ship, a railway vehicle, or any other device.

A power supply system according to one aspect of the present disclosure includes a first energy storage device, a second energy storage device, a power transmission circuit unit, and a control device configured to have a function of controlling the power transmission circuit unit (a first aspect of the present disclosure). The power transmission circuit unit is disposed in a power transmission path among an electric load, the first energy storage device, and the second energy storage device. The electric load is activated upon being supplied with power from at least one of the first energy storage device and the second energy storage device. The power transmission circuit unit is configured to be capable of controlling power transmission among the electric load, the first energy storage device, and the second energy storage device in accordance with a control signal provided to the power transmission circuit unit. The control device is configured to acquire at least one operation request value out of an operation request value of the electric load which specifies an amount of power supplied to the electric load when power is supplied from at least one of the first energy storage device and the second energy storage device to the electric load and an operation request value of the electric load which specifies an amount of regenerative power output from the electric load when at least one of the first energy storage device and the second energy storage device is charged with regenerative power supplied from the electric load. The control device is configured to determine an input or output target value of the first energy storage device and an input or output target value of the second energy storage device, each input or output target value being a target value of an input or output of the corresponding one of the first energy storage device and the second energy storage device, so as to change the respective inputs or outputs of the first energy storage device and the second energy storage device in accordance with one or more state quantities including at least the operation request value, and is configured to have a function of controlling the power transmission circuit unit so as to satisfy the input or output target values. The control device is configured to control the power transmission circuit unit so that when a change in the input or output target value of the first energy storage device or the second energy storage device which is defined in accordance with a change in the one or more state quantities is a discontinuous change, an actual input or output to be controlled to be the input or output target value which discontinuously changes is changed more gradually than the input or output target value which discontinuously changes.

Certain terms as used herein will be briefly explained below. The phrase "the power transmission circuit unit is capable of controlling power transmission among the electric load, the first energy storage device, and the second energy storage device" refers to that the power transmission circuit unit at least has a function of being capable of controlling the power supplied from each of the first energy storage device and the second energy storage device to the electric load or has, in addition to this function, a function of being capable of providing selective switching control of the source and destination of power supply among the electric load, the first energy storage device, and the second energy storage device and controlling the power supplied from the source to the destination. In this case, if the electric load is an electric load capable of outputting regenerative power while no power is supplied to the electric load, the electric load may be the source of supply of power (regenerative power) and one or both of the first energy storage device and the second energy storage device may be the destination (the target to be charged with regenerative power).

The "input or output" of each of the first energy storage device and the second energy storage device refers to the "input" or "output" of each energy storage device. The "input" of each energy storage device refers to the amount of charging power used to charge the energy storage device, the "output" of each energy storage device refers to the amount of discharge power output from the energy storage device.

The amount of power supplied to the electric load refers to an amount of electricity to be supplied to the electric load, and the amount of regenerative power output from the electric load refers to an amount of electricity of regenerative power output from the electric load.

An amount of charging power (input), an amount of discharge power (output), and an amount of electricity are expressed as an amount of electrical energy per unit time (e.g., a value of (electric) power) or an amount of charge per unit time (e.g., a value of current), for example.

The "operation request value of an electric load which specifies an amount of power supplied to the electric load" refers to a request value regarding the state of operation of the electric load during power supply to the electric load, the request value being correlated with the power supplied to the electric load in such a manner that the power supplied to the electric load monotonically increases or decreases in accordance with an increase or decrease in the request value. Examples of the operation request value include a request value for the power supplied to the electric load. For example, if the electric load is designed to generate a mechanical output (dynamic or kinetic energy) corresponding to the supplied power, a request value for the mechanical output may be used as the operation request value.

The "operation request value of an electric load which specifies an amount of regenerative power output from the electric load" refers to a request value regarding the state of operation of the electric load when regenerative power is output from the electric load, the request value being correlated with the regenerative power in such a manner that the magnitude of the regenerative power monotonically increases or decreases in accordance with an increase or decrease in the request value. Examples of the operation request value include a request value for an amount of electricity output from the electric load during a regenerative operation (e.g., a request value for the regenerative power). For example, if the electric load is an electric load (e.g., an electric motor) that generates a braking force corresponding to the regenerative power to be output, a request value for the braking force may be used as the operation request value.

The "discontinuous change" in the input or output target value refers to a change in the input or output target value for which the magnitude of the degree of change in the input or output target value in response to a change in the state quantity described above (the degree of change corresponding to a value obtained by partially differentiating the input or output target value with respect to the state quantity) is greater than or equal to a predetermined value.

The "remaining capacity" may be either of an amount of electric power (e.g., an amount of electric power expressed in ampere hours (Ah)) stored in an energy storage device (the first energy storage device or the second energy storage device) and a charging rate (expressed in percentages (%)) obtained by dividing the amount of electric power by a fully charged capacity of the energy storage device.

Based on the terms defined above, exemplary embodiments of the present disclosure will now be described.

According to the first aspect of the present disclosure, the control device controls the power transmission circuit unit so that when a change in the input or output target value of the first energy storage device or the second energy storage device which is defined in accordance with a change in the one or more state quantities is a discontinuous change, an actual input or output to be controlled to be the input or output target value which discontinuously changes is changed more gradually than the input or output target value which discontinuously changes.

According to this configuration, a discontinuous change in the actual input or output of the first energy storage device or the second energy storage device is prevented.

Accordingly, the first aspect of the present disclosure enables prevention of a discontinuous change in the input or output of at least one energy storage device out of two energy storage devices to restrain the progression of deterioration of the at least one energy storage device as much as possible.

In the first aspect of the present disclosure, the first energy storage device and the second energy storage device may be energy storage devices having different characteristics. In this case, preferably, for example, the first energy storage device is an energy storage device having a higher energy density and a lower power density than the second energy storage device (a second aspect of the present disclosure).

According to this configuration, a combination of the first energy storage device and the second energy storage device can realize an energy source with both increased power density and energy density, which is difficult to realize with a single type of energy storage device.

Since the first energy storage device has a relatively high energy density, power can be continuously supplied to the electric load for as long a period as possible.

Since the second energy storage device has a relatively high power density, even if the operation request value of the electric load changes over a comparatively large range during power supply to the electric load, the supplied power corresponding to the operation request value can be supplied to the electric load with high responsivity.

The "supplied power corresponding to the operation request value" during power supply to an electric load refers to a supplied power to be supplied to the electric load to meet the operation request value.

In the first or second aspect of the present disclosure, the control device may be configured to control the power transmission circuit unit so that a rate of increase in the actual input or output of one of the first energy storage device and the second energy storage device when the input or output target value of the one of the first energy storage device and the second energy storage device discontinuously increases is different in magnitude from a rate of decrease in the actual input or output of the one of the first energy storage device and the second energy storage device when the input or output target value of the one of the first energy storage device and the second energy storage device discontinuously decreases (a third aspect of the present disclosure).

According to this configuration, the actual input or output of one of the first energy storage device and the second energy storage device can be changed so as to reflect the difference in characteristics between when the input or output of this energy storage device increases and when the input or output of this energy storage device decreases.

For example, as in the second aspect of the present disclosure, if the first energy storage device is an energy storage device having a higher energy density and a lower power density than the second energy storage device, typically, deterioration of the first energy storage device is more likely to progress when the input or output of the first energy storage device increases rapidly than when the input or output of the first energy storage device decreases rapidly.

In the second aspect of the present disclosure, accordingly, preferably, the control device is configured to control the power transmission circuit unit so that a magnitude of a rate of increase in the actual input or output of the first energy storage device when the input or output target value of the first energy storage device discontinuously increases is less than a magnitude of a rate of decrease in the actual input or output of the first energy storage device when the input or output target value of the first energy storage device discontinuously decreases (a fourth aspect of the present disclosure).

According to this configuration, the effect of restraining a rapid increase in the actual input or output of the first energy storage device can be increased, which results in the progression of deterioration of the first energy storage device being effectively suppressed or reduced. In particular, the first energy storage device has a dominant effect on the period during which power can be continuously supplied to the electric load. Hence, the fourth aspect of the present disclosure enables power to be continuously supplied to the electric load for as long a period as possible.

In the first to fourth aspects of the present disclosure, the control device may be configured to control the power transmission circuit unit so that a rate of change in the actual output of one of the first energy storage device and the second energy storage device when the target value of the output of the one of the first energy storage device and the second energy storage device discontinuously changes is different in magnitude from a rate of change in the actual input of the one of the first energy storage device and the second energy storage device when the target value of the input of the one of the first energy storage device and the second energy storage device discontinuously changes (a fifth aspect of the present disclosure).

According to this configuration, the actual input or output of one of the first energy storage device and the second energy storage device can be changed so as to reflect the difference in characteristics between when the output (the amount of discharge power) of this energy storage device increases or decreases and when the input (the amount of charging power) of energy storage device increases or decreases.

For example, as in the second aspect of the present disclosure, if the first energy storage device is an energy storage device having a higher energy density and a lower power density than the second energy storage device, typically, deterioration of the first energy storage device is more likely to progress when the input (the amount of charging power) of the first energy storage device increases rapidly than when the output (the amount of discharge power) of the first energy storage device increases rapidly.

In addition, typically, deterioration of the first energy storage device is more likely to progress when the output (the amount of discharge power) of the first energy storage device decreases rapidly than when the input (the amount of charging power) of the first energy storage device decreases rapidly.

In the second or fourth aspect of the present disclosure, accordingly, preferably, the control device is configured to control the power transmission circuit unit so that a magnitude of a rate of increase in the actual input of the first energy storage device when the target value of the input of the first energy storage device discontinuously increases is less than a magnitude of a rate of change in the actual output of the first energy storage device when the target value of the output of the first energy storage device discontinuously changes (a sixth aspect of the present disclosure).

In addition, in the second, fourth, or sixth aspect of the present disclosure, preferably, the control device is configured to control the power transmission circuit unit so that a magnitude of a rate of decrease in the actual output of the first energy storage device when the target value of the output of the first energy storage device discontinuously decreases is less than a magnitude of a rate of decrease in the actual input of the first energy storage device when the target value of the input of the first energy storage device discontinuously decreases (a seventh aspect of the present disclosure).

According to the sixth aspect of the present disclosure, the effect of restraining a rapid increase in the actual input (the amount of charging power) of the first energy storage device can be increased, which results in the progression of deterioration of the first energy storage device being effectively suppressed or reduced.

According to the seventh aspect of the present disclosure, the effect of restraining a rapid decrease in the actual output (the amount of discharge power) of the first energy storage device can be increased, which results in the progression of deterioration of the first energy storage device being effectively suppressed or reduced.

In the first to seventh aspects of the present disclosure, the one or more state quantities may include a remaining capacity of at least one of the first energy storage device and the second energy storage device (an eighth aspect of the present disclosure).

According to this configuration, the respective input or output target values of the first energy storage device and the second energy storage device can be determined so as to reflect the remaining capacity of the first energy storage device or the second energy storage device. This allows each energy storage device to supply power to the electric load or each energy storage device to be charged with regenerative power from the electric load in a manner suitable for the high or low remaining capacity state or the like of the first energy storage device or the second energy storage device.

In the first to eighth aspects of the present disclosure, the control device may be configured to control the power transmission circuit unit so that, for example, when one operation request value out of the operation request value specifying the amount of power supplied to the electric load and the operation request value specifying the amount of regenerative power output from the electric load is smaller than a predetermined A-th threshold value, the input of one of the first energy storage device and the second energy storage device is larger than the input of the other of the first energy storage device and the second energy storage device and when the one operation request value is larger than the A-th threshold value, the input of the other of the first energy storage device and the second energy storage device is larger than the input of the one of the first energy storage device and the second energy storage device (a ninth aspect of the present disclosure).

This configuration allows the respective input or output target values of the first energy storage device and the second energy storage device to discontinuously change due to a transition from one of the state where the one operation request value is larger than the A-th threshold value and the state where the one operation request value is smaller than the A-th threshold value to the other state.

According to the ninth aspect of the present disclosure, accordingly, the respective actual inputs or outputs of the first energy storage device and the second energy storage device can be prevented from discontinuously changing when a transition occurs from one of the state where the one operation request value is larger than the A-th threshold value and the state where the one operation request value is smaller than the A-th threshold value to the other state.

In the ninth aspect of the present disclosure, if the first energy storage device is an energy storage device having a higher energy density and a lower power density than the second energy storage device, preferably, the one operation request value is the operation request value specifying the amount of regenerative power output from the electric load, and the one of the first energy storage device and the second energy storage device is the first energy storage device (a tenth aspect of the present disclosure).

According to this configuration, if the operation request value is smaller than the A-th threshold value when regenerative power is output from the electric load, the first energy storage device is mainly charged with regenerative power. If the operation request value is larger than the A-th threshold value when regenerative power is output from the electric load, the second energy storage device is mainly charged with regenerative power.

This enables the first energy storage device to be charged with regenerative power with a comparatively small amount of charging power (charged at a low rate). Therefore, the first energy storage device can be charged with regenerative power so that the progression of deterioration of the first energy storage device can be restrained.

Also, the second energy storage device with a relatively high power density can be charged with regenerative power with a comparatively large amount of charging power. Therefore, excessive reduction of the remaining capacity of the second energy storage device can be prevented as much as possible, and power supply from the second energy storage device to the electric load can be maintained as much as possible.

In the first to eighth aspects of the present disclosure, furthermore, the one or more state quantities may include a remaining capacity of one of the first energy storage device and the second energy storage device, and the control device may be configured to control the power transmission circuit unit so that when one operation request value out of the operation request value specifying the amount of power supplied to the electric load and the operation request value specifying the amount of regenerative power output from the electric load is increased from zero, the output of the one of the first energy storage device and the second energy storage device increases to an upper limit earlier than the output of the other of the first energy storage device and the second energy storage device in a state where the remaining capacity of the one of the first energy storage device and the second energy storage device is larger than a predetermined first threshold value, and the output of the other of the first energy storage device and the second energy storage device increases to an upper limit earlier than the output of the one of the first energy storage device and the second energy storage device in a state where the remaining capacity of the one of the first energy storage device and the second energy storage device is smaller than the first threshold value (an eleventh aspect of the present disclosure).

This configuration allows the respective input or output target values of the first energy storage device and the second energy storage device to discontinuously change due to a transition from one of the state where the remaining capacity of the one of the first energy storage device and the second energy storage device is larger than the first threshold value and the state where the remaining capacity of the one of the first energy storage device and the second energy storage device is smaller than the first threshold value to the other state.

According to the eleventh aspect of the present disclosure, accordingly, the respective actual inputs or outputs of the first energy storage device and the second energy storage device can be prevented from discontinuously change when a transition occurs from one of the state where the remaining capacity of the one of the first energy storage device and the second energy storage device is larger than the first threshold value and the state where the remaining capacity of the one of the first energy storage device and the second energy storage device is smaller than the first threshold value to the other state.

In the eleventh aspect of the present disclosure, if the first energy storage device is an energy storage device having a higher energy density and a lower power density than the second energy storage device, preferably, the one operation request value is the operation request value specifying the amount of power supplied to the electric load, and the one of the first energy storage device and the second energy storage device is the second energy storage device (a twelfth aspect of the present disclosure).

According to this configuration, if the remaining capacity of the second energy storage device is larger than the first threshold value during power supply to the electric load, the discharging of the second energy storage device is more likely to progress than that of the first energy storage device until the operation request value is large to some extent. This can prevent the remaining capacity of the second energy storage device from being too high.

On the other hand, if the remaining capacity of the second energy storage device is smaller than the first threshold value, the discharging of the second energy storage device is less likely to progress than that of the first energy storage device until the operation request value is large to some extent. This can prevent the remaining capacity of the second energy storage device from being too low.

Accordingly, the remaining capacity of the second energy storage device is likely to be kept at an approximately medium remaining capacity. Therefore, the progression of deterioration of the second energy storage device having a relatively high power density can be restrained.

In the first to twelfth aspects of the present disclosure described above, the electric load may be, for example, an electric motor (a thirteenth aspect of the present disclosure).

In the thirteenth aspect of the present disclosure, preferably, the power transmission circuit unit includes a voltage converter that converts an output voltage of at least one of the first energy storage device and the second energy storage device to produce a voltage and outputs the produced voltage, and an inverter that converts a direct-current power input from the first energy storage device, the second energy storage device, or the voltage converter into an alternating-current power and supplies the alternating-current power to the electric motor (a fourteenth aspect of the present disclosure).

This configuration can appropriately control power transmission among an electric motor serving as the electric load, the first energy storage device, and the second energy storage device.

Further, a transportation device according to another aspect of the present disclosure includes the power supply system according to the first to fourteenth aspects of the present disclosure (a fifteenth aspect of the present disclosure). This transportation device is implementable as a transportation device that achieves the advantages described above with reference to the first to fourteenth aspects of the present disclosure.

Further, a power transmission method according to still another aspect of the present disclosure is a method for performing power transmission among an electric load, a first energy storage device, and a second energy storage device in a power supply system. The power supply system includes the first energy storage device and the second energy storage device, and is configured to supply power from at least one of the first energy storage device and the second energy storage device to the electric load. The power transmission method includes a first step of determining an input or output target value of the first energy storage device and an input or output target value of the second energy storage device, each input or output target value being a target value of an input or output of the corresponding one of the first energy storage device and the second energy storage device, so as to change the respective inputs or outputs of the first energy storage device and the second energy storage device in accordance with one or more state quantities including at least one of an operation request value of the electric load which specifies an amount of power supplied to the electric load when power is supplied from at least one of the first energy storage device and the second energy storage device to the electric load and an operation request value of the electric load which specifies an amount of regenerative power output from the electric load when at least one of the first energy storage device and the second energy storage device is charged with regenerative power supplied from the electric load; and a second step of executing power transmission among the electric load, the first energy storage device, and the second energy storage device so as to satisfy the input or output target values, wherein in the second step, when a change in the input or output target value of the first energy storage device or the second energy storage device which is defined in accordance with a change in the one or more state quantities is a discontinuous change, an actual input or output to be controlled to be the input or output target value which discontinuously changes is changed more gradually than the input or output target value which discontinuously changes (a sixteenth aspect of the present disclosure).

This configuration enables, as in the first aspect of the present disclosure, prevention of a discontinuous change in the input or output of at least one energy storage device out of two energy storage devices to restrain the progression of deterioration of the at least one energy storage device as much as possible.

Obviously, numerous modifications and variations of the present invention are possible in light of the above teachings. It is therefore to be understood that within the scope of the appended claims, the invention may be practiced otherwise than as specifically described herein.

What is claimed is:
1. A power supply system comprising:
a first energy storage to supply electric power to an electric load and to be charged by the electric load, the first energy storage being a battery, the electric load being an electric motor or an electric actuator;
a second energy storage to supply electric power to the electric load and to be charged by the electric load, the second energy storage being a battery or a capacitor;
a power transmission circuit via which the electric load is connected to the first energy storage and to the second energy storage; and
circuitry configured to
acquire at least one of a request supply amount of electric power to be supplied to the electric load or a request output amount of regenerative electric power output from the electric load;
calculate a first input or output target amount of electric power for the first energy storage and a second input or output target amount of electric power for the second energy storage in accordance with at least one state quantity including the at least one of the request supply amount or the request output amount;
control the power transmission circuit to control electric power transmission so that the first input or output target amount and the second input or output target amount are satisfied; and
control the power transmission circuit so that a change in an amount of the electric power transmission decreases even though changes in the first input or output target amount and the second input or output target amount are discontinuous, wherein the circuitry is configured to control the power transmission circuit so that at least one of:
   a magnitude of a rate of increase in an actual input or output of the first energy storage when the first input or output target amount discontinuously increases is less than a magnitude of a rate of decrease in the actual input or output of the first energy storage when the first input or output target amount discontinuously decreases; or
   a magnitude of a rate of decrease in an actual output of the first energy storage when the first output target amount discontinuously decreases is less than a magnitude of a rate of decrease in an actual input of the first energy storage when the first input target amount discontinuously decreases.

2. The power supply system according to claim 1, wherein the first energy storage has a higher energy density and a lower power density than the second energy storage.

3. The power supply system according to claim 2, wherein the circuitry is configured to control the power transmission circuit so that a magnitude of a rate of increase in an actual input of the first energy storage when the first input target amount discontinuously increases is less than a magnitude of a rate of change in an actual output of the first energy storage when the first output target amount discontinuously changes.

4. The power supply system according to claim 1, wherein the circuitry is configured to control the power transmission circuit so that a rate of increase in an actual input or output of one of the first energy storage and the second energy storage when the first input or output target amount and the second input or output target amount discontinuously increases is different in magnitude from a rate of decrease in the actual input or output of the one of the first energy storage and the second energy storage when the first input or output target amount and the second input or output target amount discontinuously decreases.

5. The power supply system according to claim 1, wherein the circuitry is configured to control the power transmission circuit so that a rate of change in an actual output of one of the first energy storage and the second energy storage when the first output target amount and the second output target amount discontinuously changes is different in magnitude from a rate of change in an actual input of the one of the first energy storage and the second energy storage when the first input target amount and the second input target amount discontinuously changes.

6. The power supply system according to claim 1, wherein the at least one state quantity includes a remaining capacity of at least one of the first energy storage or the second energy storage.

7. The power supply system according to claim 1, wherein the circuitry is configured to control the power transmission circuit so that
   when one operation request value out of the request supply amount and the request output amount is smaller than a predetermined regeneration threshold value, an input of one of the first energy storage and the second energy storage is larger than an input of the other of the first energy storage and the second energy storage, and
   when the one operation request value is larger than the regeneration threshold value, the input of the other of the first energy storage and the second energy storage is larger than the input of the one of the first energy storage and the second energy storage.

8. The power supply system according to claim 7, wherein the first energy storage is an energy storage device having a higher energy density and a lower power density than the second energy storage, and
   wherein the one operation request value is the request output amount, and the one of the first energy storage and the second energy storage is the first energy storage.

9. The power supply system according to claim 1, wherein the at least one state quantity includes a remaining capacity of one of the first energy storage and the second energy storage, and
   wherein the circuitry is configured to control the power transmission circuit so that
      when one operation request value out of the request supply amount and the request output amount is increased from zero,
      an output of the one of the first energy storage and the second energy storage increases to an upper limit earlier than an output of the other of the first energy storage and the second energy storage in a state where the remaining capacity of the one of the first energy storage and the second energy storage is larger than a predetermined first threshold value, and
      the output of the other of the first energy storage and the second energy storage increases to an upper limit earlier than the output of the one of the first energy storage and the second energy storage in a state where the remaining capacity of the one of the first energy storage and the second energy storage is smaller than the first threshold value.

10. The power supply system according to claim 9, wherein the first energy storage is an energy storage device having a higher energy density and a lower power density than the second energy storage, and
   wherein the one operation request value is the request supply amount, and the one of the first energy storage and the second energy storage is the second energy storage.

11. The power supply system according to claim 1, wherein the electric load is an electric motor.

12. The power supply system according to claim 11, wherein the power transmission circuit includes
   a voltage converter that converts an output voltage of at least one of the first energy storage or the second energy storage to produce a voltage and outputs the produced voltage, and
   an inverter that converts a direct-current power input from the first energy storage, the second energy storage, or the voltage converter into an alternating-current power and supplies the alternating-current power to the electric motor.

13. A transportation device comprising
   the power supply system according to claim 1.

14. The power supply system according to claim 1, wherein the circuitry is configured to control the power transmission circuit so that changes in a first amount of first electric power and a second amount of second electric power decrease even though the changes in the first input or output target amount and the second input or output target amount are discontinuous, the first electric power being to be transmitted between the power transmission circuit and the first energy storage, the second electric power being to be transmitted between the power transmission circuit and the second energy storage.

15. A power transmission method for performing power transmission among an electric load, a first energy storage, and a second energy storage, the power transmission method comprising:
- acquiring at least one of a request supply amount of electric power to be supplied to the electric load or a request output amount of regenerative electric power output from the electric load, the electric load being an electric motor or an electric actuator;
- calculating a first input or output target amount of electric power for the first energy storage and a second input or output target amount of electric power for the second energy storage in accordance with at least one state quantity including the at least one of the request supply amount or the request output amount, the first energy storage being a battery, the second energy storage being a battery or a capacitor;
- controlling electric power transmission so that the first input or output target amount and the second input or output target amount are satisfied; and
- controlling the electric power transmission so that a change in an amount of the electric power transmission decreases even though changes in the first input or output target amount and the second input or output target amount are discontinuous,
- wherein the electric power transmission is further controlled so that at least one of:
  - a rate of increase in an actual input or output of one of the first energy storage and the second energy storage when the first input or output target amount and the second input or output target amount discontinuously increases is different in magnitude from a rate of decrease in the actual input or output of the one of the first energy storage and the second energy storage when the first input or output target amount and the second input or output target amount discontinuously decreases;
  - a magnitude of the rate of increase in the actual input or output of the first energy storage when the first input or output target amount discontinuously increases is less than a magnitude of the rate of decrease in the actual input or output of the first energy storage when the first input or output target amount discontinuously decreases; or
  - a magnitude of a rate of decrease in an actual output of the first energy storage when the first output target amount discontinuously decreases is less than a magnitude of a rate of decrease in an actual input of the first energy storage when the first input target amount discontinuously decreases.

16. The power transmission method according to claim 15, wherein the electric power transmission is controlled so that changes in a first amount of first electric power and a second amount of second electric power decrease even though the changes in the first input or output target amount and the second input or output target amount are discontinuous, the first electric power being to be transmitted to or from the first energy storage, the second electric power being to be transmitted to or from the second energy storage.

17. A power supply system comprising:
- a first energy storage to supply electric power to an electric load and to be charged by the electric load, the first energy storage being a battery, the electric load being an electric motor or an electric actuator;
- a second energy storage to supply electric power to the electric load and to be charged by the electric load, the second energy storage being a battery or a capacitor;
- a power transmission circuit via which the electric load is connected to the first energy storage and to the second energy storage; and
- circuitry configured to
  - acquire at least one of a request supply amount of electric power to be supplied to the electric load or a request output amount of regenerative electric power output from the electric load;
  - calculate a first input or output target amount of electric power for the first energy storage and a second input or output target amount of electric power for the second energy storage in accordance with at least one state quantity including the at least one of the request supply amount or the request output amount;
  - control the power transmission circuit to control electric power transmission so that the first input or output target amount and the second input or output target amount are satisfied; and
  - control the power transmission circuit so that a change in an amount of the electric power transmission decreases even though changes in the first input or output target amount and the second input or output target amount are discontinuous,
- wherein the circuitry is configured to control the power transmission circuit so that a rate of increase in an actual input or output of one of the first energy storage and the second energy storage when the first input or output target amount and the second input or output target amount discontinuously increases is different in magnitude from a rate of decrease in the actual input or output of the one of the first energy storage and the second energy storage when the first input or output target amount and the second input or output target amount discontinuously decreases.

* * * * *